(12) United States Patent
Ardo et al.

(10) Patent No.: US 11,318,424 B2
(45) Date of Patent: May 3, 2022

(54) LIGHT-DRIVEN ION-PUMPING MEMBRANE SYSTEMS

(71) Applicant: THE REGENTS OF THE UNIVERSITY OF CALIFORNIA, Oakland, CA (US)

(72) Inventors: Shane Ardo, Irvine, CA (US); William White, Irvine, CA (US); Christopher D. Sanborn, Irvine, CA (US); Joseph M. Cardon, Irvine, CA (US); Ronald S. Reiter, Vista, CA (US); Eric Schwartz, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 684 days.

(21) Appl. No.: 15/698,324

(22) Filed: Sep. 7, 2017

(65) Prior Publication Data

US 2018/0065095 A1 Mar. 8, 2018

Related U.S. Application Data

(60) Provisional application No. 62/384,503, filed on Sep. 7, 2016.

(51) Int. Cl.
*B01D 71/82* (2006.01)
*B01J 19/12* (2006.01)
(Continued)

(52) U.S. Cl.
CPC ........... *B01D 71/82* (2013.01); *B01D 61/445* (2013.01); *B01D 69/02* (2013.01); *B01D 69/12* (2013.01);
(Continued)

(58) Field of Classification Search
CPC ...... B01D 71/82; B01D 61/445; B01D 69/02; B01D 69/12; B01D 71/36;
(Continued)

(56) References Cited

U.S. PATENT DOCUMENTS 6,274,806 B1 * 8/2001 Sugihara ............. C07F 15/0093
136/252
6,878,287 B1 4/2005 Marais
(Continued)

FOREIGN PATENT DOCUMENTS

| JP | H7-241443 A | 3/1995 |
|---|---|---|
| JP | 2001-247546 A | 9/2001 |
| WO | WO02/05933 A1 | 1/2002 |

OTHER PUBLICATIONS

Gopidas et al, "Photochemistry In Polymers. PhotoInduced Electron Transfer between Phenosafranine and Triethylamine In Perfluorosulfonate Membrane," J. Phys. Chem. 1990, vol. 94, pp. 4723-4727. (Year: 1990).*

(Continued)

*Primary Examiner* — Nicholas A Smith
*Assistant Examiner* — Colleen M Raphael
(74) *Attorney, Agent, or Firm* — Nguyen Tarbet LLC

(57) ABSTRACT

Dye-sensitized ion-pumping membranes and methods of preparing said membranes are described herein. A regenerative and reversible photoactive dye is covalently-bonded to membrane or separator for ion-pumping. The photoactive dye-functionalized membranes can be arranged with other ion-exchange membranes, which serve as selective contacts to afford photovoltaic action and therefore form a power-producing membrane that pumps ions for use in driving an ion-exchange or ion-transport process, such as desalination and electrodialysis.

21 Claims, 12 Drawing Sheets
(10 of 12 Drawing Sheet(s) Filed in Color)

(51) Int. Cl.
| | |
|---|---|
| *C02F 1/469* | (2006.01) |
| *C08J 5/22* | (2006.01) |
| *H01M 8/1018* | (2016.01) |
| *B01D 61/44* | (2006.01) |
| *B01D 69/02* | (2006.01) |
| *B01D 69/12* | (2006.01) |
| *B01D 71/36* | (2006.01) |
| *C02F 1/30* | (2006.01) |
| *C02F 103/08* | (2006.01) |

(52) U.S. Cl.
CPC ............ *B01D 71/36* (2013.01); *B01J 19/123* (2013.01); *B01J 19/127* (2013.01); *B01J 19/128* (2013.01); *C02F 1/30* (2013.01); *C02F 1/469* (2013.01); *C02F 1/4693* (2013.01); *C08J 5/2287* (2013.01); *H01M 8/1018* (2013.01); *B01D 2311/2611* (2013.01); *B01D 2325/26* (2013.01); *B01D 2325/42* (2013.01); *C02F 2103/08* (2013.01); *C02F 2201/009* (2013.01); *Y02A 20/124* (2018.01); *Y02E 10/542* (2013.01); *Y02W 10/37* (2015.05)

(58) Field of Classification Search
CPC ........ B01D 2311/2611; B01D 2325/26; B01D 2325/42; B01J 19/123; B01J 19/127; B01J 19/128; C02F 1/30; C02F 1/4693; C02F 2103/08; C02F 2201/009; C02F 1/469; Y02E 10/542; Y02E 60/50; Y02W 10/37; Y02A 20/134; Y02A 20/124; C08J 5/2287; H01M 8/1018
USPC .......................................................... 205/340
See application file for complete search history.

(56) References Cited

U.S. PATENT DOCUMENTS

| | | | |
|---|---|---|---|
| 8,764,957 | B2 | 7/2014 | Sui et al. |
| 2007/0099055 | A1 | 5/2007 | Lee et al. |
| 2010/0143811 | A1* | 6/2010 | Brimblecombe ....... C25B 1/003 205/340 |
| 2011/0088757 | A1* | 4/2011 | Highgate .................. H01G 9/20 136/252 |
| 2012/0097541 | A1 | 4/2012 | Yazdanbod |
| 2012/0309045 | A1* | 12/2012 | Knutson ............ G01N 21/6458 204/157.68 |
| 2012/0312737 | A1* | 12/2012 | Miller .................... B01D 71/10 210/500.25 |
| 2013/0041353 | A1 | 2/2013 | Shin et al. |
| 2013/0168228 | A1 | 7/2013 | Ozin et al. |
| 2015/0298100 | A1* | 10/2015 | Hill ........................ B01J 35/004 204/242 |
| 2016/0067669 | A1* | 3/2016 | Willey ................... B01J 19/123 422/186.3 |
| 2016/0158690 | A1* | 6/2016 | Puxty ................. B01D 53/1481 423/228 |

OTHER PUBLICATIONS

Johns et al, "Visible Light Activated Ion Sensing Using a Photoacid Polymer for Calcium Detection," Analytical Chemistry 2014, vol. 86, pp. 6184-6187 (Year: 2014).*
Xie et al, "Visible light induced photoacid generation within plasticized PVC membranes for copper (II) ion extraction," Sensors and Actuators B 204 (2014) pp. 807-810 (Year: 2014).*
Mohan et al, "Photochemical Behaviour of Rhodamine 6G in Nafion Membrane," J. Chem. Soc. Faraday Trans., 1992, vol. 88(1). pp. 41-45 (Year: 1992).*
Krishnan et al, "Integrated Chemical Systems: Photocatalysis at Semiconductors Incorporated into Polymer (Nafion)/Mediator Systems," J. Am. Chem. Soc. 1983, vol. 105, pp. 7002-7003 (Year: 1983).*
Mistlberger et al, "Photoresponsive Ion Extraction/Release Systems: Dynamic Ion Optodes for Calcium and Sodium Based on Photochromic Spiropyran," Analytical Chemistry 2013, vol. 85, pp. 2983-2990 (Year: 2013).*
Email communication from ProQuest, dated Nov. 3, 2020 (Year: 2020).*
Matthew B. Chambers, Daniel A. Kurtz, Catherine L. Pitman, M. Kyle Brennaman, and Alexander J. M. Miller. "Efficient Photochemical Dihydrogen Generation Initiated by a Bimetallic Self-Quenching Mechanism" J. Am. Chem. Soc. 2016, 138, 13509-13512.
David J. Stewart, Javier J. Concepcion, M. Kyle Brennaman, Robert A. Binstead, and Thomas J. Meyer. "Accelerating slow excited state proton transfer" PNAS. 2013, vol. 110, No. 3, 876-880.
Helmut Tributsch. "Light Driven Proton Pumps" Ionics. 2000, 6, 161-171.
Gali Steinberg-Yfrach, Paul A. Liddell, Su-Chun Hung, Ana L. Moore, Devens Gust & Thomas A. Moore. "Conversion of light energy to proton potential in liposomes by artificial photosynthetic reaction centres" Nature. 1997, 385, 239-241.
Xiaojiang Xie, Gasto'n A. Crespo, Gunter Mistlberger and Eric Bakker. "Photocurrent generation based on a light-driven proton pump in an artificial liquid membrane" Nature Chemistry. Published Online: Feb. 2, 2014 | DOI: 10.1038/NCHEM.1858.
Kai Sun and David Mauzerall. "A simple light-driven transmembrane proton pump" Proc. Natl. Acad. Sci. USA, vol. 93, pp. 10758-10762, Oct. 1996.
G. W. Murphy. "Model Systems in Photoelectrochemical Energy Conversion" Solar Energy, 1978, vol. 21, pp. 403-407.
Christopher D. Sanborn and Shane Ardo. "Photoelectrochemical Ion Pumping with Dye-Functionalized Polymer Membranes" in Electrochemical Society (ECS), Spring National Meeting, Chicago, IL, May 27, 2015.
William White, Ronald S. Reiter, Claudia P. Ramirez, Christopher D. Sanborn and Shane Ardo. "Sunlight-Driven Ionic Power Generation from Bipolar Ion-Exchange Membranes Functionalized with Photoacids" in Electrochemical Society (ECS), Spring National Meeting, San Diego, CA, May 29, 2016.
William White, Christopher D. Sanborn, Ronald S. Reiter, David M. Fabian, and Shane Ardo. "Observation of Photovoltaic Action from Photoacid-Modified Nafion Due to Light-Driven Ion Transport" J. Am. Chem. Soc., 2017, 139 (34), pp. 11726-11733.
Li, N.; Yan, T.; Li, Z.; Thurn-Albrecht, T.; Binder, W. H. Energy Environ. Sci. 2012, 5, 7888-7892.
Wang, Z.; Parrondo, J.; Ramani, V. J. Electrochem. Soc. 2016, 163 (8), F824-F831.
Lashkaryov, V. E. Investigations of a Barrier Layer by the Thermoprobe Method. Izv. Akad. Nauk SSSR, Ser. Fiz. 1941, 5 (4-5), 442-446.
Fuller, C. S. Some Analogies Between Semiconductors and Electrolyte Solutions. Rec. Chem. Prog. 1956, 17 (2), 75-93.
Chapin, D. M.; Fuller, C. S.; Pearson, G. L. A New Silicon P-n Junction Photocell for Converting Solar Radiation into Electrical Power. J. Appl. Phys. 1954, 25 (5), 676-677.
Lovrecek, B.; Despic, A.; Bockris, J. O. Electrolytic Junctions with Rectifying Properties. J. Phys. Chem. 1959, 63, 750.
Maslov, V.; Zotov, Y. Water as a Semiconductor. Russ. Chem. Rev. 1968, 37 (4), 310-315.
Pearson, G. L.; Bardeen, J. Electrical Properties of Pure Silicon and Silicon Alloys Containing Boron and Phosporus. Phys. Rev. 1949, 75 (5), 865.
Rosés, M.; Ràfols, C.; Bosch, E. Autoprotolysis in Aqueous Organic Solvent Mixtures. Anal. Chem. 1993, 1003 (23), 2294-2299.
Rondinini, S.; Longhi, P.; Mussini, P. R.; Mussini, T. Autoprotolysis Constants in Nonaqueous Solvents and Aqueous Organic Solvent Mixtures. Pure Appl. Chem. 1987, 59 (12), 1693-1702.
Würfel, P. Physics of Solar Cells: From Principles to New Concepts; Wiley-VCH, 2005.
Battaglia, C.; Cuevas, A.; De Wolf, S. High-Efficiency Crystalline Silicon Solar Cells: Status and Perspectives. Energy Environ. Sci. 2016, 9 (5), 1552-1576.
Shockley, W.; Queisser, H. J. Detailed Balance Limit of Efficiency of P-N Junction Solar Cells. J. Appl. Phys. 1961, 32 (3), 510-519.

(56) References Cited

OTHER PUBLICATIONS

Würthner, F.; Kaiser, T. E.; Saha-Möller, C. R. J-Aggregates: From Serendipitous Discovery to Supramolecular Engineering of Functional Dye Materials. Angew. Chemie Int. Ed. 2011, 50 (15), 3376-3410.

Ardo, S.; Sun, Y.; Castellano, F. N.; Meyer, G. J. Excited-State Electron Transfer from Ruthenium-Polypyridyl Compounds to Anatase $TiO_2$ Nanocrystallites: Evidence for a Stark Effect. J. Phys. Chem. B 2010, 114 (45), 14596-14604.

Ardo, S.; Sun, Y.; Staniszewski, A.; Castellano, F. N.; Meyer, G. J. Stark Effects after Excited-State Interfacial Electron Transferal Sensitized $TiO_2$ Nanocrystallites. J. Am. Chem. Soc. 2010, 132 (19), 6696-6709.

Pensack, R. D.; Banyas, K. M.; Barbour, L. W.; Hegadorn, M.; Asbury, J. B. Ultrafast Vibrational Spectroscopy of Charge-Carrier Dynamics in Organic Photovoltaic Materials. Phys. Chem. Chem. Phys. 2009, 11 (15), 2575.

Zhang, F.; Zhang, H.; Qu, C. Imidazolium Functionalized Polysulfone Anion Exchange Membrane for Fuel Cell Application J. Mater. Chem. 2011, 21 (34), 12744.

Wang, G.; Weng, Y.; Chu, D.; Xie, D.; Chen, R. Preparation of Alkaline Anion Exchange Membranes Based on Functional Poly(ether-Imide) Polymers for Potential Fuel Cell Applications. J. Memb. Sci. 2009, 326, 4-8.

Luo, J.; Wu, C.; Wu, Y.; Xu, T. Diffusion Dialysis of Hydrochloride Acid at Different Temperatures Using PPO—$SiO_2$ Hybrid Anion Exchange Membranes. J. Memb. Sci. 2010, 347, 240-249.

Khan, M. I.; Mondal, A. N.; Tong, B.; Jiang, C.; Emmanuel, K.; Yang, Z.; Wu, L.; Xu, T. Development of BPPO-Based Anion Exchange Membranes for Electrodialysis Desalination Applications. Desalination 2016, 391, 61-68.

Merle, G.; Wessling, M.; Nijmeijer, K. Anion Exchange Membranes for Alkaline Fuel Cells: A Review. J. Memb. Sci. 2011, 377 (1-2), 1-35.

Reiter, R. S.; White, W.; Ardo, S. Electrochemical Characterization of Commercial Bipolar Membranes under Electrolyte Conditions Relevant to Solar Fuels Technologies. J. Electrochem. Soc. 2016, 163 (4), H3132-H3134.

Ünlü, M.; Zhou, J.; Kohl, P. A. Hybrid Anion and Proton Exchange Membrane Fuel Cells. J. Phys. Chem. C 2009, 113 (26), 11416-11423.

Grew, K. N.; McClure, J. P.; Chu, D.; Kohl, P. A.; Ahlfield, J. M. Understanding Transport at the Acid-Alkaline Interface of Bipolar Membranes. J. Electrochem. Soc. 2016, 163 (14), F1572-F1587.

Warrick, P.; Auborn, J. J.; Eyring, E. M. Viscosity Effects on Ion-Recombination Kinetics. Bromocresol Green in Water-Glycerol Mixtures. J. Phys. Chem. 1972, 76 (8), 1184-1191.

Hegedus, L.; Kirschner, N.; Wittmann, M.; Noszticzius, Z. Electrolyte Transistors: Ionic Reaction-Diffusion Systems with Amplifying Properties. J. Phys. Chem. A 1998, 102 (32), 6491-6497.

Spry, D. B.; Fayer, M. D. Proton Transfer and Proton Concentrations in Protonated Nation Fuel Cell Membranes. J. Phys. Chem. B 2009, 113 (30), 10210-10221.

Eames, C.; Frost, J. M.; Barnes, P. R. F.; O'Regan, B. C.; Walsh, A.; Islam, M. S. Ionic Transport in Hybrid Lead Iodide Perovskite Solar Cells. Nat. Commun. 2015, 6, 7497.

Bag, M.; Renna, L. A.; Adhikari, R. Y.; Karak, S.; Liu, F.; Lahti, P. M.; Russell, T. P.; Tuominen, M. T.; Venkataraman, D. Kinetics of Ion Transport in Perovskite Active Layers and Its Implications for Active Layer Stability. J. Am. Chem. Soc. 2015, 137 (40), 13130-13137.

Fabian, D. M.; Ardo, S.; An, C. Y.; Pepe, I.; Oliveira, N. B. De; Silva, A. V. B. Da; Gray-Weale, A.; Bach, U.; Cheng, Y.-B.; Spiccia, L.; et al. Hybrid Organic-inorganic Solar Cells Based on Bismuth Iodide and 1,6-Hexanediammonium Dication. J. Mater. Chem. A 2016, 4 (18), 6837-6841.

Chen, H.; Gratton, E.; Digman, M. A. Spectral Properties and Dynamics of Gold Nanorods Revealed by EMCCD-Based Spectral Phasor Method. Microsc. Res. Tech. 2015, 78 (4), 283-293.

Ramírez, P.; Rapp, H. J.; Reichle, S.; Strathmann, H.; Mafé, S. Current-Voltage Curves of Bipolar Membranes. J. Appl. Phys. 1992, 72 (1), 259-264.

Mafé, S.; Ramírez, P.; Alcaraz, A. Electric Field-Assisted Proton Transfer and Water Dissociation at the Junction of a Fixed-Charge Bipolar Membrane. Chem. Phys. Lett. 1998, 294 (4-5), 406-412.

Mafé, S.; Ramírez, P. Electrochemical Characterization of Polymer Ion-Exchange Bipolar Membranes. Acta Polym. 1997, 48, 234-250.

Kolbe, M. Science. 2000, 288, 1390-1396.

White, W. et al. Joule, 2018. 2, 94-109.

Reiter, R. Electrochemical evaluation of bipolar ion-exchange membranes for fuel cells. University of California, Irvine. M.S. Thesis. 2015. [Retrieved from the internet on Oct. 12, 2017]. <URL: http://escholarship.org/contentlqt3pc416c6/qt3pc416c6.pdf>; pp. 3, 25-27, 32.

International Search Report for PCT Application No. PCT/US17/50532 dated Nov. 3, 2017.

International Search Report Issued for PCT Application No. PCT/US19/24424 dated Jun. 14, 2019.

* cited by examiner

FIG. 15A  FIG. 15C  FIG. 15D
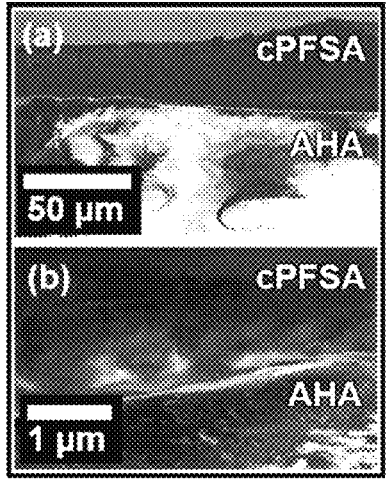
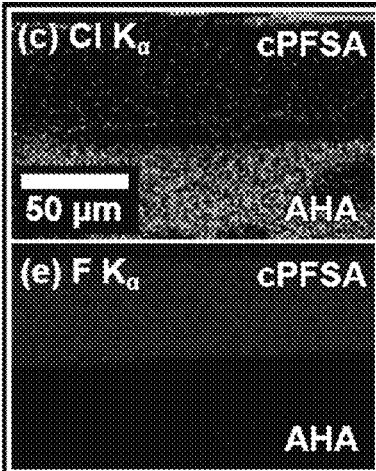
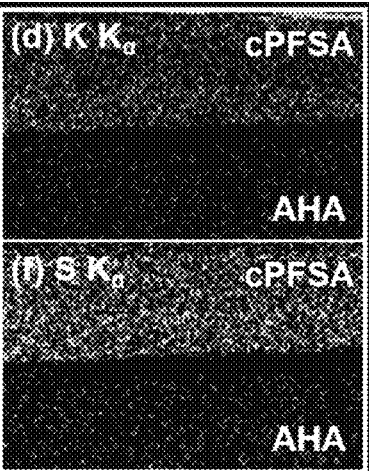
FIG. 15B  FIG. 15E  FIG. 15F
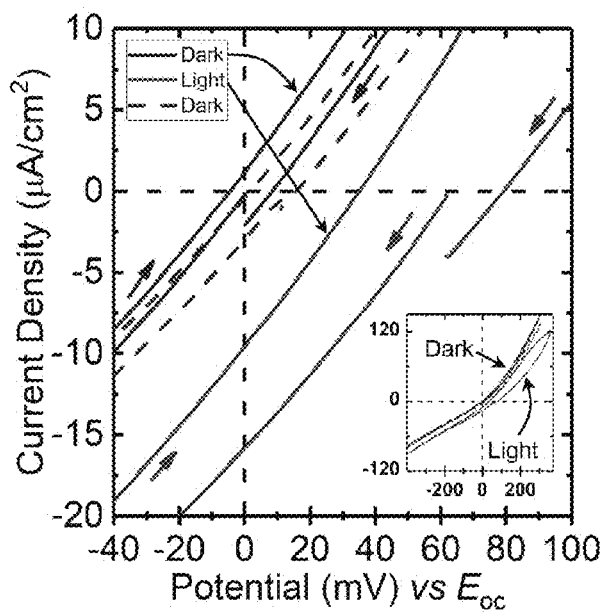
FIG. 16A
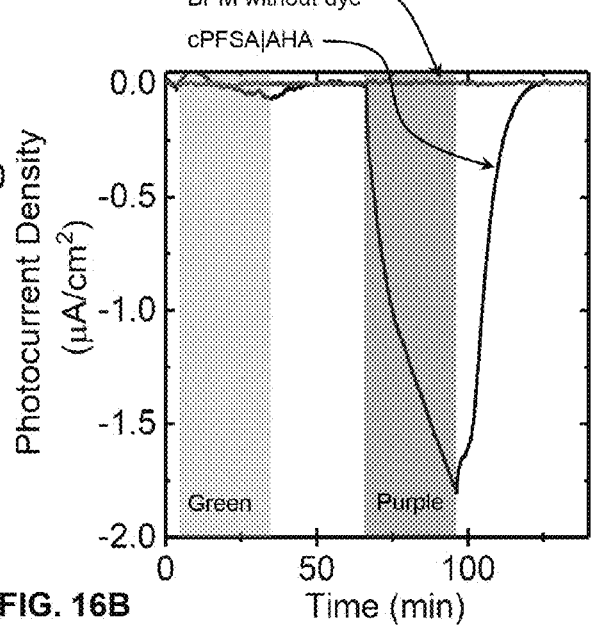
FIG. 16B

LIGHT-DRIVEN ION-PUMPING MEMBRANE SYSTEMS

CROSS REFERENCE

This application claims priority to U.S. Provisional Application No. 62/384,503, filed Sep. 7, 2016, the specification(s) of which is/are incorporated herein in their entirety by reference.

FIELD OF THE INVENTION

The present invention relates to ion-pumping membranes and separators modified with a photoactive dye for use in ion-exchange and ion-transport (IX) applications.

BACKGROUND OF THE INVENTION

In an ion-exchange or ion-transport (IX) process, dissolved ions are transported from one solution to another with or without replacement by other similarly charged ions. Applications of the IX process include, but are not limited to, desalination, salt production, acid and alkali production, and membranes for fuel cells and electrolyzers. IX membranes are membranes that are selectively permeable to specific ions and are divided into two general categories: cation-exchange membranes and anion-exchange membranes. Cation-exchange membranes contain fixed negatively charged groups and are based on several physical processes including, but not limited to. Donnan exclusion and charge repulsion. Positively-charged cations permeate through the cation-exchange membranes well. Similarly, anion-exchange membranes contain fixed positively charged groups and therefore anions, which have a negative charge, permeate through anion-exchange membranes well.

These selective permeations are carried out by passing a current, typically originating as electronic current, through anion-exchange membranes and/or cation-exchange membranes arranged in specific patterns depending on the ultimate application and desired ion-transport processes. The typical means of transducing electronic current into ionic current in IX processes, such as in electrodialysis devices, fuel cells, electrolyzers, often relies on Faradaic reactions, such as water or brine electrolysis that each require a potential >1 V. While many IX processes require substantially less potential, a large amount of energy is wasted as heat and/or used to drive processes other than IX processes.

For example, desalination technologies are expensive and inefficient on large scales. However, due to the demand for potable water and dwindling natural resources, desalination of sea water is being utilized in places such as Israel, California, and Australia that often experience extreme drought conditions. According to a 2013 study from the state Department of Water Resources, the typical cost for desalinated water is about $2,000 per acre foot, which is about twice the cost of that of reclaimed wastewater. Further still, desalination can be even more expensive and less efficient on small scales, because a larger fraction of the required energy is wasted as heat, for example, in order to operate pumps, for reverse osmosis technologies, and to convert electronic power into ionic power, for electrodialysis technologies. While solar thermal distillation is inexpensive, it is much less efficient than other processes, due to the inherent excess energy required to evaporate water in comparison to the energy required to remove salt from water.

Currently, there are no distributed technologies that can overcome these large energy expenditures. The prior art (i.e. reverse osmosis, distillation, and electrodialysis technologies, which are the large-scale state-of-the-art) typically use mostly non-renewable sources of electricity and are expensive. If said technologies are wired to photovoltaic (PV) or wind systems to utilize renewable sources of electricity, the expense of the system remains high. Handheld reverse osmosis (RO) technologies, such as the manually pumped Katadyn Survivor handheld RO device, are also costly; while solar stills are the state-of-the-art distributed and directly integrated renewable technology, they are very inefficient and limited by the thermodynamics of the process. Comparable solar-driven electrodialysis in a distributed handheld technology still requires large amounts of energy. For example, US20070099055 of Lee discloses a polymer electrolyte membrane including an ionic conducting polymer and a light-irradiated product of a photoacid generator (PAG) dye, which is irreversible such that after the PAG dye absorbs one photon and makes one proton, it is unable to do so again. Hence, there is a need for technologies that allow for IX processes to occur without wasting much energy or consuming dyes.

The present invention features dye-sensitized membranes that use light to drive ion transport, thus allowing said membranes to play an active role in photoelectrochemical processes/technologies, such as electrodialysis and electrolytic generation of acid and base, and supplement the power demands of these processes/technologies with renewable sunlight-driven ion transport.

Furthermore, some people have suggested that even at scale, distributed goods and/or services may be sensible, e.g. PVs will likely benefit little from economies of scale because PVs are not often serviced. Thus, a consumer might install and use a PV in their own space if it is projected to be cheaper than establishing a plant that would occupy a lot of land and require few costs associated with maintenance. Also, medium-scale and distributed water desalination from newly discovered brackish ground-water resources could possibly benefit from the present technology. Hence, the present invention could prove widely useful and economical once at scale.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

It is an objective of the present invention to provide a regenerative/reversible photoactive dye covalently-bonded to a membrane in an arrangement with other IX membranes, which serve as selective contacts to create photovoltaic action and therefore a power-producing ion pump for use in driving an IX process, such as desalination, as specified in the independent claims. Embodiments of the invention are given in the dependent claims. Embodiments of the present invention can be freely combined with each other if they are not mutually exclusive.

The present invention comprises a specialized membrane that uses an innovative mechanism for light-to-ionic energy conversion where absorption of sunlight energizes and releases ions which directly drives desalination of salt water. Two important features of all efficient solar photovoltaic power-producing technologies are sunlight absorption that results in generation of tee charge carriers, and rectifying current-voltage behavior which indicates directionality in charge transport. These are also properties desired in the present invention, although not all rectifying materials make efficient solar photovoltaic power-producing technologies.

In one embodiment, the present invention features a configuration of the IX membranes resembling that of a typical electrodialysis device, which is known to one of ordinary skill in the art, except the materials that generate and/or remove ions (i.e. the electrodes in an electrodialysis device) are positioned back-to-back. The light-absorbing power supply takes the place of the back-to-back electrodes, while the other membranes serve as filters that selectively shuttle $Na^+$ and $Cl^-$ out of a saltwater compartment, ultimately resulting in potable water. In one specific embodiment, the light-driven ion-pumping membrane is a two-layer bipolar membrane that can be positioned near a monopolar cation-exchange membrane and monopolar anion-exchange membrane. These configurations can be used to desalinate salt water that initially resides between the two monopolar membranes.

In another embodiment, the present invention features a three-layer bipolar membrane structure comprising a custom photoactive dye-functionalized membrane laminated between an anion-exchange membrane, such as Neosepta®, and a cation-exchange membrane, such as Nafion® 112. The IX membranes can transport photogenerated ions out of the bipolar membrane and do not transport other ions to replace those that are lost.

One of the unique technical features of the present invention is the custom photoactive photoacidic or photobasic dye covalently bound to a membrane. Light absorption by a photoactive dye alters the chemical potential of a bound ion, such as a proton, so that the ion is more likely to dissociate from the dye and therefore excess ions, such as a proton and a hydroxide ion, are generated locally by sunlight absorption. The properties responsible for the diode-like membrane behavior then drive the dissociated positively-charged ions, such as protons, in one direction; for the case of protons, reprotonation of the ground-state dyes by water generates negatively-charged hydroxide, or buffer, ions that are then transported in the opposite direction. A photovoltage and photocurrent have been measured, which indicate that light has been converted into ionic power. Without wishing to limit the invention to any theory or mechanism, it is believed that the technical feature of the present invention advantageously slows for reversible and regenerative reactions of the photoactive dye, thereby allowing for the photoactive dye to be reused until it degrades due to side reactions. In addition, covalently bonding of the photoactive dye to the membrane can prevent leaching of the photoactive dye to allow for long-term use of the membrane. Since the membrane generates ionic power from sunlight, that can be used to supplement the power required by any device that moves ions with electric bias, thus reducing the power requirements of that device. None of the presently known prior references or work has the unique technical feature of the present invention.

The present invention has been described, for exemplary purposes, in connection with desalination processes in the detailed description. However, the present invention is applicable to any application involving ion exchange, ion transport, or ion-induced changes in electric potential. For instance, the present invention may be used in conjunction with studies of brain function and neuron connectivity, e.g. for health and Alzheimer's disease research. The photoactive-dye-functionalized membrane scaled down to nano-sizes may be used to trigger neuron firing to map the brain connectome. Further still, the present invention may be used to generate acids and bases locally, which could be used to selectively turn on and off reactions that require acid and/or base, as a substrate or product of the reaction, or where acid and/or base catalyze a reaction.

Abbreviations bpy, 2,2'-bipyridined
bq, biquinoline
PPA, polyallylamine
ppy, phenylpyridine
TPP, tetraphenylporphyrin
BPM, bipolar membrane
PSBM, photoacid-sensitized bipolar membrane
PFSA, perfluorosulfonic acid ionomer membrane
PFSF, sulfonyl fluoride poly(perfluorosulfonyl fluoride) membrane
AHA, Neosepta® anion-exchange membrane
cPFSA, covalently bound photoacids to PFSA
iPFSA, ionically associated photoacids to PFSA
cPFSA|AHA, interface of cPFSA and AHA
X37, Sustainion® dioxide X37 anion-exchange membrane

BRIEF DESCRIPTION OF THE DRAWINGS

This patent application contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 14A shows a transmission-mode electronic absorption spectra and FIG. 14B shows photoluminescence spectra of cPFSA after soaking it in 1 M HCl(aq) (red) and in 1 M NaOH(aq) (black), PSBM after soaking it in 1 M HCl(aq) (green) and in 1 M NaOH(aq) (purple), and native AHA (grey). FIG. 14C shows thermal gravimetric analysis data during a temperature ramp for the sodium form of cPFSA (blue) and chloride form of AHA (dark yellow).

FIGS. 15A-15F show electron microscopy of dye-sensitized bipolar ion-exchange membrane. Representative scanning electron micrographs of the interface of cPFSA and AHA layers in PSBM as a wide view (FIG. 15A) and a zoomed in view (FIG. 15B). Energy-dispersive X-ray spectroscopy elemental maps for chlorine (FIG. 15C), potassium (FIG. 15D), fluorine (FIG. 15E), and sulfur (FIG. 15F). The scale bar in FIG. 15C is also valid for the data in panels FIGS. 15D-15F.

FIGS. 16A-16B shows photovoltaic action from dye-sensitized bipolar ion-exchange membrane. FIG. 16A is a cyclic voltammograms in the dark (blue), under illumination with 405 nm laser light (purple), and in the dark again after introducing fresh electrolyte (dashed blue) for PSBM wetted by 10 mM $HClO_4$(aq) on one side of the membrane and 10 mM KOH(aq) on the other side of the membrane. The direction of each linear potential sweep is indicated by the arrows. FIG. 16B shows spectral response, reported as $J_{ph-ac}$ values after correction for a dark current density of $-1.6\pm0.6$ $\mu A/cm^2$, when illuminated intermittently with 532 nm laser light (green) followed by 405 nm laser light (purple), highlighted by these respective colors.

DESCRIPTION OF PREFERRED EMBODIMENTS

As used herein, the term "ion-pumping", when used in conjunction with membranes, processes, applications, and the like, encompasses the terms "ion-exchange", "ion-transport", "ion-conductive", and "ion-selective", and may be used interchangeably. The term "IX" refers to both ion-exchange and ion-transport and is defined as the transport of ions from one solution to another with (exchange) or without replacement by other similarly charged ions. IX membranes such as anion-exchange membranes or cation-exchange membranes predominantly transport ions of a single charge.

Figure 4:
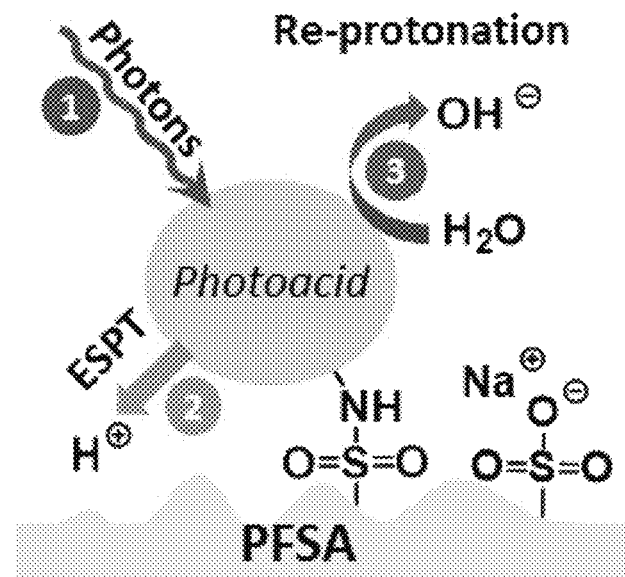
FIG. 4 is a scheme showing the proposed sensitization cycle of PFSA modified with 8-hydroxypyrene-1,3,6-tris(2-aminoethylsulfonamide) photoacids, including excited-state proton transfer.

As defined herein, the term "photoactive dye" is a compound that can undergo a regenerative and reversible light-driven dissociation or light-driven association reaction to generate a positively-charged ion and a negatively-charged ion. Referring to FIG. 4, one of ordinary skill in the art would understand that the photoactive dye can generate a positively-charged ion or a negatively-charged ion upon photoexcitation, and then remove the same charge-type of ion from solution, thus regenerating itself. In some embodiments, the positively-charged ion is a proton and the negatively-charged ion is a hydroxide ion. In other alternative embodiments, other ions may be photoliberated, including, but are not limited to $K^+$, $Na^+$, $Mg^{2+}$, $Ca^{2+}$, $Cl^-$. These ions may also be responsible for generating transient power, similar to the $H^+$ and $OH^-$ processes.

As defined herein, a bipolar membrane is an IX membrane composed of an anion-exchange layer and a cation-exchange layer. For the most common uses of conventional bipolar membranes, applying an electric bias helps facilitate rapid and efficient water dissociation inside the membrane to generate additional protons ($H^+$) and hydroxide ions ($OH^-$). Traditional electrodialysis cells must convert electronic power into ionic power. The present invention utilizes photoactive dyes to generate positively-charged and/or negatively-charged ions using solar energy, and upon transport of these ions and regeneration of the dyes, the solution or membrane has a change in net charge. The light-driven ion pumping membrane of the present invention bypasses the step of applying an external electric bias and converting electronic power into ionic power and will therefore thermodynamically save about 85% of the energy required by an electrodialysis cell, which in some embodiments, also drive electrodialysis of seawater to potable water.

As defined herein, tape casting, which is also known as doctor blading, is a casting process in which a thin layer of a casting material is disposed onto a flat surface.

Any of the modified IX membranes or bipolar membranes described herein may be used in an IX process such as desalination for treating wastewater, salt water, or any electrolyte solution. Desalination is an IX application known to one of ordinary skill in the art. Examples of which are disclosed in, but not limited to, U.S. Pat. No. 8,764,957, the specification of which is incorporated herein by reference. These membranes can be arranged in specific patterns and in desired quantities depending on the ultimate application and desired ion-transport processes.

Figure 1:
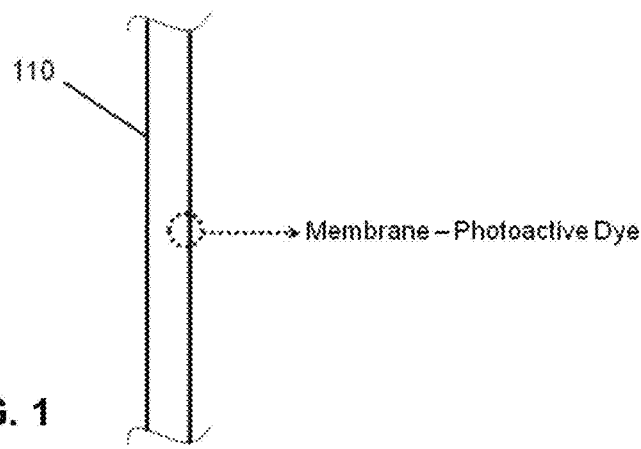
FIG. 1 shows a non-limiting embodiment of a modified membrane of the present invention.

Referring to FIG. 1, according to some embodiments, the present invention features an ion-pumping membrane system (100) for use in an IX process. The system may comprise an ion-exchange (110) having a photoactive dye covalently bound to said membrane (110). Without wishing to be bound by a particular theory or mechanism, upon exposure to a photon source, such as sunlight or ultraviolet or visible or near-infrared light, the photoactive dye is configured to undergo a regenerative and reversible light-driven dissociation or light-driven association reaction to generate a positively-charged ion and net a negatively-charged ion. In some embodiments, the photoactive dye may be covalently bound to at least a surface of the ion-exchange membrane (110). In other embodiments, the ion-exchange membrane (110) may be doped throughout with the photoactive dye.

Figure 3A:
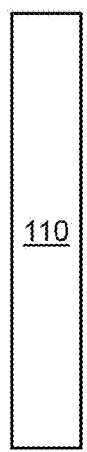
FIGS. 3A-3C depict non-limiting examples of possible membrane configurations.
Figure 3B:
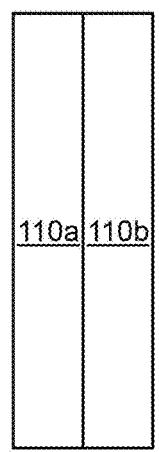

In some embodiments, the system may further comprise a second membrane juxtaposed or attached to the ion-exchange membrane, thus forming a membrane system (100) that is a bipolar membrane as shown in FIG. 3B. For example, the ion-exchange membrane may be a cation-exchange membrane (110a) and the second membrane may be an anion-exchange membrane (110b).

Figure 24:
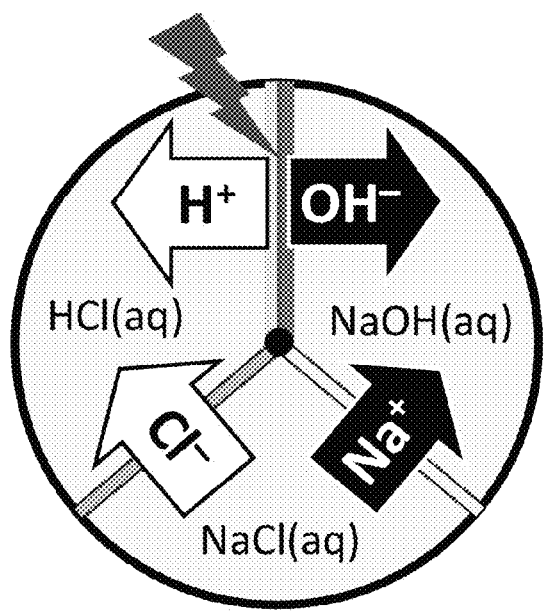
FIG. 24 shows a schematic representation of charge-transport processes that occur during electrodialysis or photodialysis. During electrodialysis, the lightning bolt represents an electric bias between the anode (left) and the cathode (right) (top vertical lines) to drive water electrolysis (1.5 $H_2O \rightarrow 0.25$ $O_2$ (left)+$H^+$ (left)+0.5 $H_2$ (right)+$OH^-$ (right)). During solar photodialysis, the lightning bolt represents visible light that is absorbed in PSBM (top vertical lines) to drive water dissociation ($H_2O \rightarrow H^+$ (left)+$OH^-$ (right)).

In some embodiments, the present invention may feature a desalination system comprising a desalination chamber, the two-layer membrane system described above, a second cation-exchange membrane, and a second anion-exchange membrane. In one embodiment, the membrane system, the second cation-exchange membrane, and the second anion-exchange membrane may be disposed in the desalination chamber such that the membranes partition the desalination chamber into three chamber sectors, as shown in FIG. 24. Further still, the cation-exchange membranes and the anion-exchange membranes may be arranged in an alternating pattern. During the IX process, fluids containing salt ions may be disposed within the desalination chamber, and photoexcitation of the photoactive dye in the dye-sensitized membrane causes the regenerative and reversible light-driven dissociation or light-driven association reaction to generate a positively-charged ion and net a negatively-charged ion, which enables transport of the salt ions in the chamber sector disposed between the second cation-exchange membrane and the second anion-exchange membrane to cross the respective membrane, thereby reducing the sat ion content from the fluids in said chamber sector.

In other embodiments, the ion-exchange membrane (110) may comprise a polymer membrane (110c) to which the photoactive dye is covalently bound. In some embodiments, the membrane system may further comprise a cation-exchange membrane (110a) and an anion-exchange membrane (110b), in addition to the polymer ion-exchange membrane (110).

Figure 3C:
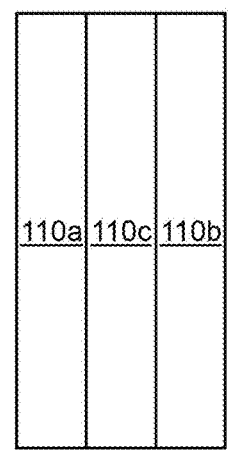

In one embodiment, the polymer ion-exchange membrane (110) (membrane (110c)) may be Juxtaposed or attached to the cation-exchange membrane (110a) and the anion-exchange membrane (110b), thus forming a membrane system (100) that is a three-layer bipolar membrane as shown in FIG. 3C. A desalination system comprising a desalination chamber, the aforementioned membrane system, a second cation-exchange membrane, and a second anion-exchange membrane is also provided herein. Similar to the embodiment shown in FIG. 24, the membrane system, the second cation-exchange membrane, and the second anion-exchange membrane may be disposed in the desalination chamber such that the membranes partition the desalination chamber into three chamber sectors, and where the IX process occurs as previously described. Preferably, the cation-exchange membranes and the anion-exchange membranes may also be arranged in an alternating pattern.

In other embodiments, the ion-exchange membrane (110c) may be disposed between the cation-exchange membrane (110a) and the anion-exchange membrane (110b), but not necessarily juxtaposed in between. According to another embodiment, the desalination system of the present invention may comprise a desalination chamber, the ion-exchange membrane (110c), the cation-exchange membrane (110a), and the anion-exchange membrane (110b). Similar to the embodiment shown in FIG. 24, the membranes may be disposed in the desalination chamber such that the membranes partition the desalination chamber into three chamber sectors, and where the IX process occurs as previously described.

Figure 25:
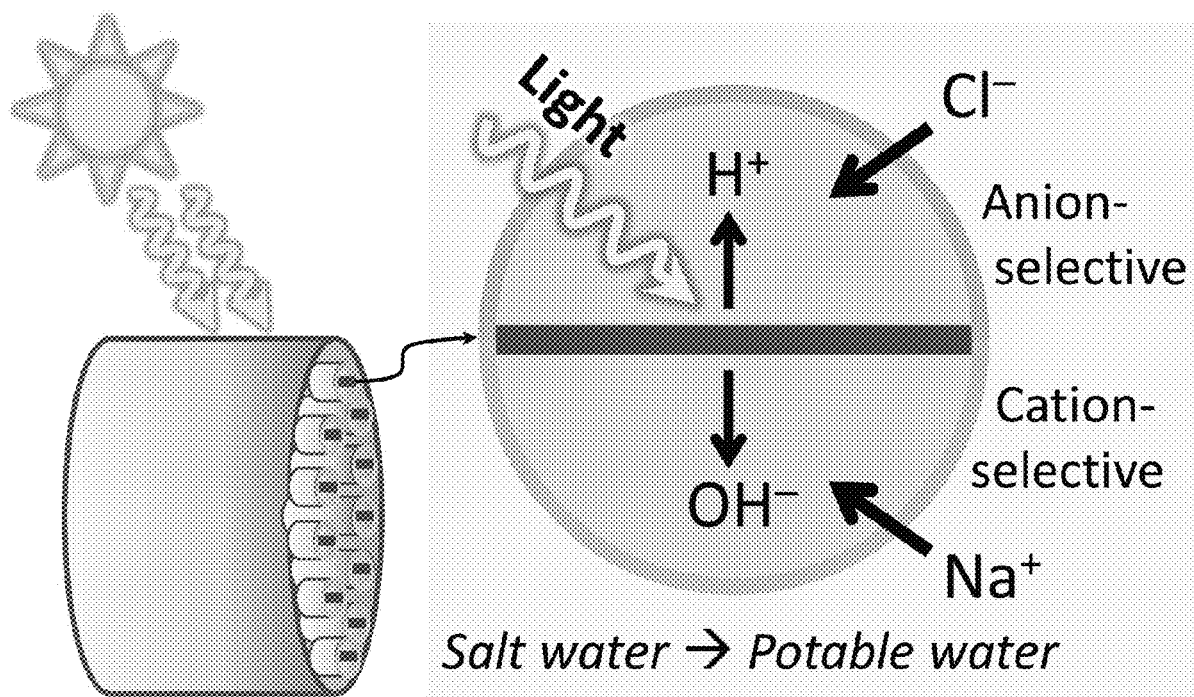
FIG. 25 depicts a plurality of capillary tubes in a bundle, each capillary tube having a cation-exchange membrane, an anion-exchange membrane, and an intervening photoacid-dye-sensitized polymer membrane transecting the tube. Photovoltaic action occurs upon photoexcitation of the acids, which causes salt ions to move from outside of the tube to inside the tube.

In further embodiments, the cation-exchange membrane (110a) may be connected edgewise to the anion-exchange membrane (110b) so as to form a cylindrical IX tube. The diameter of the IX tube can vary greatly, but to desalinate seawater to potable water using sunlight likely requires that the diameter of the IX tube be less than about 5 mm. This configuration of the desalination system may improve device efficiency by minimizing ohmic voltage losses. In some embodiments, the ion-exchange membrane (110c) may be disposed within the IX tube such that the ion-exchange membrane (110c) transects the cation-exchange membrane (110a) and the anion-exchange membrane (110b) at the edge connections, as shown in FIG. 25. Without wishing to be bound by a particular theory or mechanism, photoexcitation of the dye-sensitized membrane (110c) can enable transport of salt ions from outside the IX tube to inside the IX tube by crossing the respective cation-exchange membrane (110a) or anion-exchange membrane (110b). This overall design is analogous to that described above with the general design strategy of connecting one side of the ion-exchange membrane to the other side of the ion-exchange membrane by a continuous fluid that has at least one intervening ion-exchange membrane. In other embodiments, at least two intervening ion-exchange membranes may be used.

Another embodiment of the desalination system may comprise a desalination chamber and a plurality of the IX tubes. The plurality of IX tubes may be bundled together such that the IX tubes are parallel to each other. The bundle of IX tubes may be disposed within the desalination chamber. During the IX process, fluids containing salt ions are disposed within the desalination chamber, and photoexcitation of the photoactive dye in the dye-sensitized membrane (110c) of each IX tube causes the regenerative and reversible light-driven dissociation or light-driven association reaction to generate positively-charged ions and net negatively-charged ions, which enables transport of the salt ions in the fluid from outside the IX tubes to inside the IX tubes by crossing the respective cation-exchange membrane (110a) or anion-exchange membrane (110b), thereby reducing the salt ion content from the fluids outside each IX tube.

According to other embodiments, the present invention may feature a method of desalinating a fluid containing salt ions. The method may comprise adding said fluid to any of the desalination systems described herein, such that the fluid is disposed in a desalination chamber of said system and contacts the membranes. The method further comprises exposing the dye-sensitized membrane to a photon source, which causes the photoactive dye in the dye-sensitized membrane to undergo a regenerative and reversible light-driven dissociation or light-driven association reaction to generate a positively-charged ion and net a negatively-charged ion that enable transport of the salt ions from the fluid, thereby reducing the salt ion content of the fluid.

Consistent with previous embodiments, the present invention features a photoactive dye for generating ions upon exposure to a photon source. Without wishing to be bound to a particular theory or mechanism, the photoactive dye is configured to undergo a regenerative and reversible light-driven dissociation or light-driven association reaction to generate to generate a positively-charged ion and net a negatively-charged ion. Preferably, the photoactive dye is capable of being covalently bound to a substrate, such as a polymer or ion-exchange membrane. Consistent with previous embodiments, the photoactive dye may be a photoacid, a photobase, or a dye capable of performing light-driven ion release or capture. Further details of the photoactive dyes will be provided in later sections, and brief examples of said photoactive dyes are described as follows.

For example, the photoactive dye may be a photoacid that is regenerative and reversible such that upon exposure to the photon source, the photoacid undergoes the light-driven dissociation or light-driven association reaction to generate a proton for use in the IX process, and wherein the photoacid generates a hydroxide ion upon regeneration. Examples of the photoacid include, but are not limited to the following:

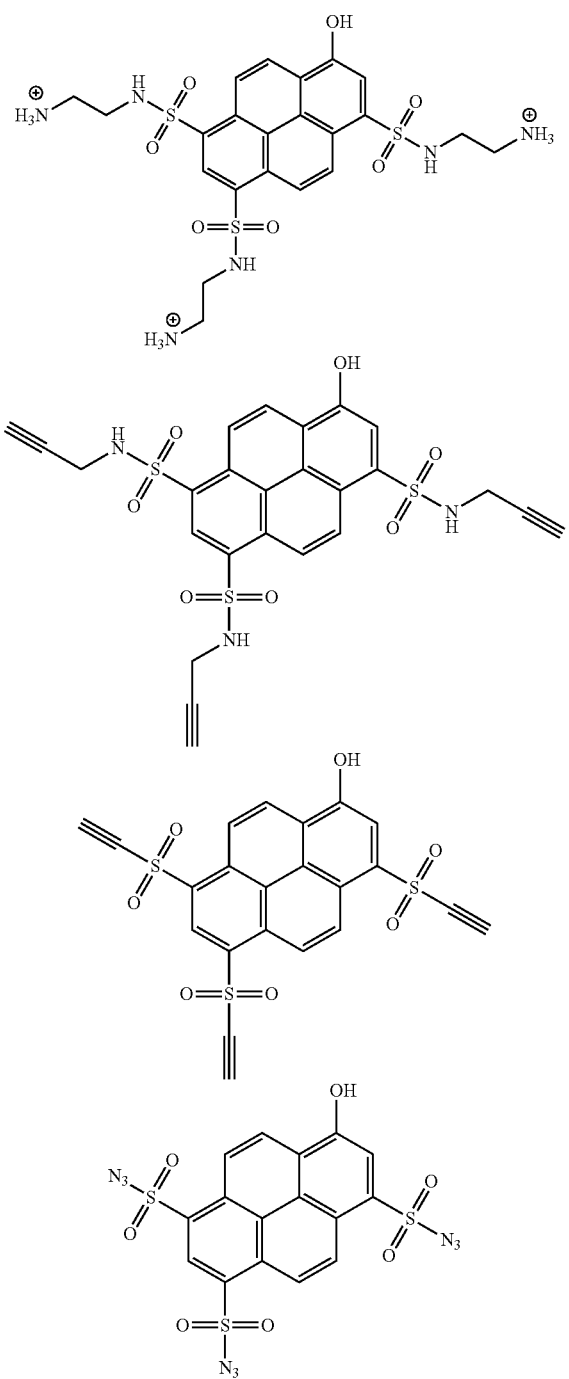

11
-continued
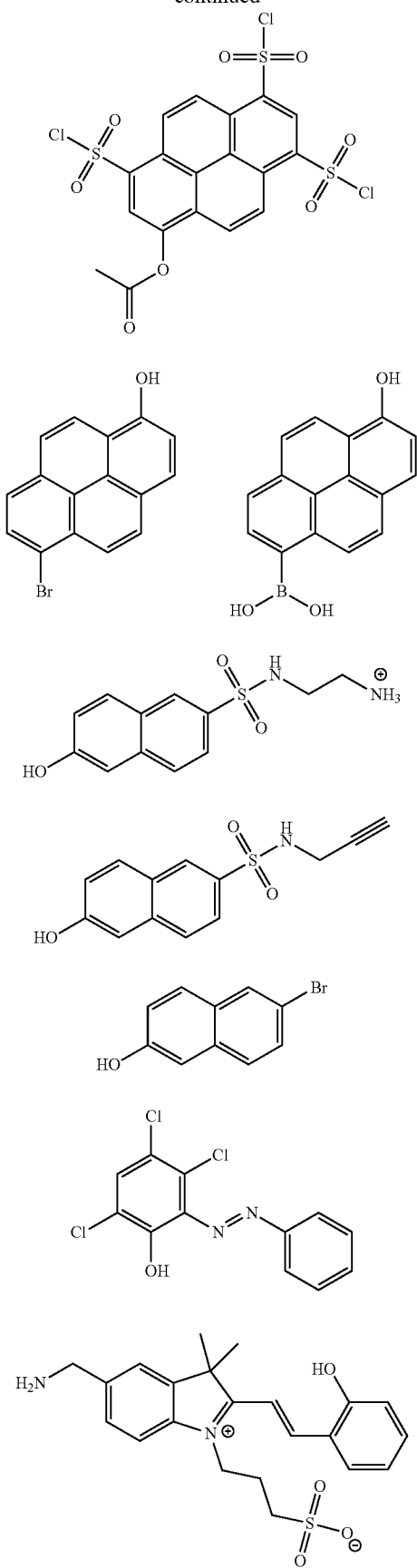
12
-continued
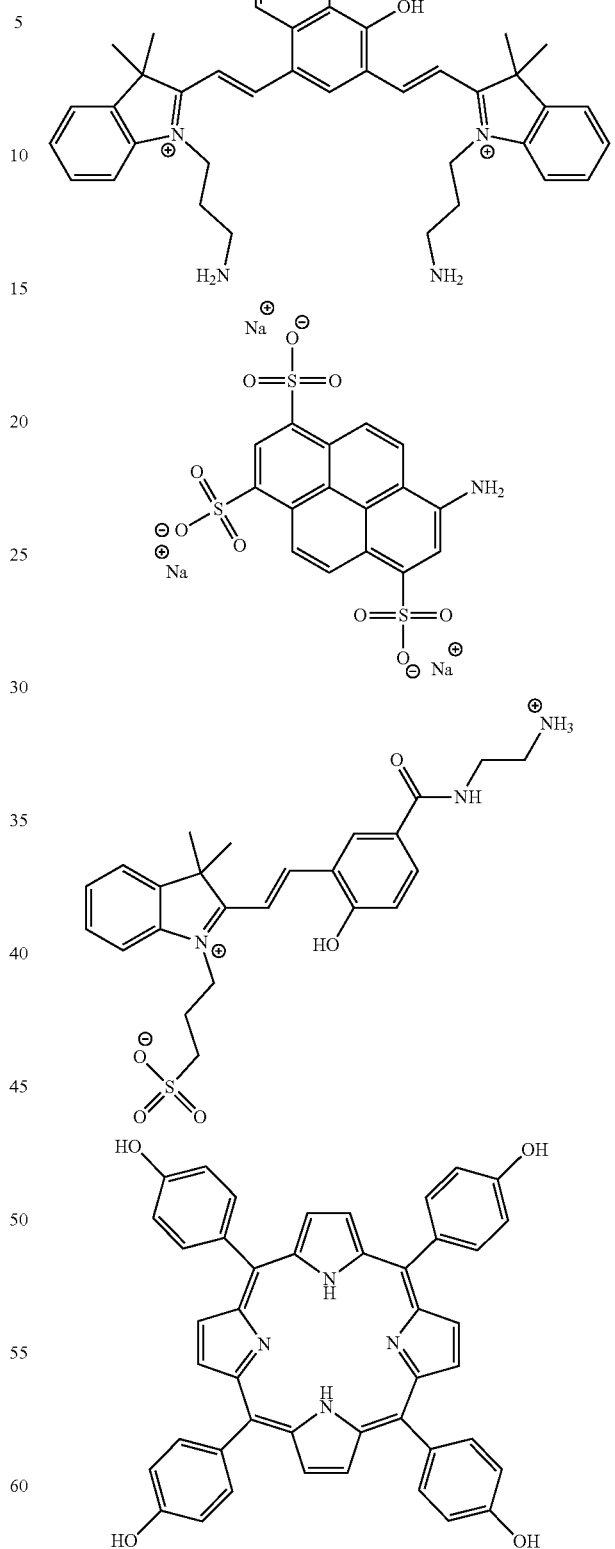
In other embodiments, the photoacid may comprise a donor core and at least one acceptor component bound to the donor core. In some embodiments, the photoacid may comprise 1, 2, or 3 acceptor components bound to the donor core. Non-limiting examples of the acceptor component include the following:

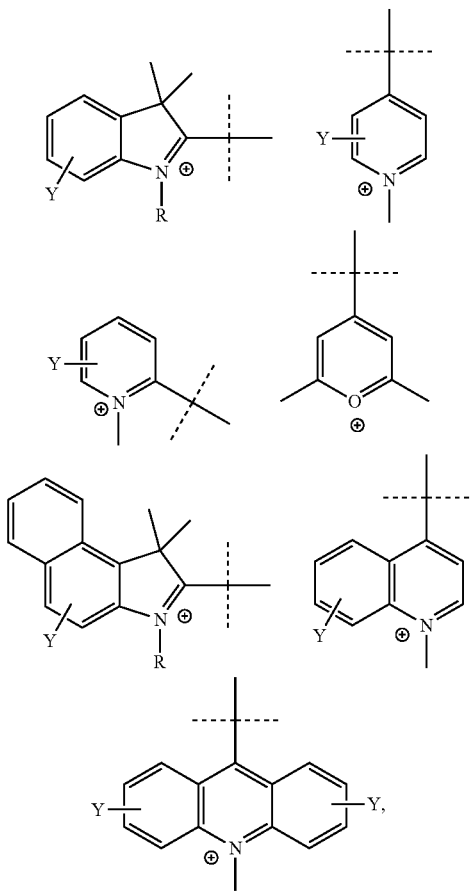

where Y=—H, —CN, —SO$_3^-$,

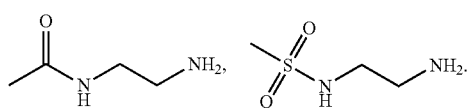

In some embodiments, the donor core may according to any one of the following structures:

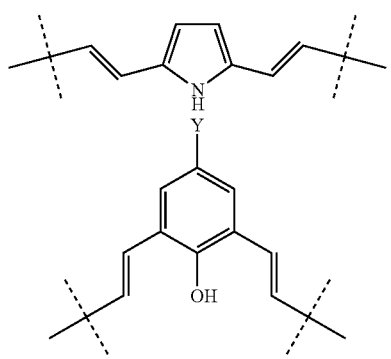

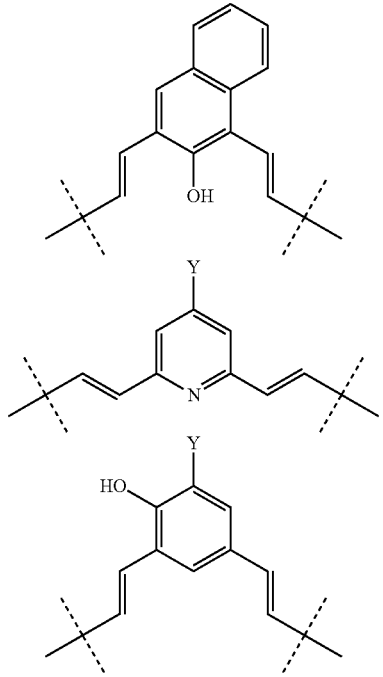

where Y=—H,

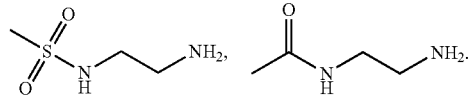

Figure 26:
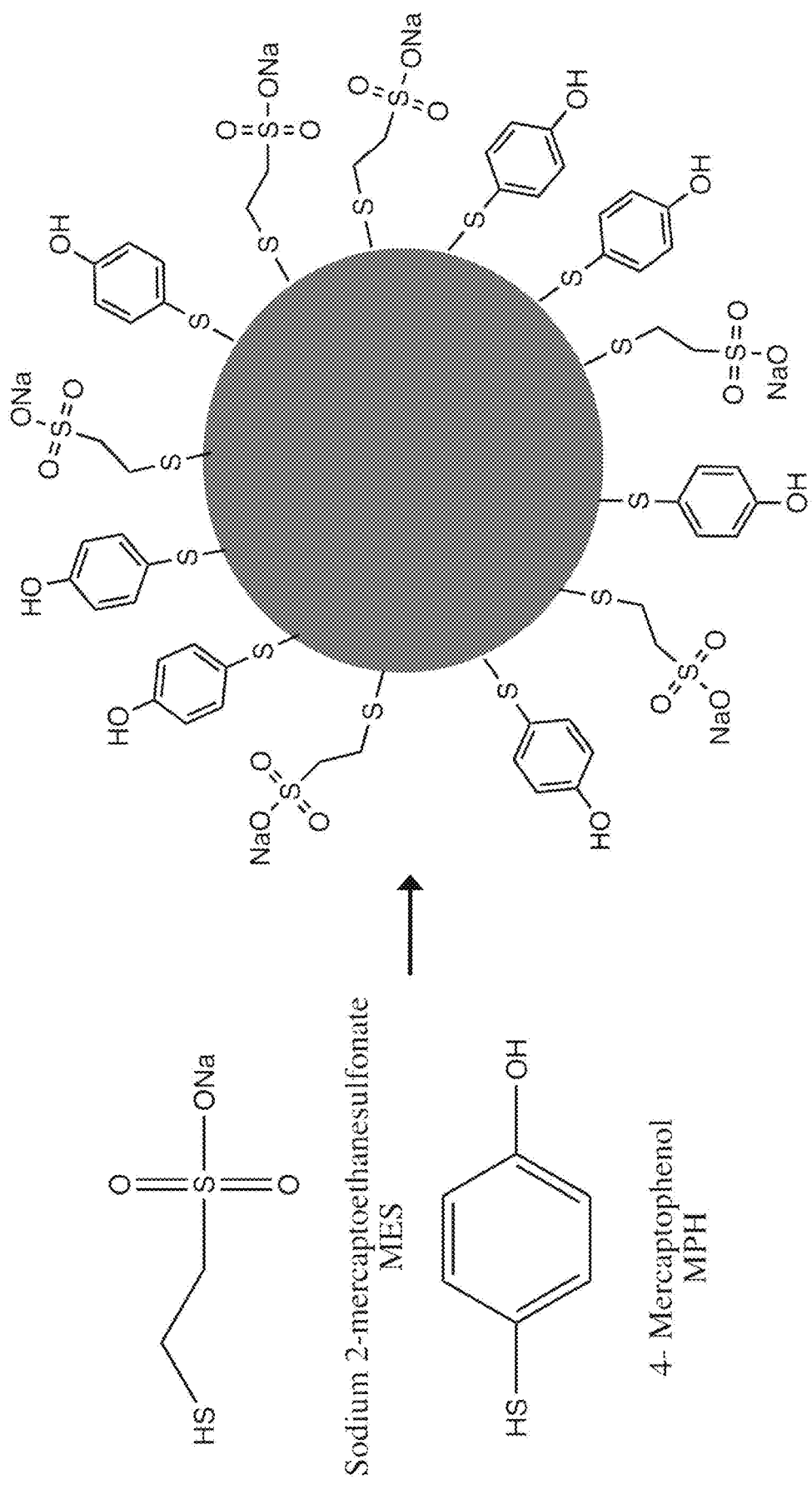
FIG. 26 shows a photoacidic quantum dot.

In other embodiments, the photoactive dye may be a photoacidic quantum dot having a plurality of ligands. In one embodiment, the ligands may have hydroxyl and/or sulfonate groups. An example of photoacidic quantum dot is shown in FIG. 26.

According to other embodiments, the photoactive dye may a photobase that is regenerative and reversible such that upon exposure to the photon source. The photobase can undergo the light-driven dissociation or light-driven association reaction to generate a hydroxide ion for use in the IX process, and the photobase generates a proton upon regeneration. In some embodiments, the photobase may be any one of the following compounds:

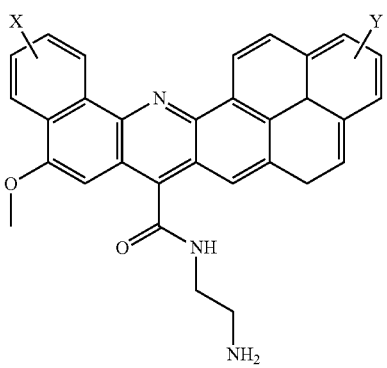

-continued
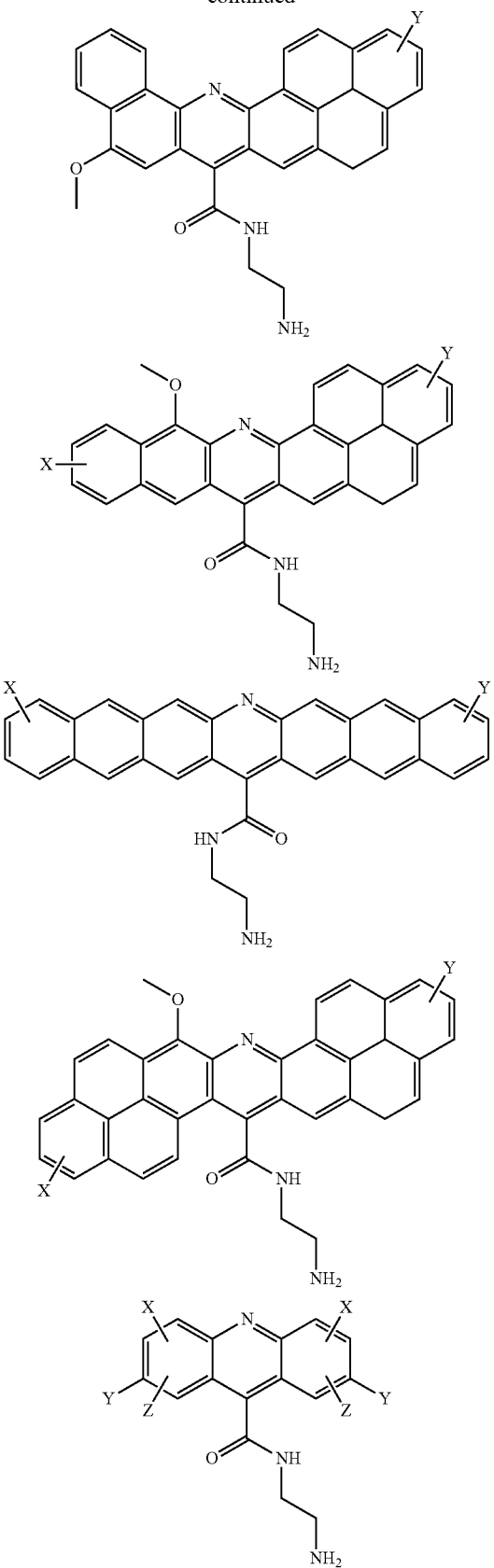
where X, Y=—H, —CH₃, —OCH₃.
According to other embodiments, the photoactive dye may be a photoacidic inorganic metal complex according to any one of the following structures:
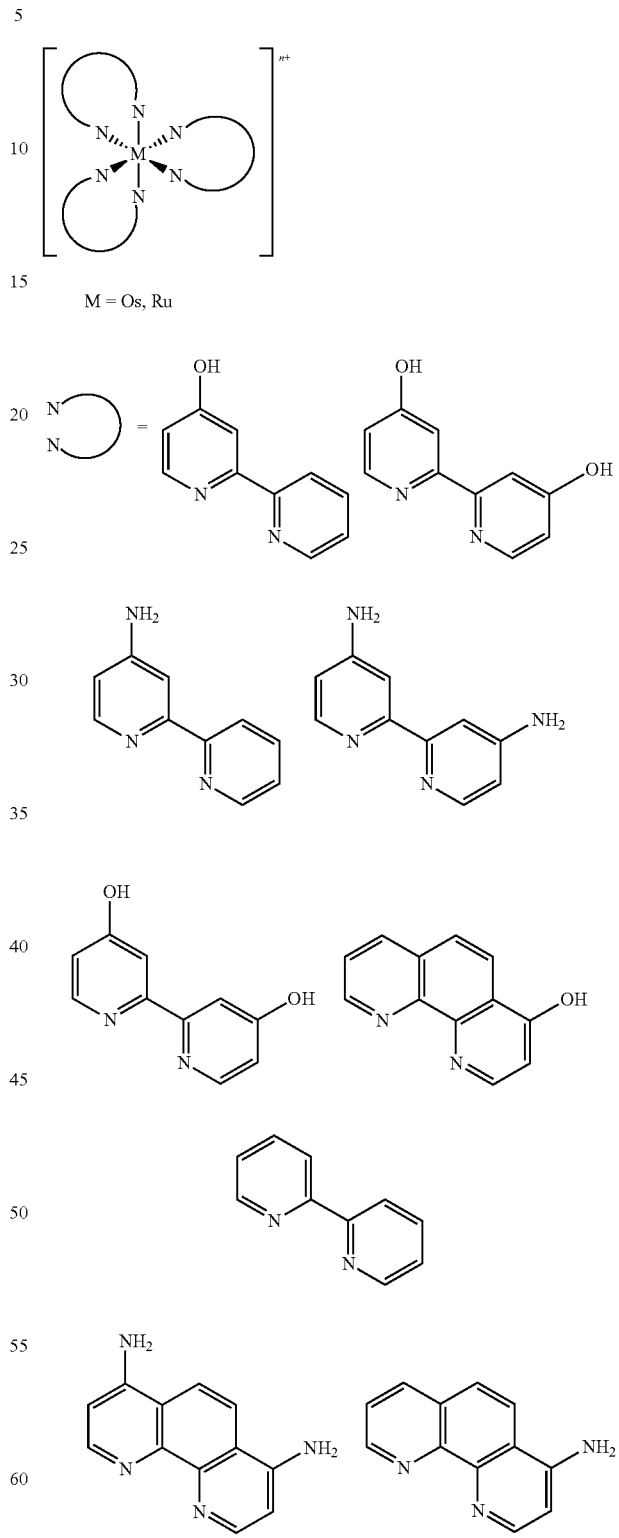
M = Os, Ru
Non-limiting examples of the photoacidic inorganic metal complex according to the structure above include the following:

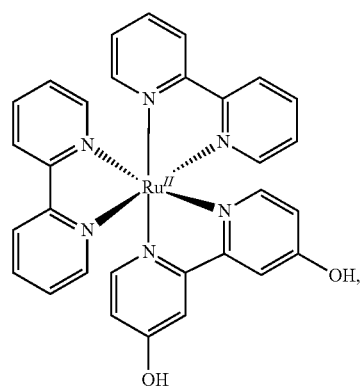
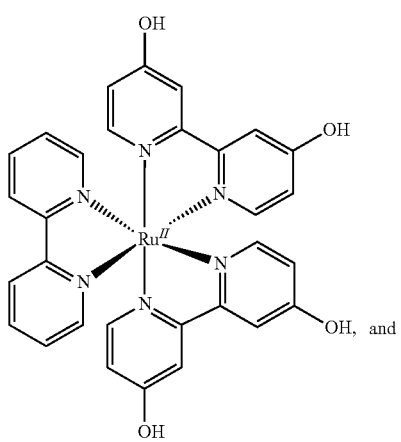
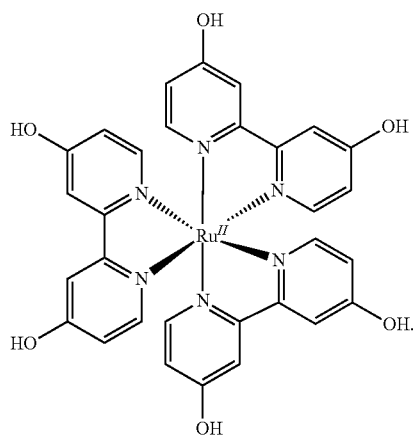
In still other embodiments, the photoacidic inorganic metal complex may be according to any one of the following structures:
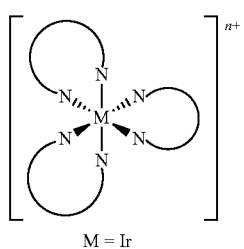
M = Ir
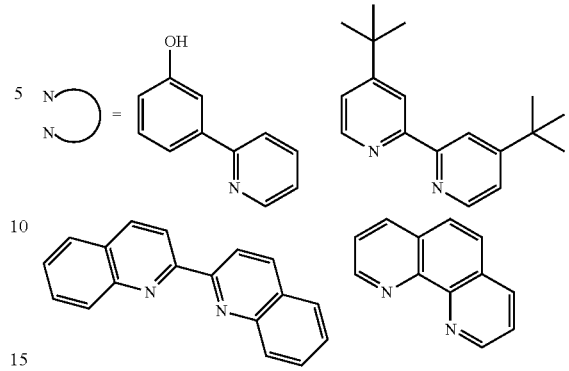
Non-limiting examples of the photoacidic inorganic metal complex according to the structure above include the following:
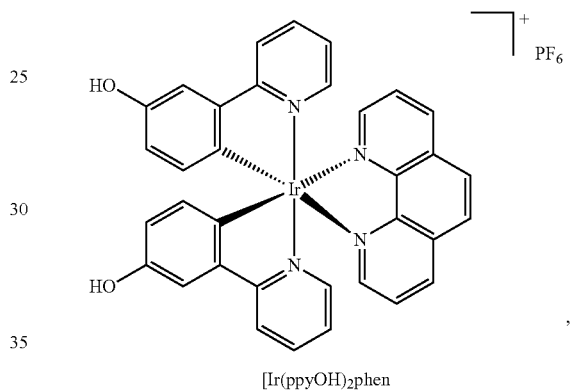
[Ir(ppyOH)$_2$phen
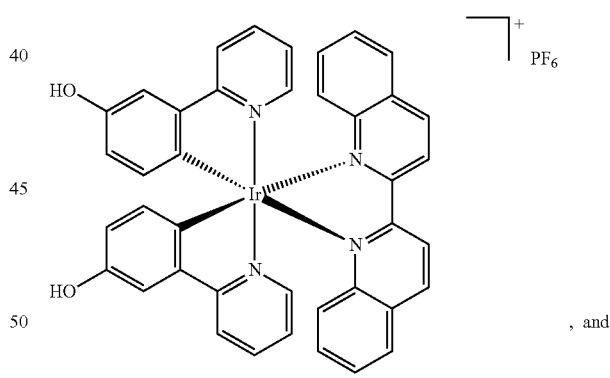
[Ir(ppyOH)$_2$bq
, and
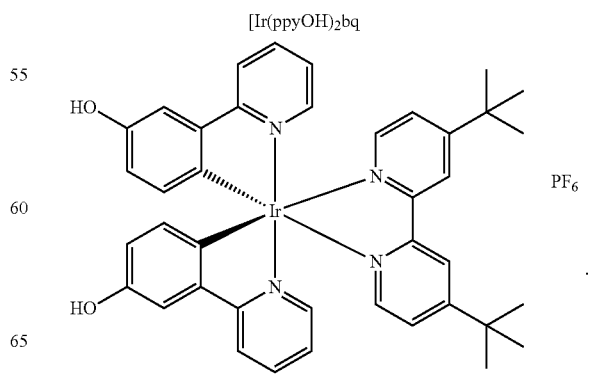

In other embodiments, the photoacidic inorganic metal complex may comprise a metal group and a dithiol ligand modified with a protonated group. The metal group may be a Pt, Pd, or Ni, and the protonated group may be a —OH or —NH$_3^+$. Non-limiting examples of metal complexes that may be modified with a protonated group (not shown) include the following:

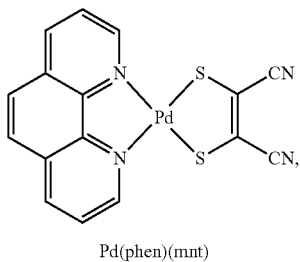

Pd(phen)(mnt)

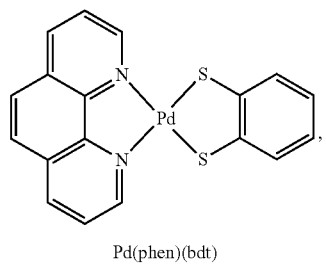

Pd(phen)(bdt)

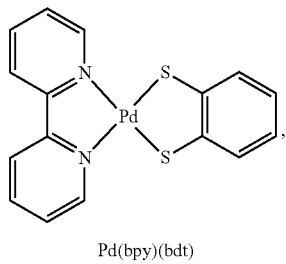

Pd(bpy)(bdt)

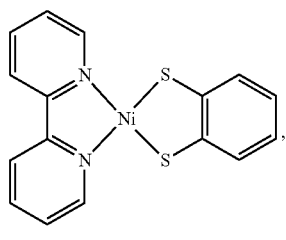

Ni(bpy)(bdt)

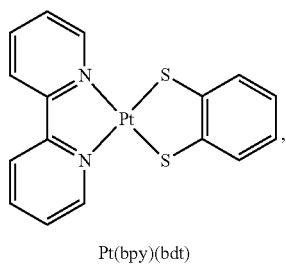

Pt(bpy)(bdt)

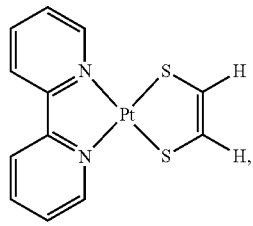

Pt(bpy)(edt)

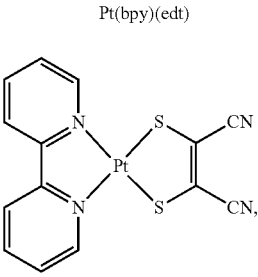

Pt(bpy)(mnt)

In alternative embodiments, the photoactive dye may be a photobasic inorganic metal complex that is regenerative and reversible such that upon exposure to the photon source, the photobasic inorganic metal complex undergoes a light-driven dissociation or light-driven association reaction to generate a hydroxide ion for use in the IX process, and generates a proton upon regeneration. Examples of the photobasic inorganic metal complex include, but are not limited to the following:

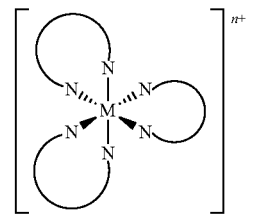

M = Os, Ru

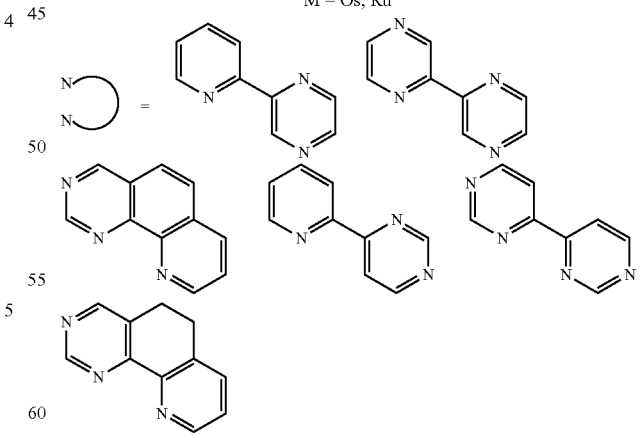

According to other embodiments, the present invention features a method of preparing an ion-exchange membrane for use in an IX process. In one embodiment, the method may comprise providing a photoactive dye, and adding the photoactive dye to a membrane such that the photoactive dye covalently binds to the membrane, via a coupling reaction, to form the ion-exchange membrane. In some embodiments, the membrane may be a polymer film, cation-exchange membrane, or anion-exchange membrane.

In another embodiment, the invention features a method of preparing a bipolar membrane for use in an IX process. The method may comprise providing a photoactive dye, adding the photoactive dye to a cation-exchange membrane such that the photoactive dye covalently binds to the cation-exchange membrane, via a coupling reaction, to form a dye-sensitized membrane, placing the dye-sensitized membrane on an anion-exchange membrane to form a two-layered structure, and heat pressing the two-layered structure to form the bipolar membrane. Alternatively, the photoactive dye can be covalently bonded to the anion-exchange membrane.

In some embodiments, the two-layered structures may be heat pressed at a temperature ranging from about 95-160° C. for a time period of about 20-40 minutes. For examples, the two-layered structures may be heat pressed at a temperature of 150° C. for a time period of about 30 minutes. In further embodiments, the two-layer bipolar membrane structure may be fabricated from one IX membrane by selective functionalization. In one embodiment, the photoacid dye may be covalently bound to at least one surface of the cation-exchange membrane. In an alternative embodiment, the photoactive dye may be covalently bound to at least one surface of an anion-exchange membrane, and then this dye-modified membrane may be placed on a cation-exchange membrane.

In a further embodiment, the method of preparing a bipolar membrane may comprise providing a photoactive dye, adding the photoactive dye to a polymer membrane such that the photoactive dye covalently binds to the polymer membrane, via a coupling reaction, to form a dye-sensitized membrane, casting the dye-sensitized membrane on an anion-exchange membrane, placing a cation-exchange membrane on the dye-sensitized membrane casted on the anion-exchange membrane such that the dye-sensitized membrane is juxtaposed between the anion-exchange membrane and the cation-exchange membrane to form a three-layered structure, and annealing the three-layered structure to form the bipolar membrane. In one embodiment, the photoactive dye may be covalently bound to at least a first surface and a second surface of the polymer membrane. In another embodiment, the polymer membrane may be doped with the photoactive dye.

In some embodiments, the dye-sensitized membrane may be casted on the anion-exchange membrane via doctor blading. In other embodiments, the three-layered structure is annealed at a temperature ranging from about 95-170° C. for a time period of about 20-40 minutes. In further embodiments, the anion-exchange membrane and cation-exchange membrane may be wetted with N,N-dimethylformamide prior to casting the dye-functional membrane. In further embodiments, the three-layer bipolar membrane structure may be fabricated from one or two IX membranes by selective functionalization.

Consistent with the methods described above, the photoactive dye may be regenerative and reversible such that upon exposure to a photon source, the photoactive dye undergoes a light-driven dissociation or light-driven association reaction to generate a positively-charged ion or a negatively-charged ion for use in the IX process, and wherein the photoactive dye net generates a second ion of opposite charge upon regeneration.

Consistent with previous embodiments of the invention, the photoactive dye may be covalently bound to the membrane using coupling reactions. Examples of the coupling reaction that may be utilize include, but are not limited to, S—N coupling with amines and sulfonyl halides (e.g. sulfonyl fluoride and sulfonyl chloride), C—N coupling with amines and carboxylic acids or carboxylic acid derivatives (e.g. acyl halides, acyl azides, acylimidazoles, anhydrides, and active esters), click chemistry (e.g. azide and alkyne cycloaddition), palladium cross coupling (e.g. Suzuki, Miyaura, Suzuki-Miyaura, Hiyama, and Negishi reactions), electrophilic substitutions (e.g. Friedel-Crafts reactions), and nucleophilic substitutions (e.g. Wiliamson ether synthesis).

It is desirable that any of the polymer and/or IX membranes described herein is constructed from an ion-conductive or ion-selective material. In some embodiments, the polymer and IX membranes can be synthesized from a polymer material. Preferably, the polymer material possesses molecules having available functional groups that allow for covalent attachment to the photoacid. Examples of the polymer material include, but are not limited to, polyethylene terephthalate, polyacrylic acid, poly(acrylic acid-butyl methacrylate) triblock copolymer, polyphenylene oxide, polystryrene, polyimide, polylactic acid, and polyvinylalcohol crosslinked with glutaraldehyde. However, it is understood that other polymer materials may be used in accordance with the present invention. In other embodiments, the membranes may be synthesized from solid-state ion conductor materials, which are known to one of ordinary skill in the art. Examples of said solid-state ion conductors include, but are not limited to, stabilized zirconias such as doped $ZrO_2$, NASICON, iodides such as AgI, CuI, $RbAgI_2$, and $Ag_2HgI_4$, β-alumina, and fluoride ion conductors such as $CaF_2$. However, it is understood that other solid-state ion conductor materials may be used in accordance with the present invention. In further embodiments, the polymer and/or IX membranes described herein may be a water permeable membrane.

Photoactive Dyes

The following examples of photoactive dyes and syntheses thereof are not intended to limit the invention in any way. Equivalents or substitutes are within the scope of the invention.

Photoacids

As defined herein, a photoacid is a molecule that becomes more acidic when it undergoes a reversible light-driven dissociation or light-driven association upon absorbing photons. Photoacids differ from photoacid generators (PAGs) in that PAGs undergo photodissociation irreversibly.

In one embodiment, a visible-light-absorbing photoacid dye molecule that resembles hydroxypyrene with free amine groups that can be bound to polymers was synthesized. Specifically, a congener of the state-of-the-art visible-light-absorbing organic photoacid, pyranine, was synthesized by appending three amine groups to its hydroxypyrene core to allow for covalent attachment to polymers. As illustrated in Scheme 1, first, the alcohol group of the tris(sulfonato) hydroxypyrene (pyranine) starting material is protected, then the three sulfonates were activated to sulfonyl chlorides, and then converted to sulfonamide groups using N-Boc-ethylenediamine followed by deprotection using trifluoroacetic acid.

Scheme 1
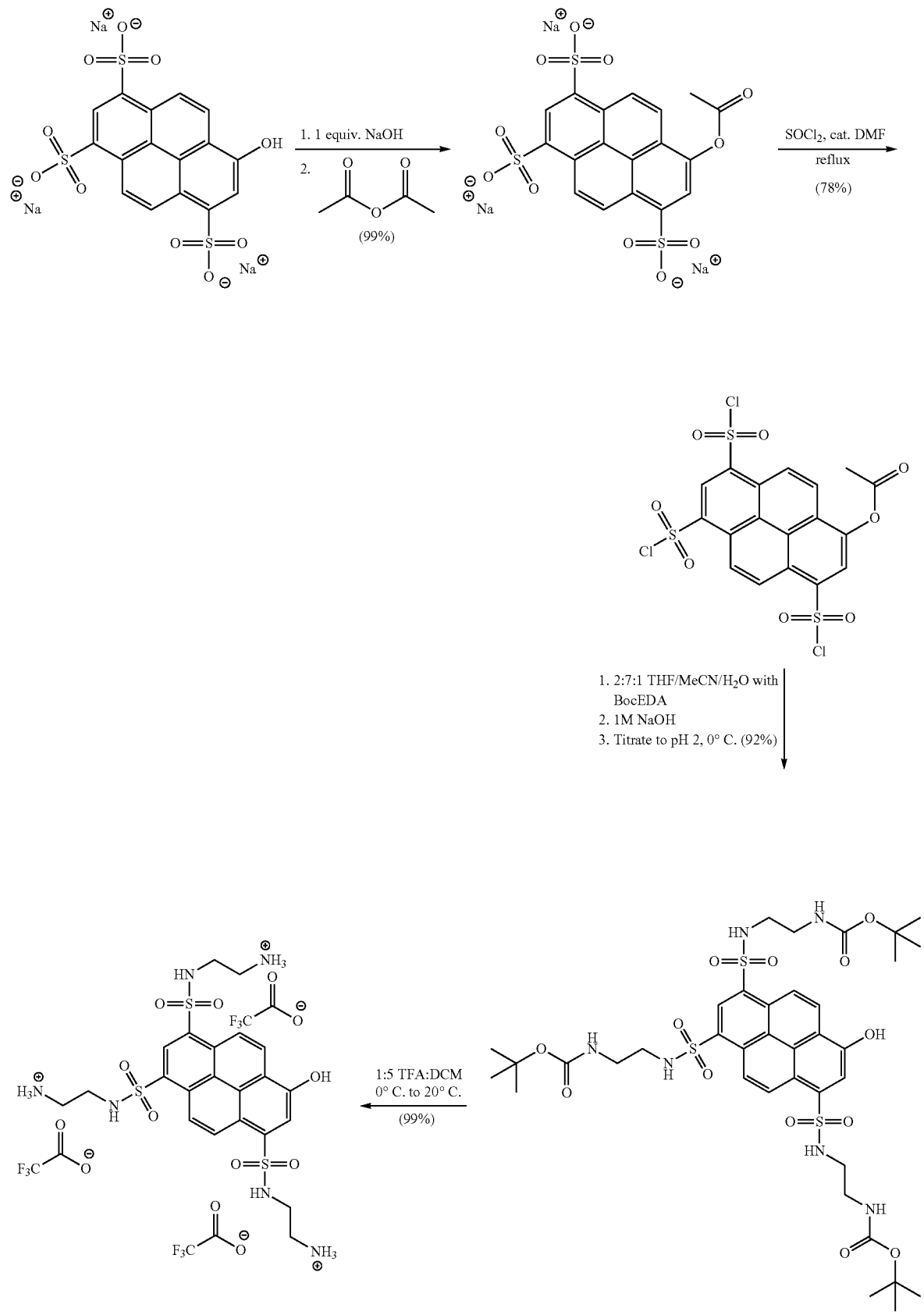

In some embodiments, the photoacid dye molecule may comprise an 8-Aminopyrene-1,3,6-trisulfonic acid trisodium. A non-limiting reaction scheme of synthesizing said photoacid may be according to Scheme 2:

Scheme 2

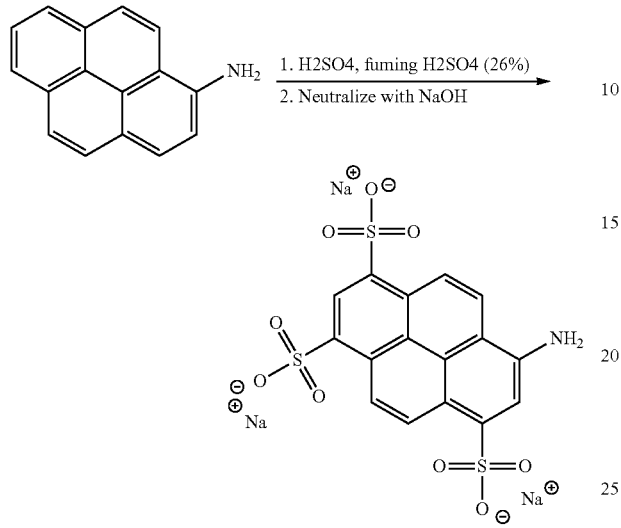

In other embodiments, the photoactive dye may be a strong photoacid comprising an "Acceptor-Donor-Acceptor" structure. Non-limiting example of acceptors include the following:

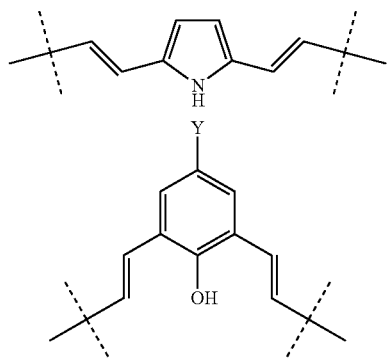

where Y=—H, —CN, —SO$_3^-$,

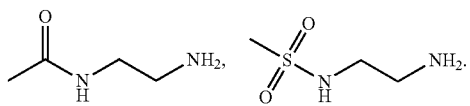

Examples of donors include, but are not limited to, the following:

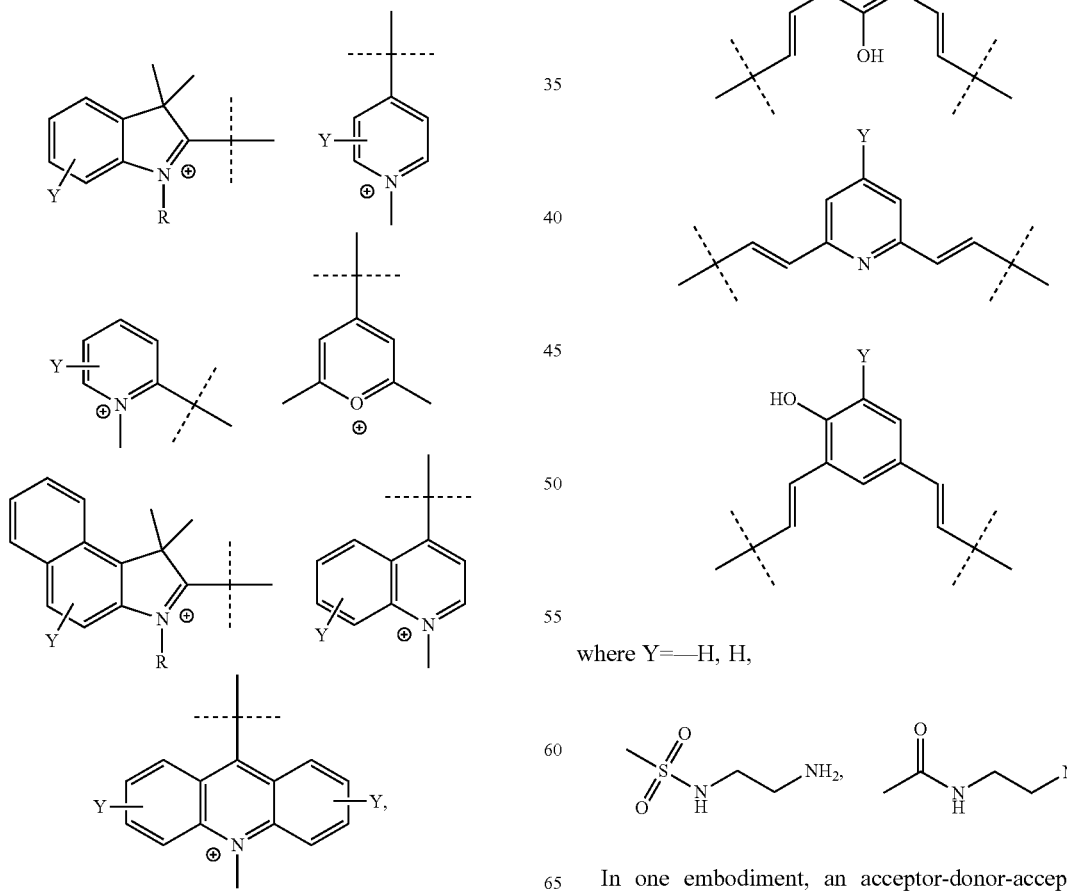

where Y=—H, H,

In one embodiment, an acceptor-donor-acceptor photoacid with a phenol donor core may be synthesized according to Scheme 3.

Scheme 3:
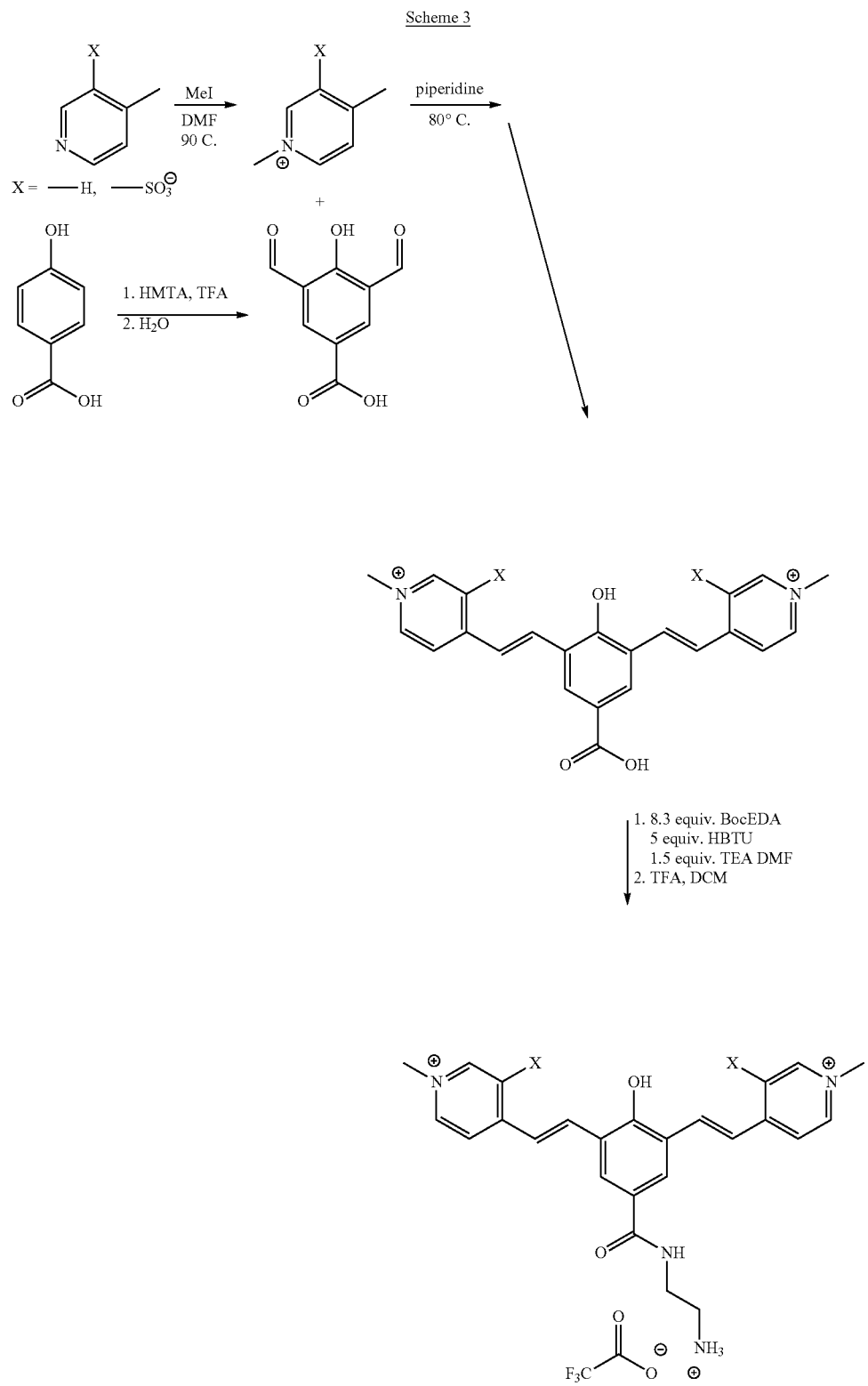
In another embodiment, an acceptor-donor-acceptor photoacid with a pyrrole donor core may be synthesized according to Scheme 4.

Scheme 4
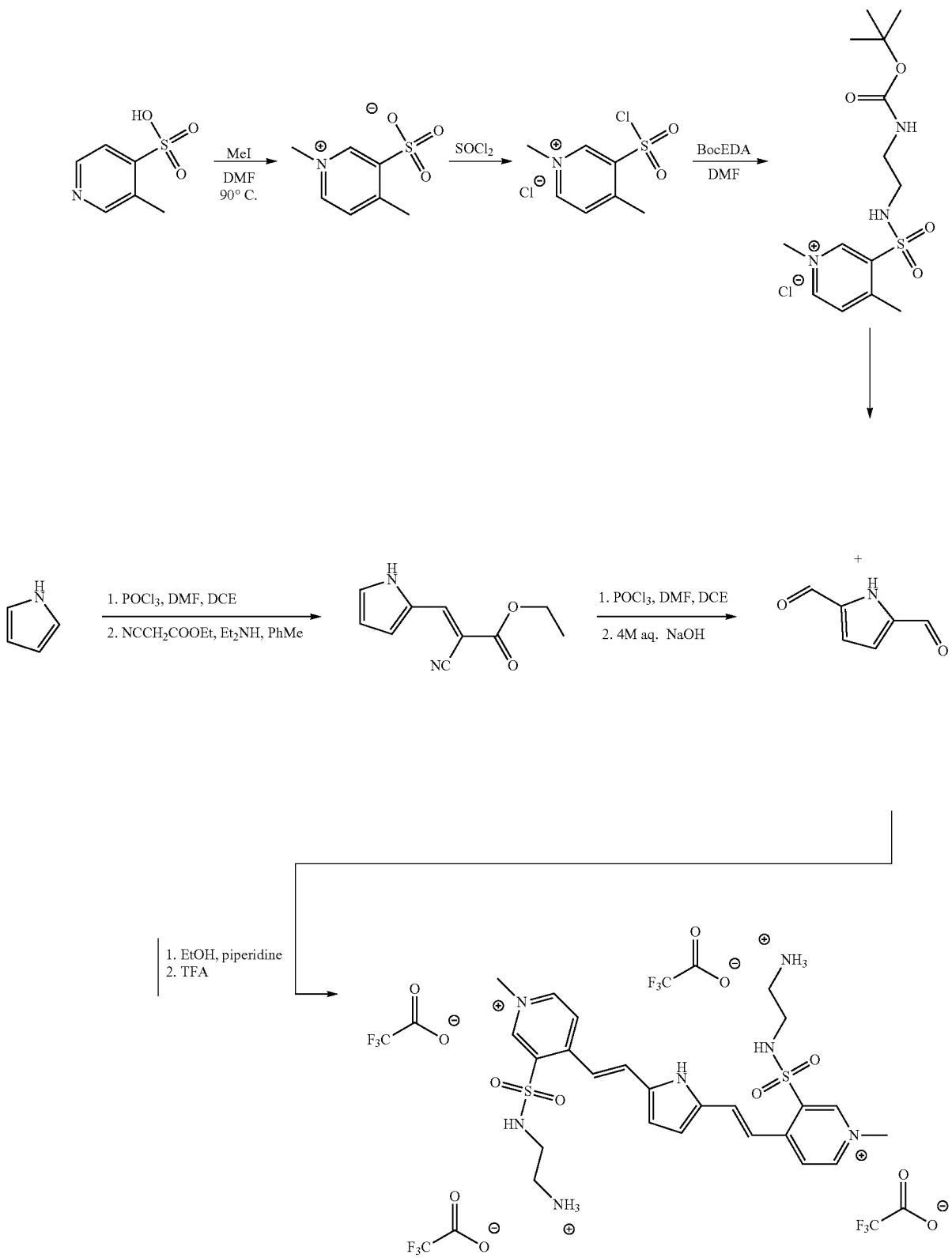
In other embodiments, the photoacid dye molecule may have a long half-life in the proton-dissociation state. A non-limiting reaction scheme of synthesizing said photoacid may be according to Scheme 5:

Scheme 5
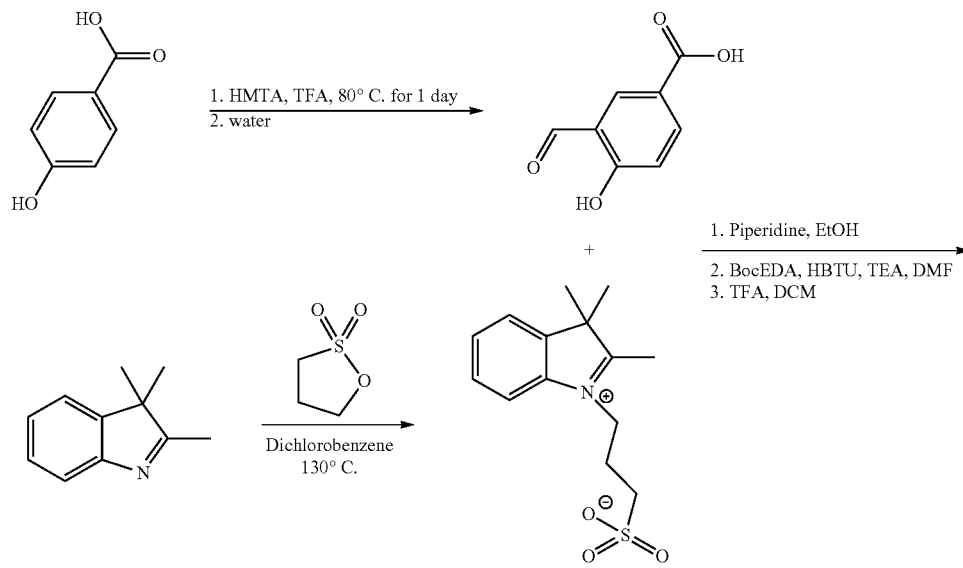
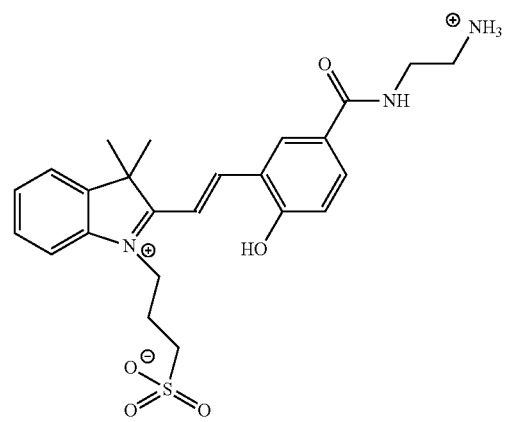

In further embodiments, the photoacid may be according to any of the following structures:
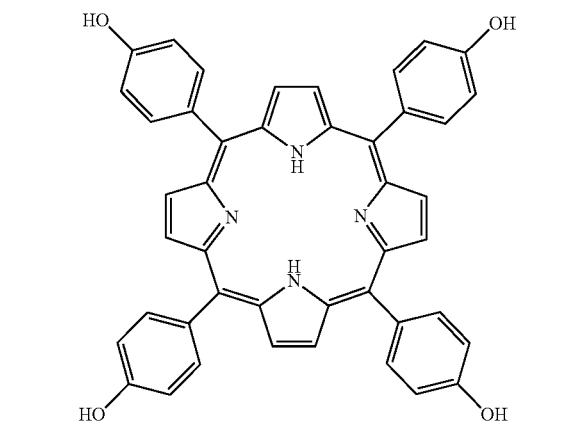
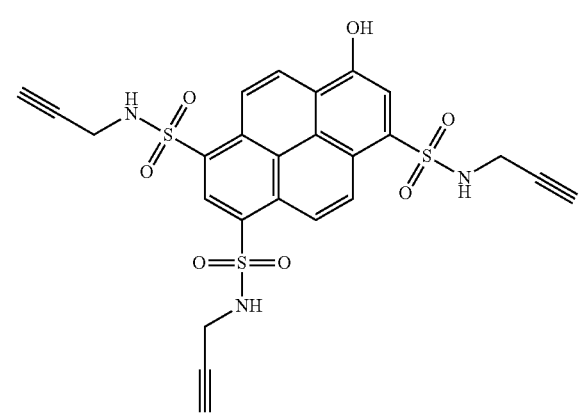
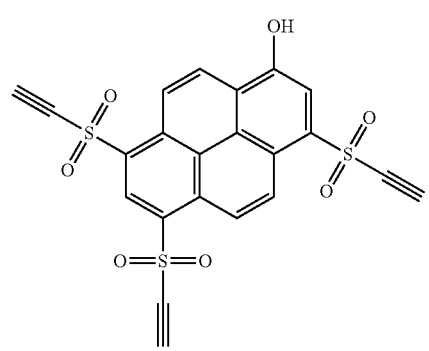
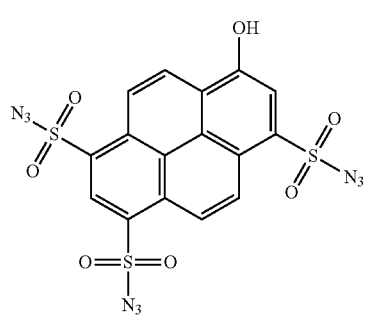
-continued
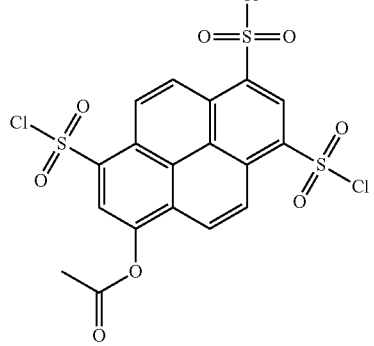
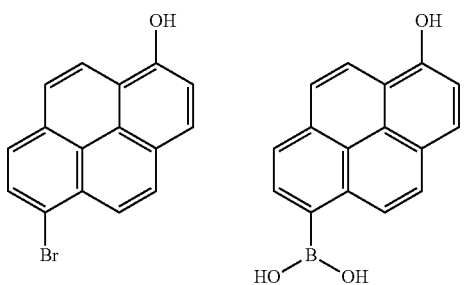
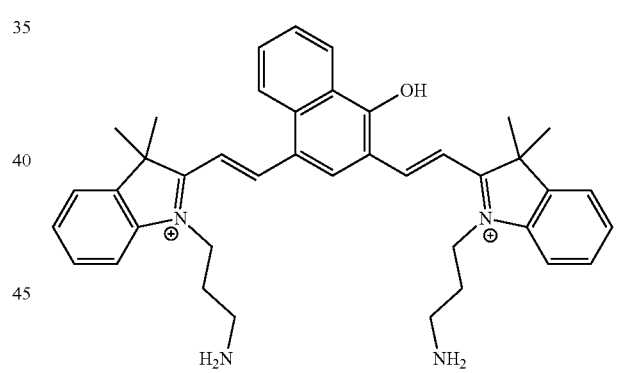
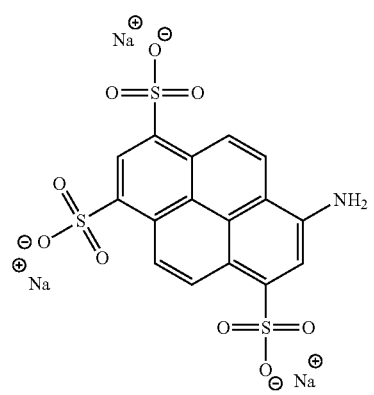

-continued

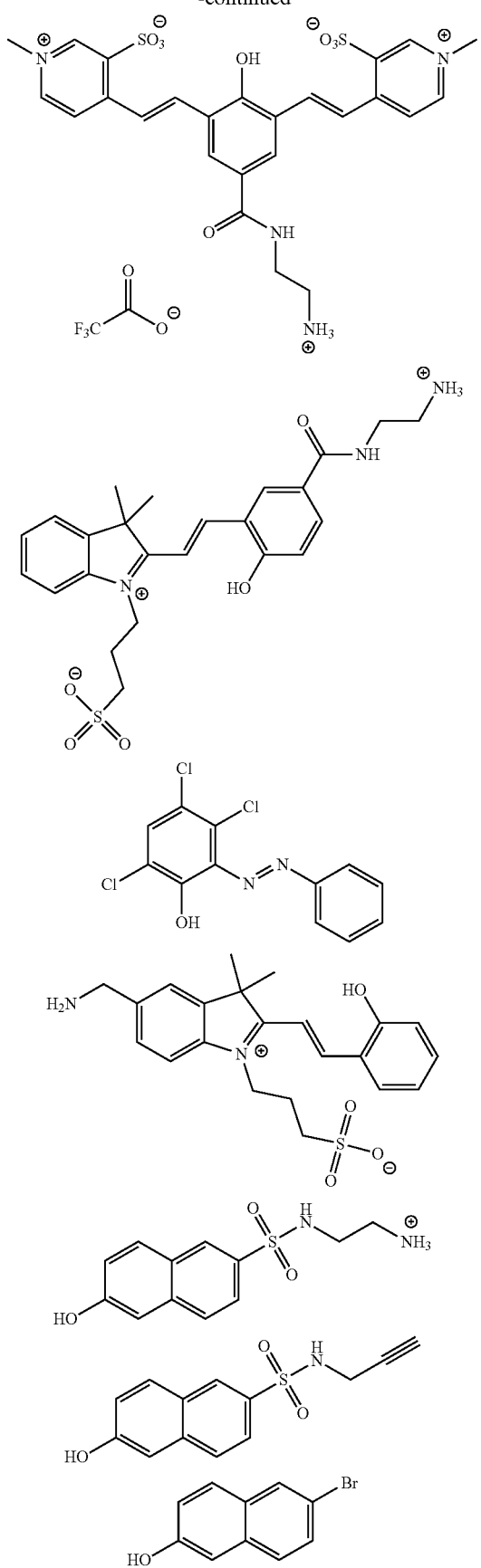

In alternative embodiments, the photoacid may comprise compounds such as quantum dots. A non-limiting example of a quantum dot photoacid is shown in FIG. 26.

In other alternative embodiments, the photoacid may comprise compounds such as inorganic coordination compounds. Without wishing to be bound by a particular theory or mechanism, the use of inorganic compounds as a photoacid, and alternatively as a photobase, is enabled by a photoreaction where the inorganic compound absorbs light, an electron moves from or to a metal of the inorganic compound and to or from a ligand of the inorganic compound. The end location of the electron will most likely be a more basic site and the initial location of the electron will most likely be a more acidic site. For instance, phenanthroline can have an $NH_2$ group that receives an electron where —$NH_2$+$H^+$→—$NH_3^+$. Other examples of common acceptor ligands include bpy or bq, which also have a series of energies. In some embodiments, the electron can often originate on the metal and thus, the functional group that loses a proton should be bound to the metal. In other embodiments, if a coordination compound is insoluble in water soluble, then said compound can be made water soluble by adding an —$SO_3$ group, or the compound can be bound to a polymer and immersed in water as an insoluble film.

In some embodiments, the photoacidic inorganic compounds may be according to the following:

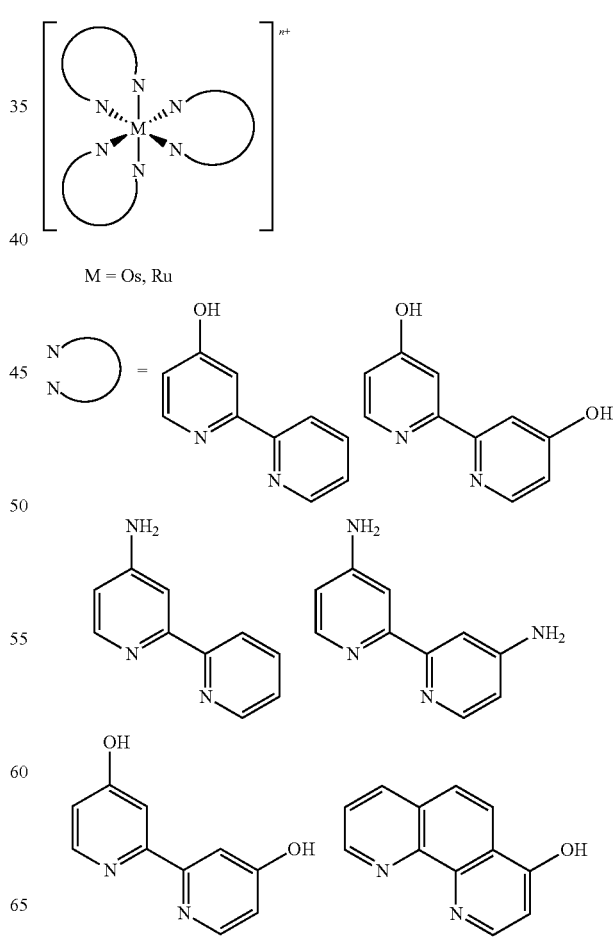

M = Os, Ru

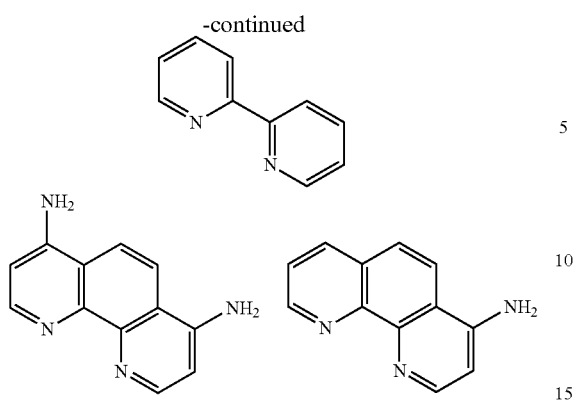

In other embodiments, the photoacidic inorganic compounds may comprise a hydride bound to a metal, such as Ir or Ru. The photoacidic inorganic compounds may comprise a ligand that can donate electron density to the metal so that photoexcitation results in more oxidation of the ligand than the metal. In one embodiment, the inorganic compounds having ligands that can donate electron density may be according to the following:

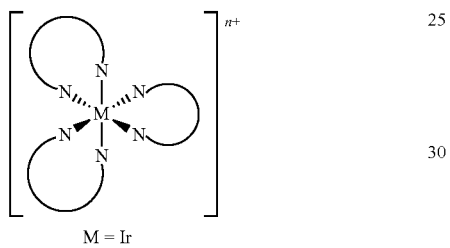

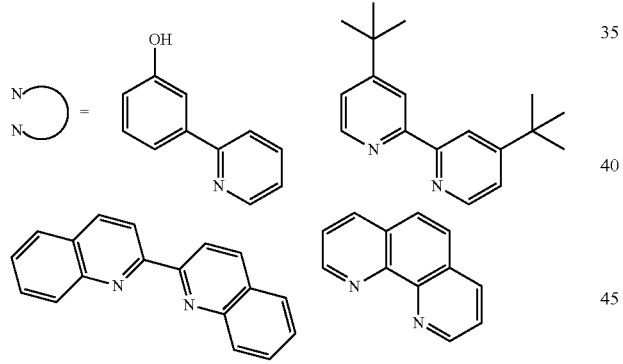

Non-limiting examples of photoacidic inorganic compounds include the following:

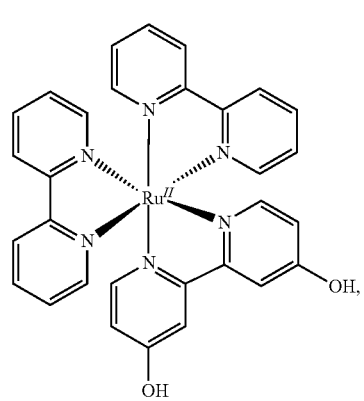

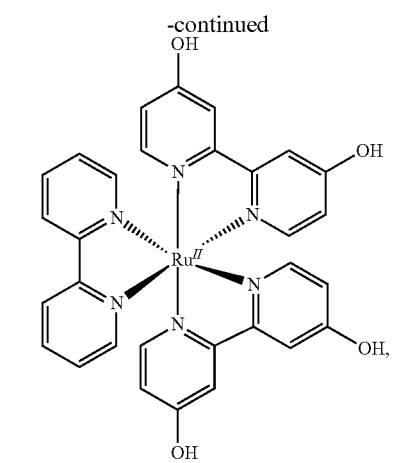

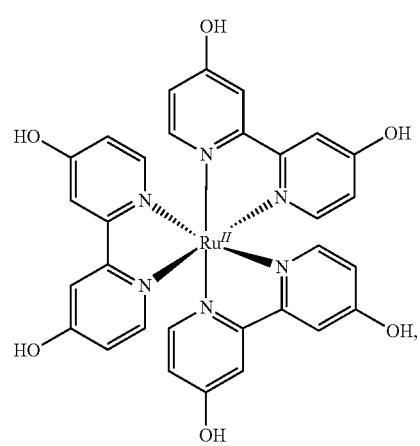

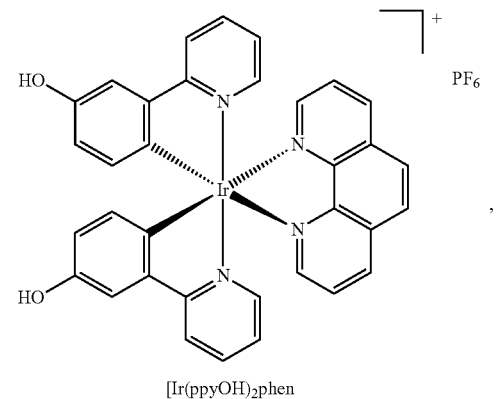

[Ir(ppyOH)$_2$phen]

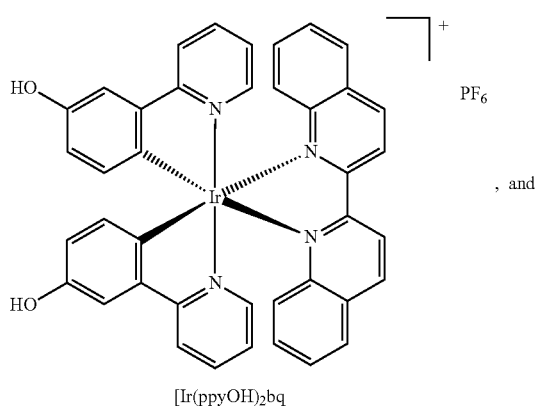

[Ir(ppyOH)$_2$bq]

, and

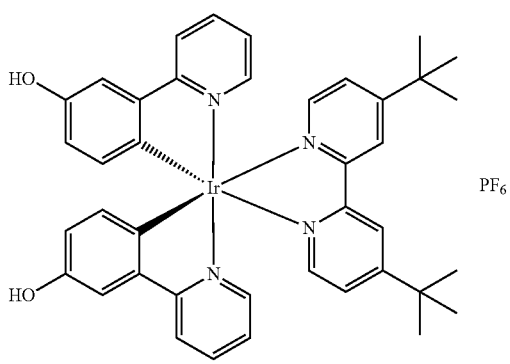

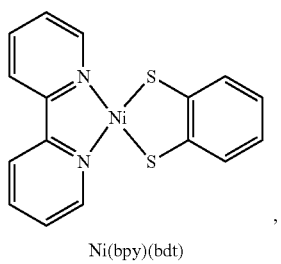

Ni(bpy)(bdt)

According to further embodiments, the photoacidic inorganic compounds may comprise a metal complex having a metal group, such as Pt, Pd, and Ni, and a dithiol (S-containing) ligand modified with a protonated group, such as —OH or —NH$_3^+$. Non-limiting examples of metal complexes that may be modified with a protonated group (not shown) include the following:

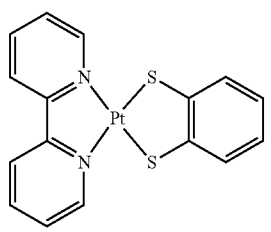

Pt(bpy)(bdt)

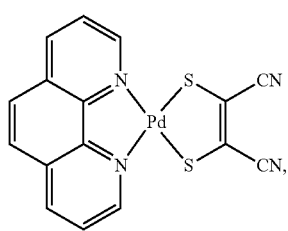

Pd(phen)(mnt)

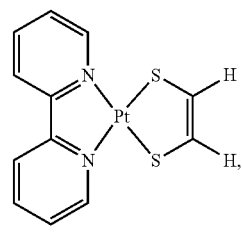

Pt(bpy)(edt)

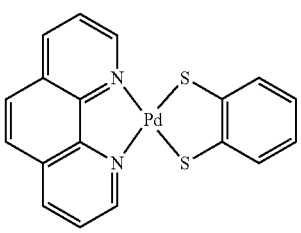

Pd(phen)(bdt)

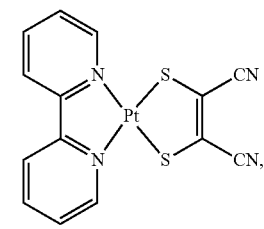

Pt(bpy)(mnt)

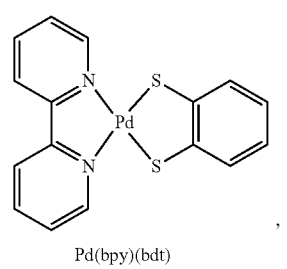

Pd(bpy)(bdt)

In an exemplary embodiment, the inorganic metal complex may be synthesized to be water soluble and have complete oxidation of the ligands, as shown in Scheme 6.

Scheme 6: Synthesis of water soluble Re-tyrosine complex.
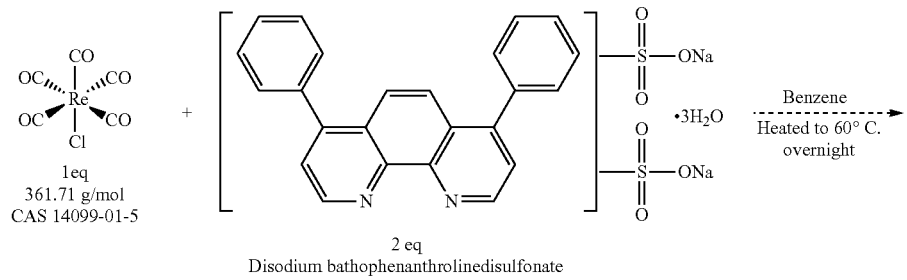
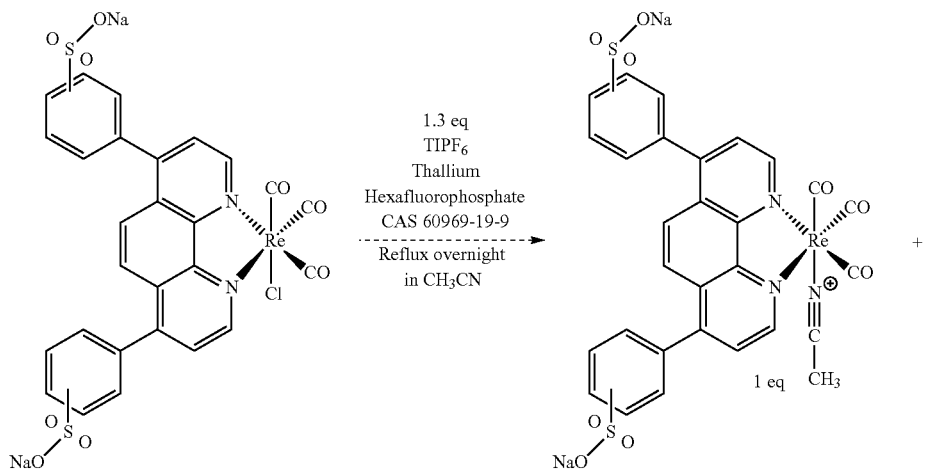
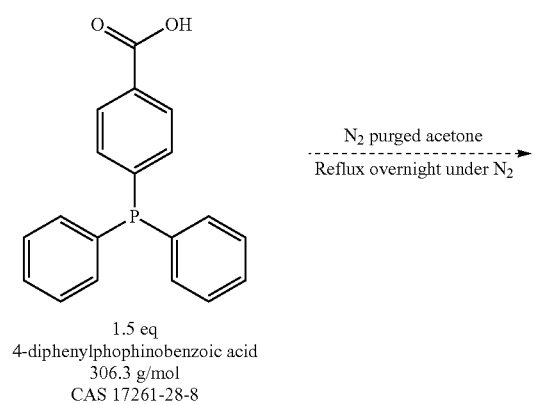

-continued
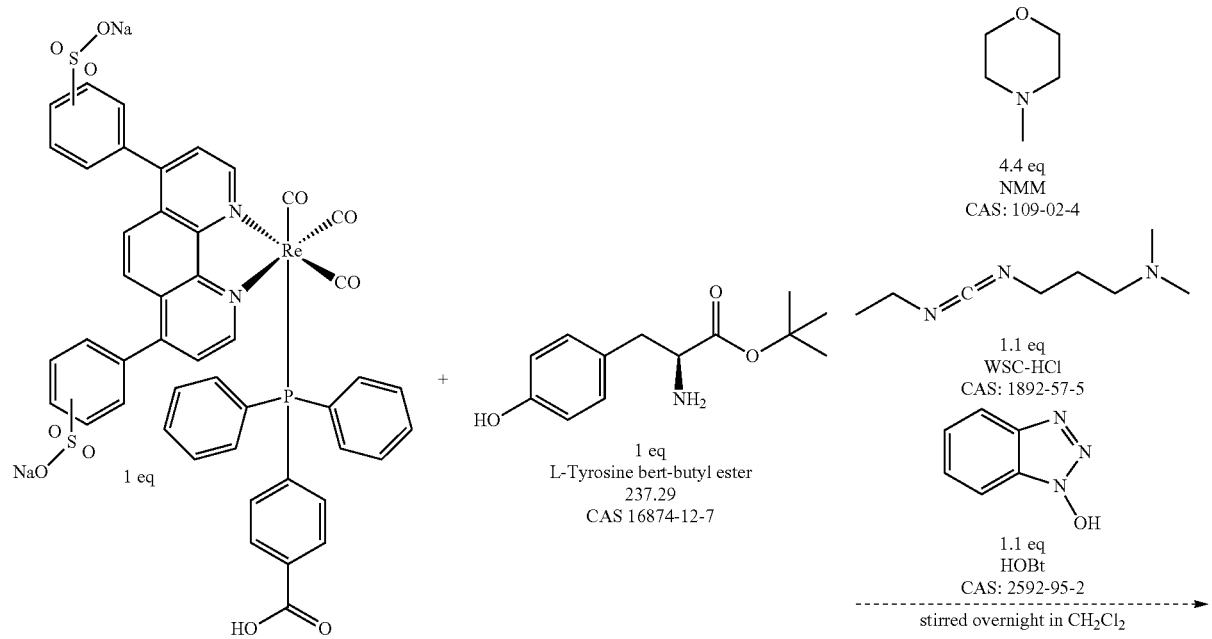
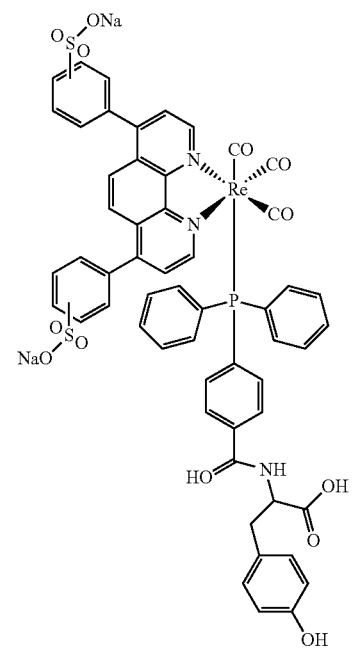

Photobases

According to some embodiments, the photoactive dye may be a photobase, which can covalently bind to the membranes described herein. Upon light absorption, the photobase can generate an $OH^-$, instead of $H^+$ as in the case of photoacids, and net form an $H^+$ during the regeneration process, as opposed to $OH^-$ for the photoacids. Examples of photobases include, but are not limited to, the following acridine-core photobases:

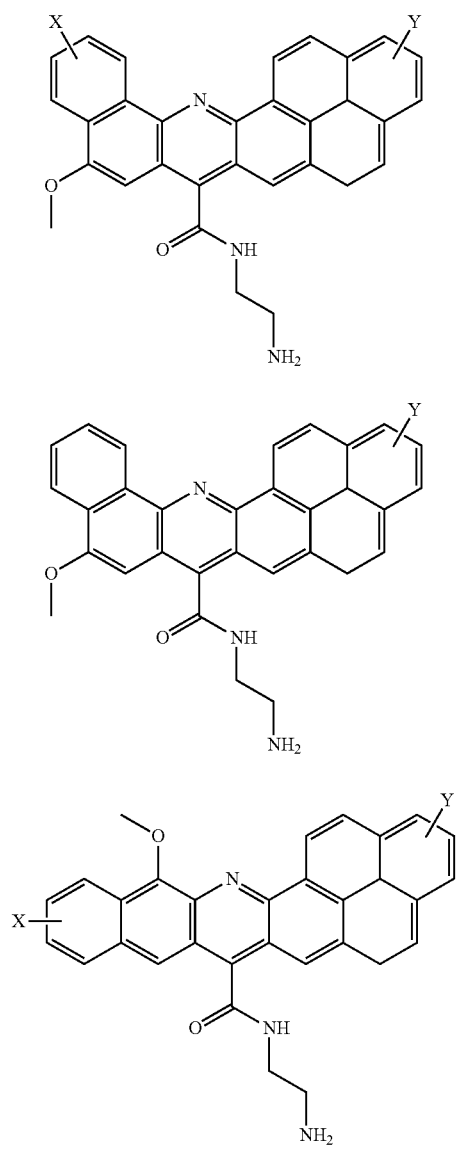

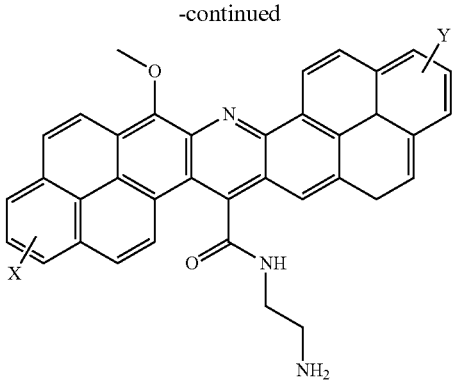

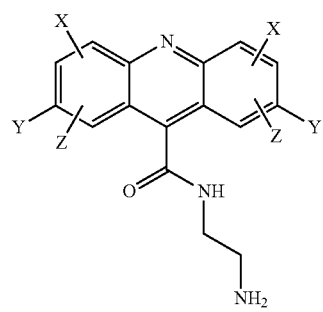

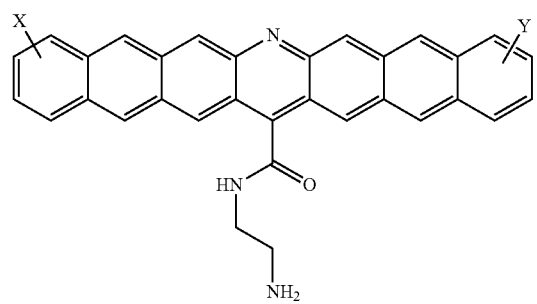

X, Y = —H, —CH$_3$, —OCH$_3$

In one embodiment, an acridine-core photobase may be synthesized according to the reaction shown in Scheme 7.

Scheme 7

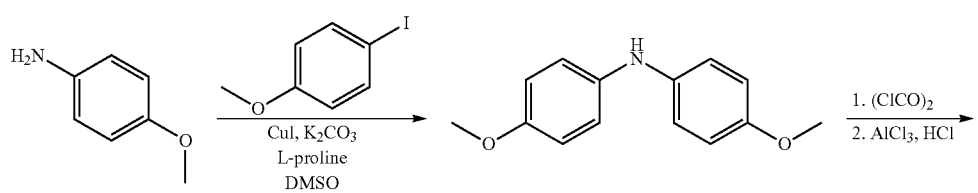

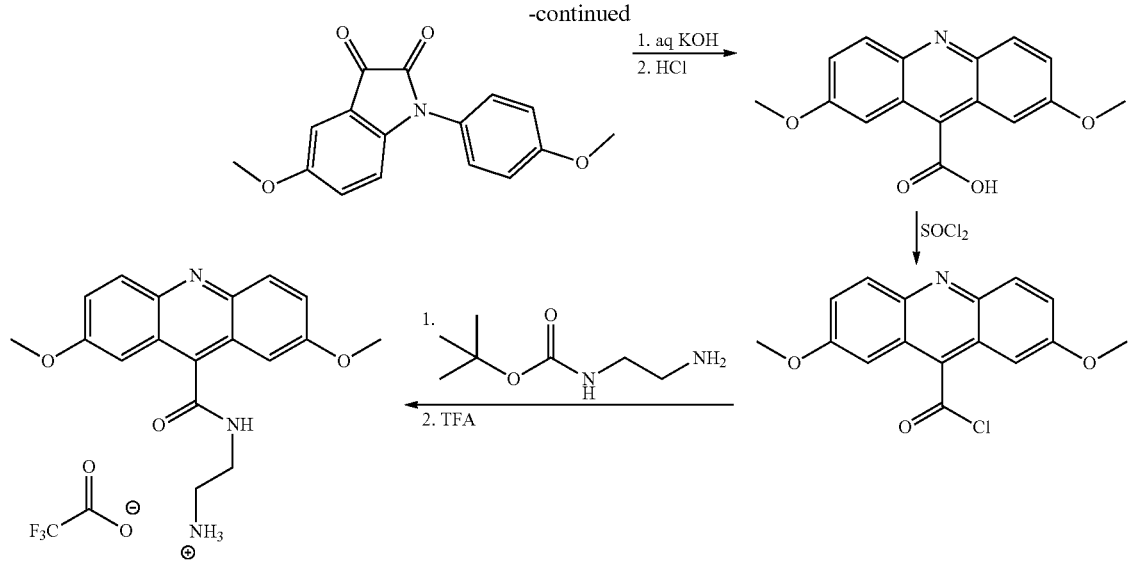

In alternative embodiments, the photobase may comprise a photobasic metal complex. In one embodiment, the photobasic metal complex may be according to the following structure:

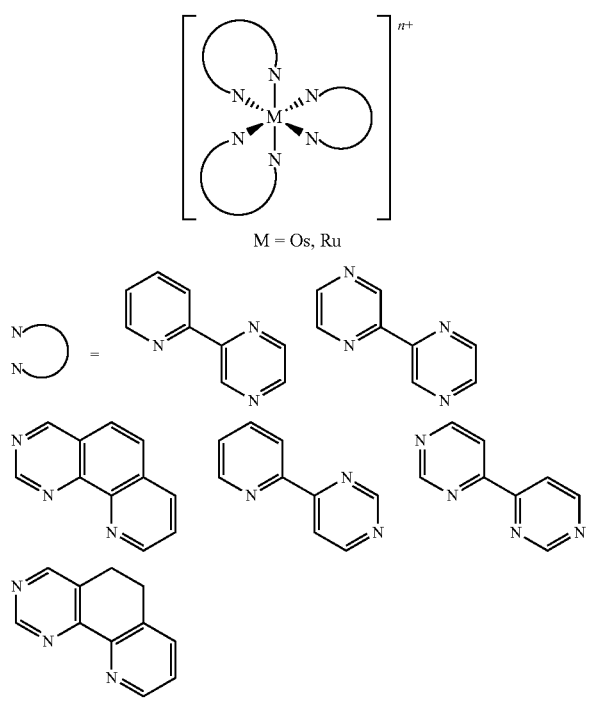

EXAMPLES

The following examples demonstrate variations of the present invention, i.e. the light-driven ion-pumping membrane, for illustrative purposes only, and should not be construed to limit the invention to the examples described herein.

Example 1. Photoacid-Modified Nafion®

Figure 2:
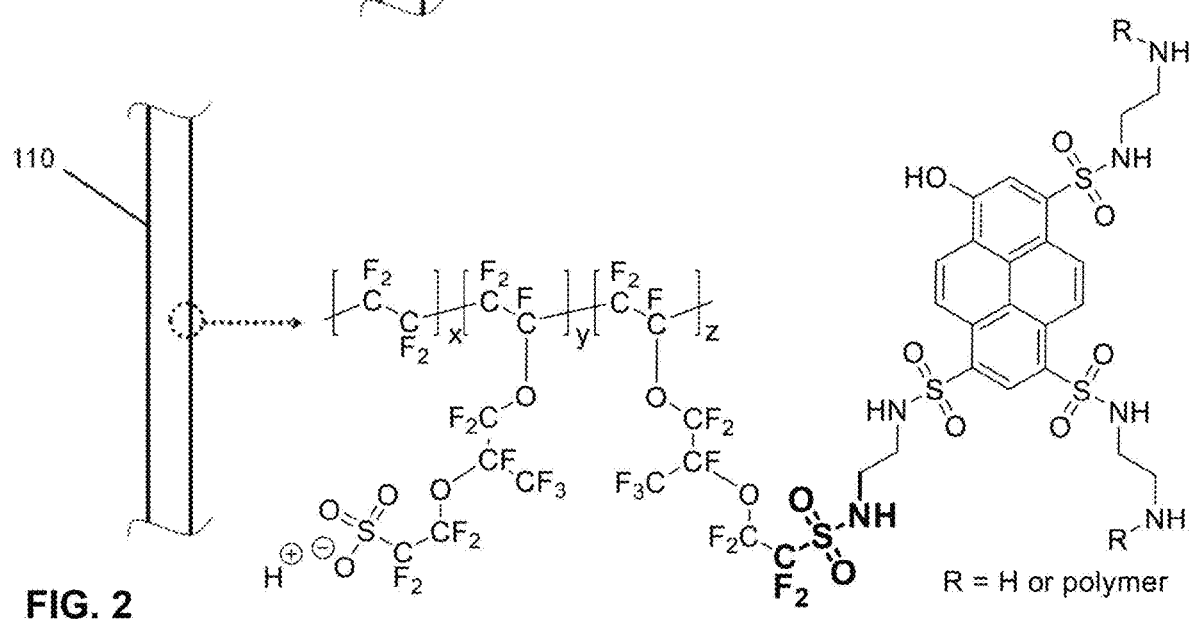
FIG. 2 shows an example the membrane modified with a hydroxypyrene derivative, 8-hydroxypyrene-1,3,6-tris(2-aminoethylsulfonamide).

As shown in FIG. 2, sensitization of Nafion®, a perfluorosulfonic acid (PFSA) ionomer membrane that is a copolymer with a poly(tetrafluoroethylene) backbone and pendant sulfonate groups attached via perfluorovinyl ether groups, to visible light was achieved through covalent modification using photoacid dye molecules, 8-hydroxy-pyrene-1,3,6-tris(2-aminoethylsulfonamide). This covalently modified PFSA (cPFSA) was synthesized by immersing precast Nafion sulfonyl fluoride poly(perfluorosulfonyl fluoride) membrane (PFSF) in an isopropyl alcohol and water mixture containing the photoacid, triethylamine, and NaOH. First, 3 mg of the trifluoroacetate salt of 8-hydroxy-pyrene-1,3,6-tris(2-aminoethylsulfonamide) was dissolved in 20 mL of isopropyl alcohol. Then to this solution, 75 µL of 1 M NaOH(aq), 45 µL of triethylamine, and a 2 cm×2 cm piece of precast PFSF were added and the reaction was stirred for 7 days at 90° C., resulting in yellow coloration of the membrane. Inclusion of NaOH ensured that after the synthesis no sulfonyl fluoride groups remained. The membrane was subsequently and serially immersed in 10 mL of the following, for 20 min each: deionized water, 1 M. $H_2SO_4$(aq), 1 M NaOH(aq), deionized water. The membrane was then stored in 1 M NaCl(aq) until use. FTIR-ATR: 627, 981, 1095, 1144, 1200, 1299, 1632, 2857, 2924, 3513, and 3663 $cm^{-1}$.

The cPFSA was compared to Nafion® ionically modified with $Ru^{II}$-polypyridyl coordination compounds (iPFSA-Ru). Briefly, freshly cut Nafion® membrane (2 cm×2 cm) was pretreated by stirring in 1 M $H_2SO_4$(aq) for 1 h. A stock solution of the photoacid dye 8-hydroxypyrene-1,3,6-tris(2-aminoethylsulfonamide) was prepared by dissolving 20 mg of photoacid in 10 mL of 1 M $H_2SO_4$(aq) to a final concentration of 3.4 mM. A stock solution of the dye [Ru(bpy)$_3$]Cl$_2$ was prepared by dissolving 25 mg of [Ru(bpy)$_3$]Cl$_2$.6H$_2$O in 20 mL of 1 M $H_2SO_4$(aq) to a final concentration of 1.6 mM, where bpy is 2,2-bipyridine. For each dye, 5 mL of dye stock solution was added to a scintillation vial along with a 2 cm×2 cm piece of precast Nafion® and stirred for 36 h at 80° C.

Figure 5:
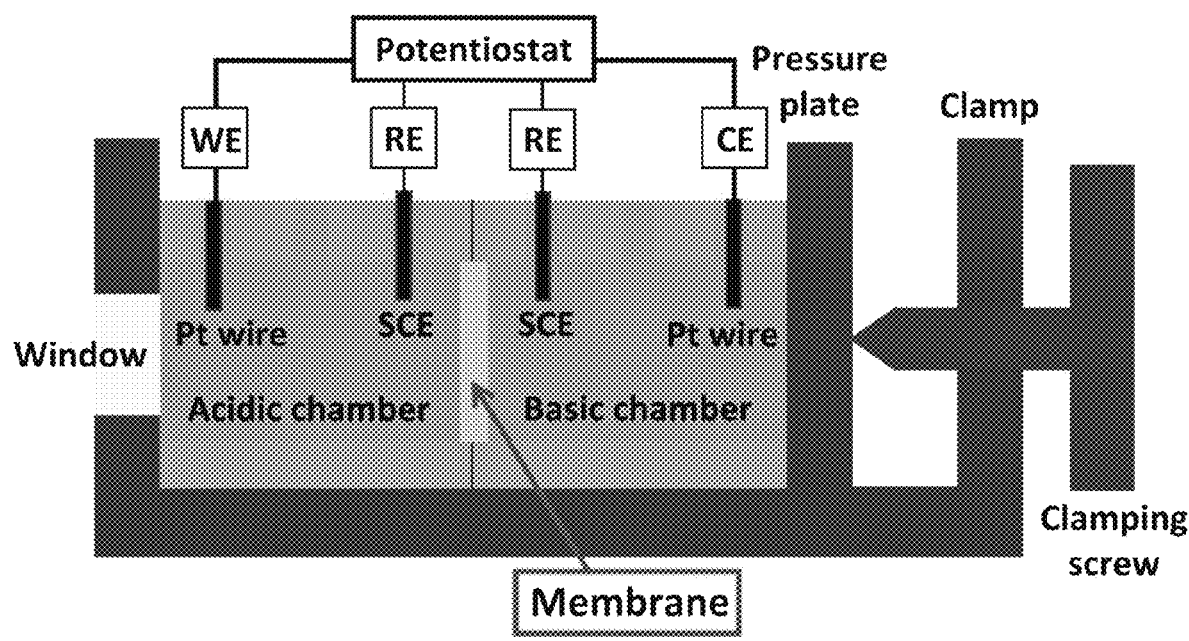
FIG. 5 shows a schematic of an electrochemical cell used to conduct photoelectrochemical experiments indicating the locations of the working electrode (WE), counter electrode (CE), and reference electrodes (REs) with respect to the locations of the ion-exchange membrane, the acidic and basic electrolytes, and the borosilicate glass window. The electric potential was measure across the membrane using two nominally identical saturated calomel (reference) electrodes (SCE).

Platinum electrodes were fabricated by soldering a platinum wire (1 cm long, 300 µm diameter) to a piece of insulated finned Cu wire and inserting and sealing this into a glass tube using two-part epoxy. Platinum electrodes were used as the power/current-carrying electrodes and were placed on opposite sides of the membrane, with the working electrode (WE) in the acidic chamber and the counter electrode (CE) in the basic chamber. Nominally identical saturated calomel electrodes (served as the reference electrodes (REs) and were placed on opposite sides of the membrane to measure the potential difference across it. As shown in FIG. 5, the electrochemical cell comprised of two poly(chlorotrifluoroethylene) blocks, each containing a horizontal cylindrical channel with a diameter of 1.54 cm and three vertical cylindrical holes on the top of each block, each 0.5 cm in diameter and spaced 1 cm apart center-to-center. The electrochemical cell was connected to a potentiostat, with the two current-carrying leads attached to the platinum electrodes and the two potential-sensing leads attached to the reference electrodes.

Figure 6:
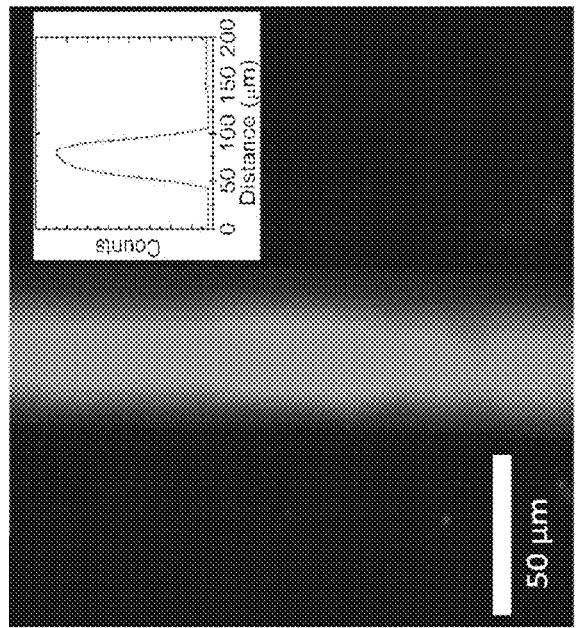
FIG. 6 shows electronic absorption (solid lines) and emission (dashed lines) spectra of cPFSA after protonation by strong acid (1 M $H_2SO_4$(aq); bold lines) or deprotonation by strong base (1 M NaOH(aq); thin lines).
Figure 7:
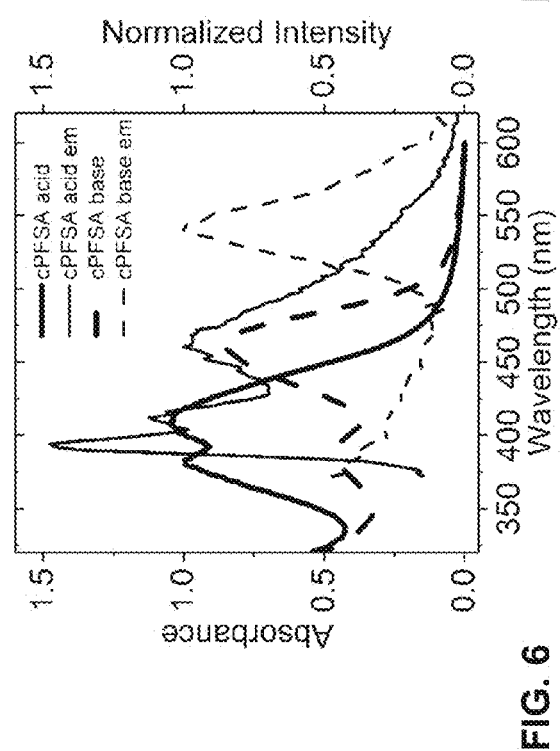
FIG. 7 is a cross-sectional fluorescence microscopy image of cPFSA with the inset depicting the fluorescence intensity versus position.
Figure 8B:
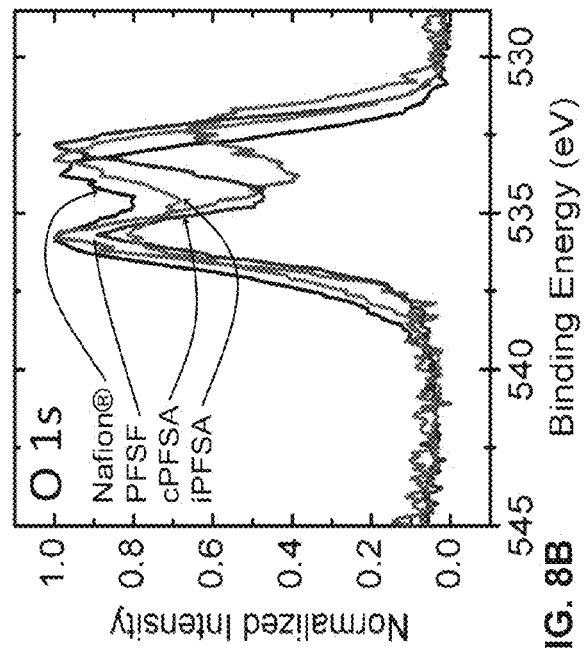
FIG. 8A is a low-energy FTIR-ATR transmission spectra and FIG. 8B Is an O 1s XPS spectra for Nafion® (black), PFSF (red), cPFSA (blue), and iPFSA (green), with each spectrum normalized to its largest intensity peak.
Figure 8A:
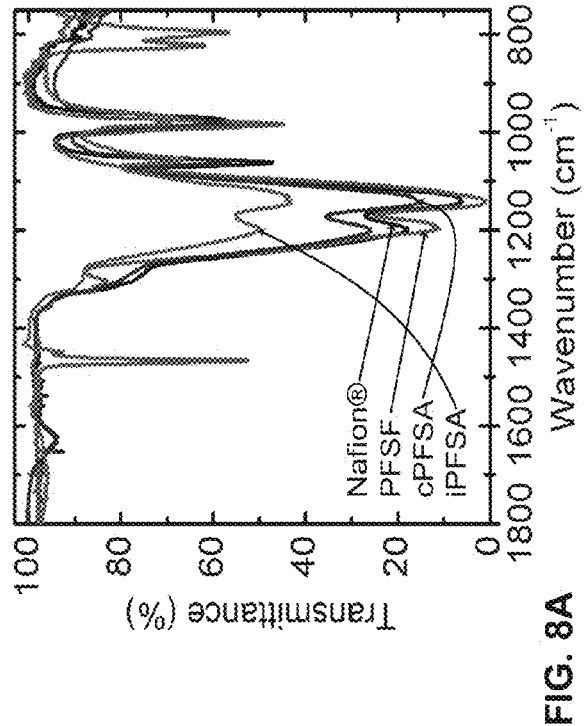

Electronic absorption spectra of cPFSA in both the protonated and deprotonated forms is shown in FIG. 6. Deprotonation resulted in a 0.35 eV bathochromic shift of the lowest-energy absorption transition. Cross-sectional photoluminescence microscopy images of cPFSA indicated that photoacids were present throughout the ~50 μm thickness of the membrane and that the near-surface regions contained fewer photoacids than in the bulk (FIG. 7). Covalent bonding of photoacids in cPFSA were supported by data shown in FIGS. 8A-8B, which contains the Fourier transform infrared (FTIR) spectra and X-ray photoelectron spectroscopy (XPS) spectra for Nafion, PFSF, cPFSA, and ionomer membranes containing ionically associated photoacids (IP-FSA). The characteristic sulfonyl fluoride peaks at 795, 823, and 1467 $cm^{-1}$ present in FTIR spectra of PFSF were undetectable in spectra of cPFSA, which was synthesized from PFSF. This suggests that most sulfonyl fluoride groups were modified to sulfonates/sulfonic acids or covalently bound dyes in cPFSA.

Four samples were analyzed using XPS over the range of energies for core emission from O. The O 1s core region spectra are diagnostic of the substitution of sulfonyl fluoride and clearly show a difference in binding energy between the mixed sulfonamide/sulfonate-containing membranes (cPFSA and iPFSA) and the sulfonate-only-containing polymer, Nafion®. The binding energies of oxygen bound to sulfur exhibit a logical trend, $SO_3^->SO_2NR$, based on the convolution of electronegativity and electron donating strength of the substituents. This trend is observed between cPFSA and iPFSA, where the smaller binding energy observed for cPFSA is consistent with it having a greater proportion of sulfonamides, due to the formation of covalent membrane-photoacid sulfonamide bonds, as compared to iPFSA, which only has sulfonamide bonds in the photoacid structure itself. When cPFSA was immersed in 1 M NaOH (aq) for 2 h, there was no visual evidence for leaching of dyes into solution. Conversely, when iPFSA was submerged in the same electrolyte, desorption of dyes was immediately apparent.

Together, the FTIR and XPS spectroscopy results and alkaline stability studies suggest that photoacids reacted with the sulfonyl fluoride groups in PFSF and resulted in covalent modification as cPFSA. The membranes were also found to be mechanically robust and chemically stable. Submerging cPFSA in water, N,N-dimethyl-formamide, or dimethyl sulfoxide for 7 days at 100° C. resulted in no apparent dissolution of the membrane suggesting that the polymer may be cross-linked. The average ion-exchange capacity for cPFSA was determined to be 0.66±0.06 mequiv/g, while Nafion was measured to have an ion-exchange capacity of 0.83±0.07 mequiv/g, indicating that ion-exchange capacity changed by >~5%.

Figure 9A:
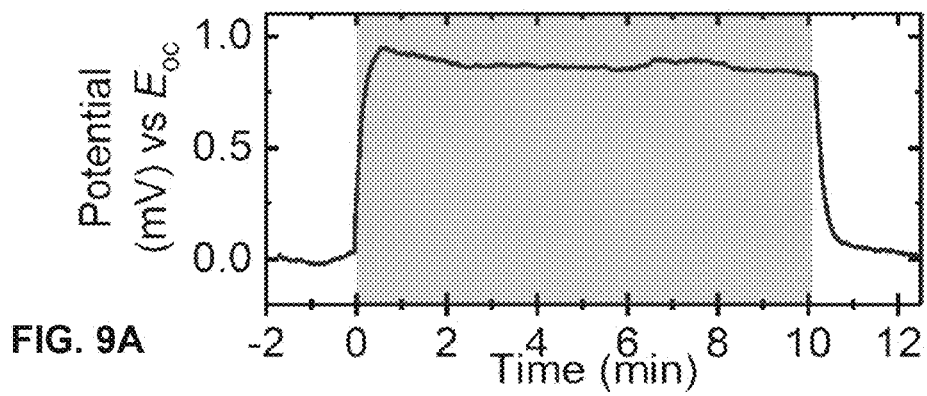
FIG. 9A shows an open-circuit photovoltage and FIG. 9B shows photocurrent at a small positive bias for cPFSA wetted by 1 M $H_2SO_4$(aq) on one side of the membrane and 1 M NaOH(aq) on the other side of the membrane. Regions highlighted indicate illumination with 405 nm laser light at 0.65 Suns equivalent excitation.
Figure 9B:
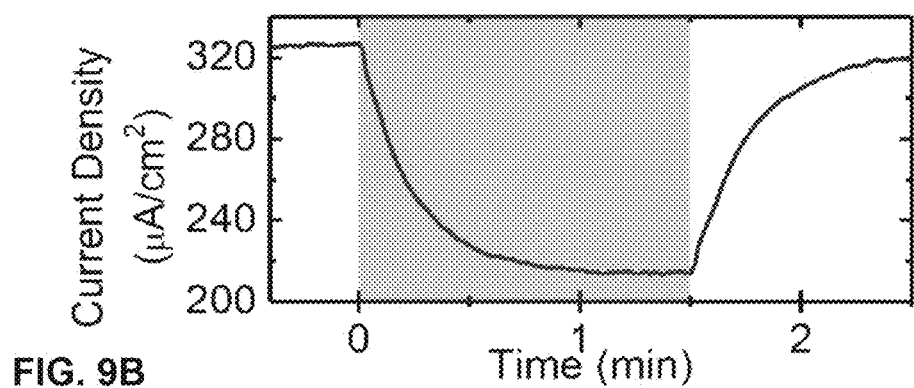
Figure 10A:
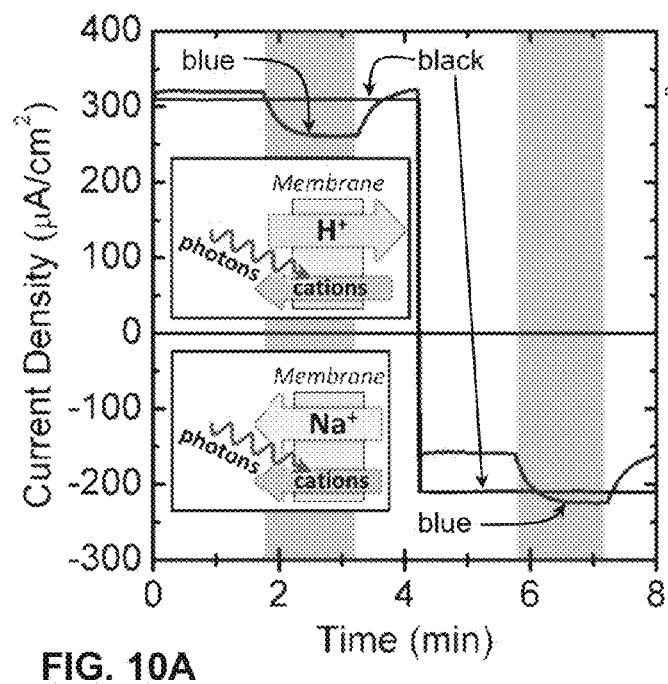
FIG. 10A shows chronoamperometry data in the dark and under illumination (highlighted regions) for cPFSA (blue) wetted by 1 M $H_2SO_4$(aq) on one side and 1 M NaOH(aq) on the other side of the membrane. Data measured under forward bias (left, and top inset) and reverse bias (right, and bottom inset) and for Nafion impregnated with $Ru(bpy)_3^{2+}$ (black), under the same conditions.
Figure 10B:
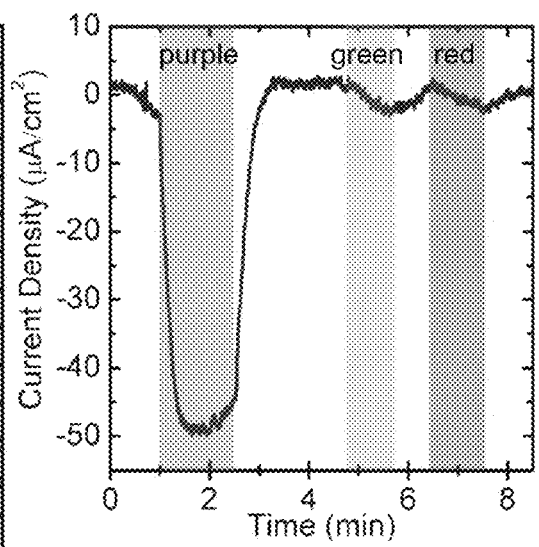
FIG. 10B shows a spectral response, reported as $J_{ph}$ values after correction for a dark current density of $1.4\pm0.6$ $\mu A/cm^2$, when illuminated with laser light at 405 nm (purple), 532 nm (green), and 650 nm (red).

For cPFSA to exhibit photovoltaic action, i.e., a photovoltage and power production when illuminated, it must absorb light, separate charge, and collect charge. Electronic absorption spectra suggest that protonated photoacids in cPFSA absorb visible light. Photoluminescence data exhibiting a shoulder at ~550 nm indicate some radiative decay from specifically deprotonated excited-state photoacids in cPFSA (FIG. 6), supporting the assignment of this process to charge separation by excited-state proton transfer. A measurable photovoltage response under open-circuit conditions suggests that both charge separation and cage escape of photoliberated protons from the solvation environment of the photoacids occurred (FIG. 9A). Charge collection was verified by measurements of the photocurrent densities (FIG. 9B). Observation of a nearly constant steady-state photocurrent from electronically insulating cPFSA supported that illumination resulted in an increase in the rate of ion transport to the current-carrying electrodes of the potentiostat. Additional chronoamperometry measurements supported the conclusion that cPFSA exhibited photovoltaic action because the sign of the light-generated current density ($J_{ph}$), calculated as the difference in the light versus dark current densities, was independent of the sign of the applied potential (FIG. 9C and FIG. 10A-10B). Diagrams of the membrane under forward bias or reverse bias conditions are shown as insets to FIG. 10A, with clear indication of the expected type and direction of majority cation flux. Given the experimental setup, a negative value for 4 is consistent with light driving net cation transport into the compartment with a large concentration of protons. Because the dyes are photoacids, it is hypothesized that the observed behavior is specifically due to light-driven proton transport against a pH gradient, behavior that is consistent with photovoltaic action.

Since an increase in local temperature could result in behavior consistent with photovoltaic action, a comparison was mad between cPFSA and Nafion containing ionically associated Ru(bpy), dyes, iPFSA-Ru (FIG. 10A). $Ru(bpy)^2$ dissolved in aqueous solution exhibits a large nonradiative rate constant and a quantum yield of emission that is smaller than that observed for the photoacids dissolved in aqueous solution ($\phi_{em}$<0.07 for $Ru(bpy)_3^{2+}$ and $\phi_{em}$≈0.29 for the photoacid). Notwithstanding, $J_{ph}$ values for cPFSA were observed to be orders-of-magnitude larger than for iPFSA-Ru, which implies that the observed photovoltaic action for cPFSA was not due to local heating caused by nonradiative decay of the excited-state photoacids or electron-transfer/energy-transfer to dissolved $O_2$ in the aqueous electrolyte. The photocurrent response of cPFSA was over an order-of-magnitude larger when illuminated with 405 nm light in comparison to illumination with 532 or 650 nm light, whose photon fluxes were each more than six times larger (FIG. 10B). This further supports the conclusion that photovoltaic action was due to optical excitation of the photoacids and not due to other optical effects. Also, over the course of a 177-hr experiment, the total number of charges passed was calculated to be 3.55 μmol. Given that the maximum concentration of dyes within the entire 4 $cm^2$ film was 3.2 μmol, and that the membrane area in direct contact with the electrolyte and illuminated was 0.237 $cm^2$, the photoacids exhibited a turnover number of >18 and the photocurrent response was stable over the course of the experiment, meaning the sensitization process was regenerative/photocatalytic and not stoichiometric.

Using PFSA modified with photoacid dye molecules, 8-hydroxypyrene-1,3,6-tris(2-aminoethylsulfonamide), a first-of-its-kind synthetic polymer membrane light-driven proton pump was demonstrated. Bonding of photoacids to the polymer was supported by results obtained using FTIR-ATR spectroscopy and XPS, and clear differences in the transport of ionically associated dyes when in contact with strongly alkaline aqueous electrolyte, cPFSA was shown to undergo excited-state proton transfer and exhibited photovoltaic action with a turnover number of >18. This new class of dye-sensitized ion-exchange materials is capable of alleviating power demands from electrochemical processes.

Example 2. Photoacid-Dye-Sensitized Bipolar Ion-Exchange Membranes

In some embodiments, a bipolar ion-exchange membrane structure functionalized with the same photoacid dye molecules as in EXAMPLE 1 can reduce ionic crossover. This arrangement mimics a solar cell pn-junction or a bulk heterojunction solar cell. A stable membrane system was developed that converts visible light into net ionic power, and resulted in an increase in the magnitude of the built-in potential by a factor of ~10, a ~60-fold increase in the photovoltage, and a ~20-fold decrease in the photocurrent over that of the photoacid-dye-modified Nafion® in EXAMPLE 1.

Referring to FIG. 3A-38, a two-layer bipolar membrane was fabricated containing the hydroxypyrene derivative covalently bound via sulfonamide groups to a Nafion® cation-exchange membrane using coupling chemistry with a Nafion® sulfonyl fluoride precursor membrane. This dye-functionalized membrane was then laminated to a commercial anion-exchange membrane (AHA) and heat pressed at about 95° C. for about 30 min with 1 ton of pressure applied to form the two-layer structure. The membrane was evaluated using standard four-electrode photoelectrochemical measurements. When positioned between two cells—one containing about 0.01 M acid and the other containing about 0.01 M base—and illuminated with light that was effectively about 0.044 times the intensity of sunlight, this membrane generated a maximum open-circuit photovoltage of about 0.120 V and short-circuit photocurrent density of about 0.01 mA/cm$^2$.

Figure 11:
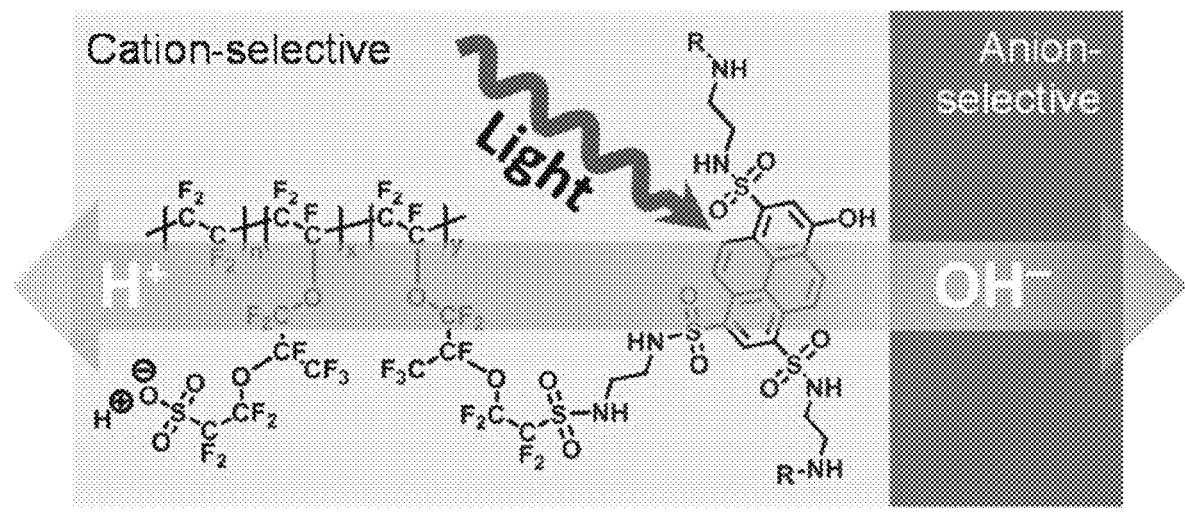
FIG. 11 depicts an arrangement and chemical compositions of structures in photoacid-dye-sensitized bipolar ion-exchange membrane, PSBM, and proposed transport processes. Photoexcitation of a covalently bound 8-hydroxypyrene-1,3,6-tris(2-aminoethylsulfonamide) photoacid molecule (blue) results in a decrease of its $pK_a$ followed by deprotonation and proton transport in the cation-selective layer. Proposed subsequent protonation of the photoacid molecule in its ground-state is followed by hydroxide transport in the anion-selective layer. Initial charge separation is proposed to be driven by local electric fields at the interface of the two layers.
Figure 14A:
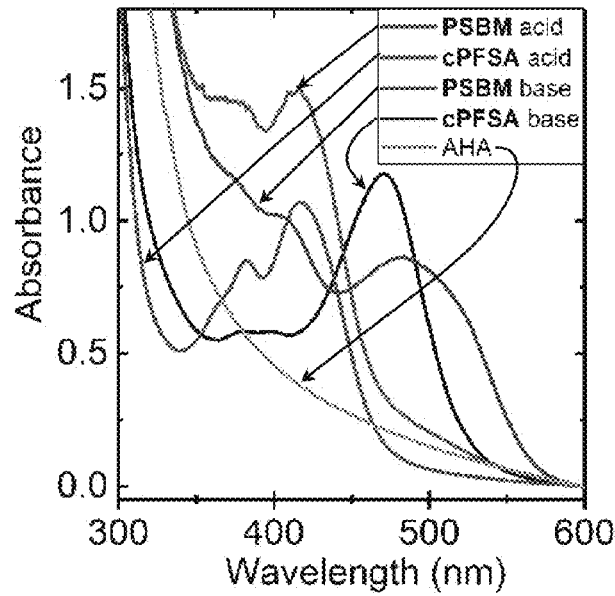
FIGS. 14A-14C show spectroscopic and gravimetric characterization of dye-sensitized bipolar ion-exchange membranes.

Referring now to FIG. 11, photoacid-sensitized bipolar membranes (PSBMs) were fabricated by laminating and annealing a dye-sensitized monopolar cation-exchange membrane with covalently bound photoacid dyes, cPFSA, to a commercial monopolar AHA. In one embodiment, a PSBM were constructed by laminating a monopolar cPFSA cation-exchange membrane to a monopolar AHA and annealing then. To facilitate adhesion between the two monopolar membranes, the two-layer membrane assembly was placed between two silica glass slides and pressed mechanically together using two strong neodymium magnets. This membrane assembly was then immersed in 5 mL of deionized water in a 50 mL Teflon sleeve and in a stainless-steel autoclave that was sealed and heated in a muffle furnace for 4 hours at 120° C. after a heating ramp of 5° C./min. The resulting PSBM was deeply colored and preserved the absorbance peaks of the original cPFSA membrane in its protonated form (FIG. 14A).

Figure 14B:
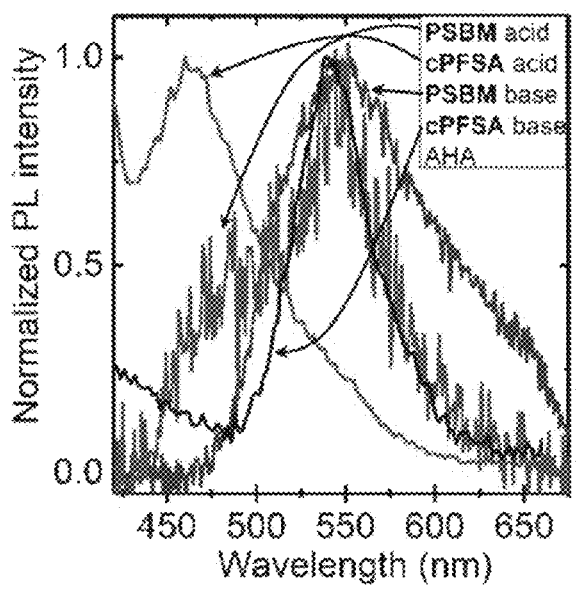

After soaking the PSBM in 1 M NaOH(aq), its visible-light-absorbing peak exhibited a bathochromic shift, consistent with the behavior in cPFSA only, but the peak also broadened considerably (FIG. 14A), which may be attributed to formation of aggregates caused by local electrostatic fields at the interface of cPFSA and AHA, cPFSA|AHA, a phenomenon that is commonly observed in analogous electronic dye-sensitized solar cells and organic photovoltaics. Photoluminescence spectra indicate that both the protonated and deprotonated excited-states of the photoacids in PSBM emission was predominantly from their deprotonated excited-states, which is desired for the intended light-driven proton release (FIG. 14B).

Figure 14C:
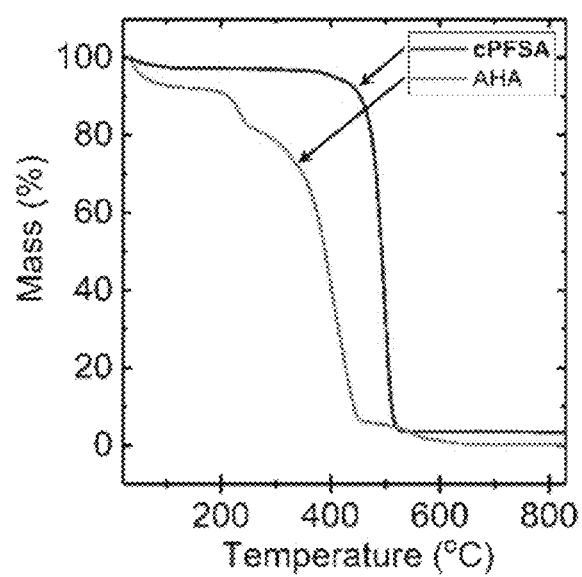

Thermal gravimetric analysis was performed on cPFSA and AHA to evaluate the thermal stability of the polymers relevant to the membrane annealing process required for fabrication of PSBM. At temperatures below 135° C. and under a flow of argon gas, there was a loss of <8% mass in cPFSA and AHA, which was attributed to loss of water (FIG. 14C). The AHA membrane showed significant decomposition at temperatures above 200° C. Additional stability tests performed on AHA showed the expected ~4.5% weight loss over the first ~4 min due to dehydration, followed by only a 0.5% weight loss with prolonged heating at 120° C. for 4 hours. This suggests that little degradation of AHA occurred during the fabrication of PSBM, which was annealed at 120° C. for 4 hours during fabrication.

Cross-sectional scanning electron micrographs of a typical section of PSBM were used to assess the physical properties of PSBM. The cPFSA layer was observed to range from ~30 μm to ~50 μm thick (FIG. 15A), which was significantly thinner than before annealing (~51 μm). The AHA layer was observed to be 210±20 μm thick. The cPFSA AHA interface was smooth with no large voids and no evidence of delamination (FIGS. 15A-158), and these membranes exhibited the best photoelectrochemical performance. PSBM had been soaked in 1 M KCl(aq) prior to measurements and elemental maps are consistent with this, showing predominant localization of potassium in the cPFSA layer (FIG. 15D) and chlorine in the AHA layer (FIG. 15C), and where cPFSA is apparent by the large number of counts for fluorine (FIG. 15E) and sulfur (FIG. 15F). Significant exclusion of co-ions from each membrane corroborates that each membrane layer remained highly selective for cations or anions after annealing them together.

Figure 12:
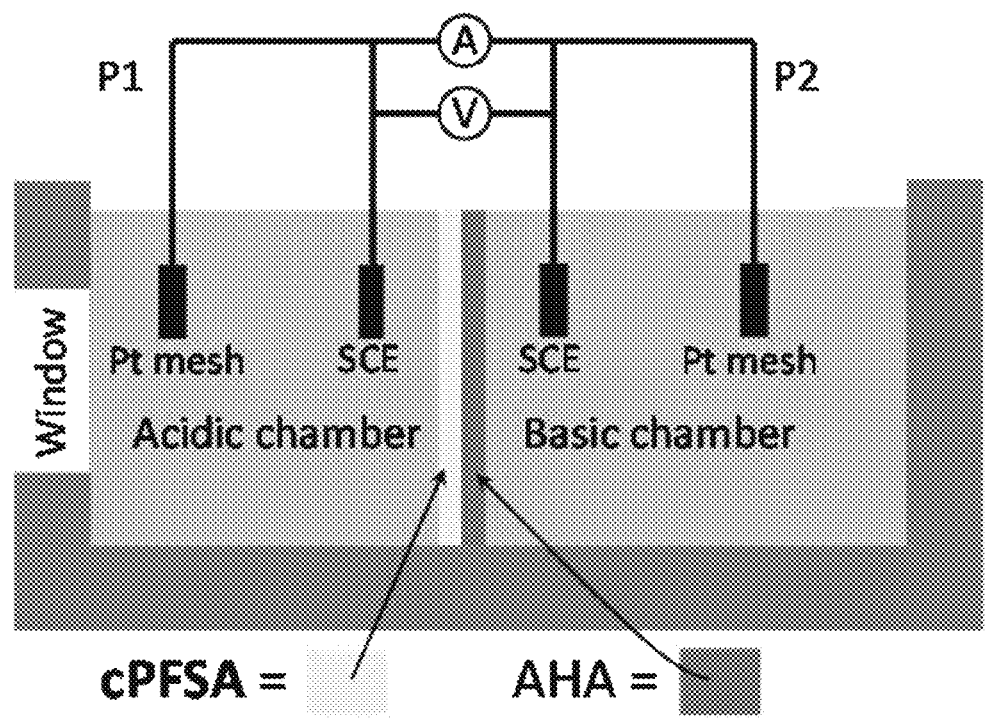
FIG. 12 depicts an electrochemical cell and simplified circuit for assessing dye-sensitized bipolar ion-exchange membranes during the photoelectrochemical experiments. Light was shown through the borosilicate glass window and into the acidic chamber where the incident beam contacted the dye-sensitized layer. The electric potential was measure across the membrane using two nominally identical saturated calomel (reference) electrodes (SCE). The ionic current was measured as the electronic current that passed though the potentiostat and between the Pt mesh electrodes (P1 and P2).
Figure 13:
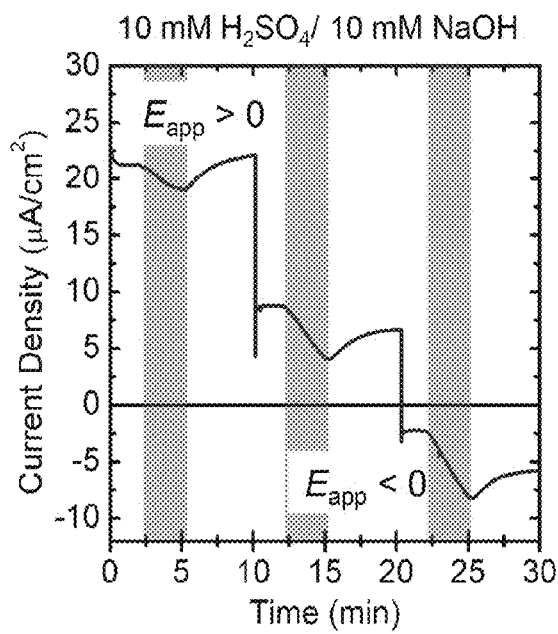
FIG. 13 illustrates the current density generated by the PSBM when positioned between two cells, one containing about 0.01 M acid and the other containing about 0.01 M base, and illuminated with light that was effectively about 0.65 times the intensity of sunlight during the times highlighted by the purple bars. This membrane generated a ~0.02 V open-circuit photovoltage and a ~0.01 $mA/cm^2$ short-circuit photocurrent.

Electrochemical experiments were performed using a potentiostat in four-electrode measurement mode with a setup as shown in FIG. 12. PSBM separated the two compartments of an H-cell that was made of poly(chlorotrifluoroethylene) with three 0.5 cm holes drilled through the top of each cell and a 1.54 cm diameter bore hole through the center of the poly(chlorotrifluoroethylene) block. Two saturated calomel electrodes (SCEs) were used as the potential-sensing reference electrodes and two platinum mesh electrodes were used as the power-supplying working and counter electrodes, with one of each placed on either side of PSBM. Each electrochemical experiment used 10 mM $HClO_4$(aq) in the acidic chamber and 10 mM KOH(aq) in the basic chamber. All electrochemical data shown in FIGS. 16A-16B were from the best-performing PSBM, whereas values reported in herein are from four functional PSBM and are reported as the mean t standard deviation.

Light experiments were performed using a visible-light-emitting laser pointer with wavelength of 405±10 nm (full-width-at-half-maximum (fwhm)=1.96 mm; $(3.0±0.6)×10^{16}$ photon s$^{-1}$) or 532±10 nm (fwhm=0.96 mm; $(4.7±1.4)×10^{16}$ photon s$^{-1}$). An upper bound for the equivalent number of Suns from the 405 nm light source over the area of excitation was calculated to be 40× the absorbed photon flux rate expected from 1 Sun of air mass 1.5-global solar illumination. Assuming that charge carriers delocalized across the entire membrane area, the equivalent number of Suns excitation was more accurately 0.65. Light was incident from the acidic cPFSA side of PSBM because AHA is opaque and highly scattering.

The photoelectrochemical properties of PSBM were assessed when it separated aqueous electrolytes consisting of 10 mM $HClO_4$(aq) and 10 mM KOH(aq), and therefore roughly pH 2 and pH 12. Under this condition, the initial value of the open-circuit potential in the dark ($E_{oc}$) across the PSBM was measured to be −400±200 mV, a value whose magnitude decreased slowly over time at a rate of 0.17 mV/min for a PSBM with $E_{oc}$=−535 mV. The PSBM exhibited a photocurrent measured at a small applied bias versus $E_{oc}$ ($J_{ph-sc}$) of −5±4 $\mu A/cm^2$ and an open-circuit photovoltage versus $E_{oc}$($V_{oc}$) of +60±50 mV, and with a best-performing cell $V_{oc}$=121 mV. $E_{oc}$ and $V_{oc}$ were also measured using a high-impedance digital multimeter, instead of a potentiostat, to monitor the potential between the two nominally identical reference electrodes and very similar behavior was observed. As demonstrated in EXAMPLE 1, for cPFSA alone, the $E_{oc}$=−30 mV, $V_{oc}$=1 mV, and $J_{ph-sc}$=100 $\mu A/cm^2$. These data indicate that incorporation of a second membrane contact for $OH^-$ in the form of AHA Increased the magnitude of $E_{oc}$ by a factor of ~10 and increased $V_{oc}$ by a factor of ~60, but $J_{ph-sc}$ decreased to ~5% of that observed for cPFSA alone.

The increase in the magnitude of the potentials when AHA was introduced is reasonable because this second membrane layer attenuated cation leakage across the membrane, therefore increasing the magnitude of $E_{oc}$, which also translates to larger $V_{oc}$ values. The decrease in photocurrent for PSBM could be due to formation of a well-defined and stable space-charge region that is expected to be on the order of several nanometers thick, beyond which cPFSA is strongly acidic. Based on the equivalent number of Suns excitation in cPFSA and the measured percent transmittance of cPFSA at 405 nm, which was ~6%, an equivalent of ~0.044 Suns of light reached the junction formed across the cPFSA|AHA Interface. This value was determined by calculating the percent of incident light that was transmitted through cPFSA (% T×(Suns/(1−% T))). This ~15-fold decrease in illumination intensity may explain the similar decrease in $J_{ph-sc}$ between cPFSA and PSBM, because the previous photoelectrochemical results for cPFSA used 0.65 Suns equivalent excitation (EXAMPLE 1) and with a junction responsible for charge separation that likely had a potential drop across the entire cPFSA.

The PSBM exhibited photovoltaic action as evidenced by a shift in the J-E data into quadrant IV which is consistent with cations being transported against a pH gradient to the more acidic compartment (FIG. 16A). Assuming that the photoacid is liberating protons when illuminated, this suggests that protons are being transported against their favorable direction of transport in the dark and therefore that visible-light illumination results in net photovoltaic action. The substantial increase in hysteresis between PSBM under illumination versus in the dark is explained by an increase in the number and distribution of mobile charge carriers at the cPFSA|AHA interface. The sluggish transport kinetics in ion-exchange membranes support that hysteresis is likely due to transient changes in ion distributions even at very slow scan rates, although $E_{oc}$ returns to its original value after the electrolyte is refreshed. Spectral response measurements using PSBM showed a photocurrent response with 405 nm laser light excitation, but not with 532 laser light excitation that delivered >5 times as many photons per second per $cm^2$ (FIG. 16B). A Nafion|AHA bipolar membrane that did not contain photoacid dye molecules showed zero photoresponse when illuminated with the same laser light sources.

EMBODIMENTS OF PSBMS

The following are additional non-limiting embodiments of the two-layer bipolar ion-exchange membranes described in EXAMPLE 2.

Figure 17:
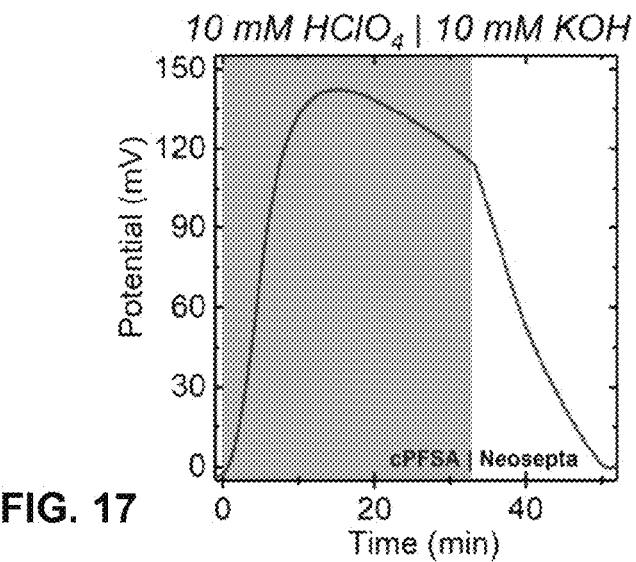
FIG. 17 shows a photoresponse of a BPM constructed using cPFSA/AHA membrane when illuminated with 405 nm laser light (purple).

Embodiment 1: Referring to FIG. 17, a BPM comprising cPFSA|AHA membrane was constructed by melt pressing techniques using a hot press at 90° C. with 1 ton of applied pressure, which was applied 3 times, each for 10 minutes. In similar electrolyte conditions (e.g. 10 mM $HClO_4$|10 mM KOH), the maximum photovoltage had increased to about 140 mV. In all plots demonstrating photoelectrochemical effects, a baseline curve is generated from the trend of the data with the light off, and subtracted from the original data to produce the plot. Thus, the curves demonstrate photoresponse and not absolute potential or current under light.

Figure 18A:
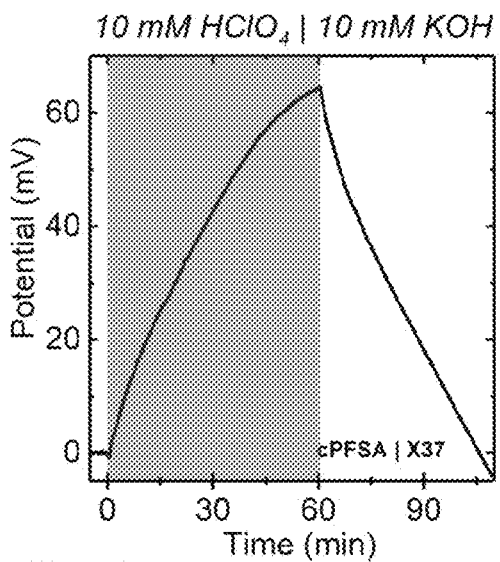
FIG. 18A shows a photoresponse of a BPM constructed using cPFSA annealed with X37 when illuminated with 405 nm laser light (purple).
Figure 18B:
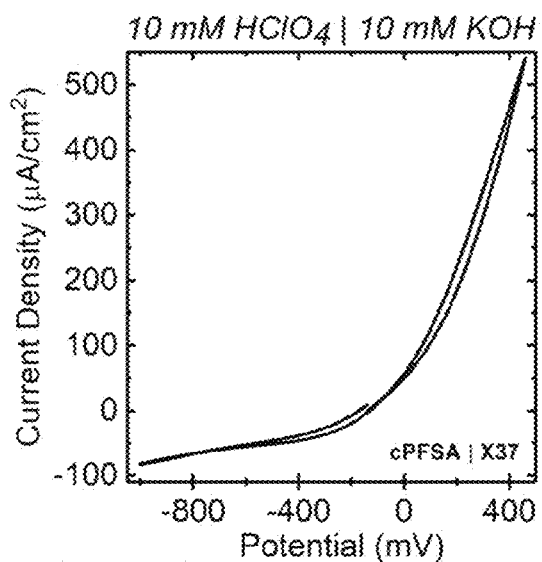
FIG. 18B shows rectification behavior of the BPM constructed using cPFSA/X37.
Figure 19:
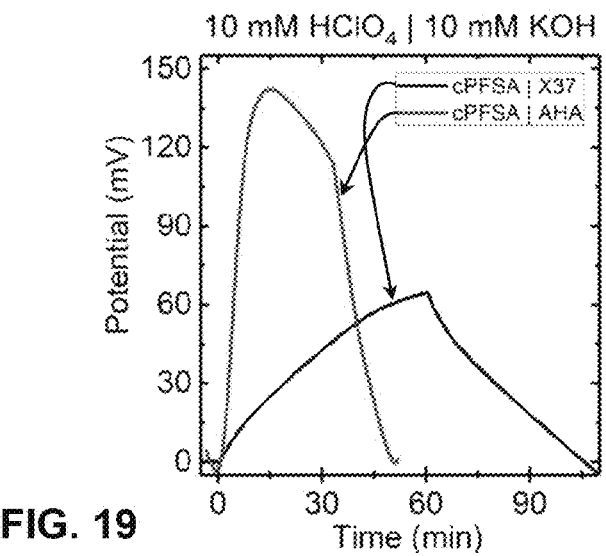
FIG. 19 shows a plot comparing the photoresponses of the BPMs from FIG. 17 and FIG. 18A.

Embodiment 2: Referring to FIGS. 18A-18B, a BPM was constructed by annealing cPFSA with different anion-exchange membrane, namely, a dioxide Sustainion® X37 anion-exchange membrane. Using melt pressing technique described above, the Sustainion® X37 membrane was pressed with cPFSA. Light was turned on at 0 minutes and turned off at 60 minutes. In some embodiments, these membranes can exhibit better rectification behavior than that of the BPM with Neosepta® AHA.

Example 3: Bipolar Membranes with I-Regions

In some embodiments, a photoactive dye is disposed on the surface and, optionally, throughout the thickness of a polymer layer, referred to herein as the i-region. The i-region may be defined as a neutral transition region or layer where $H^+$ and $OH^-$ are generated. In some embodiments, the polymer layer may be juxtaposed or attached to a cation-exchange membrane and an anion-exchange membrane, therefore providing a thicker region of dyes between the IX membranes. This arrangement mimics a solar cell pin-junction.

Figure 20A:
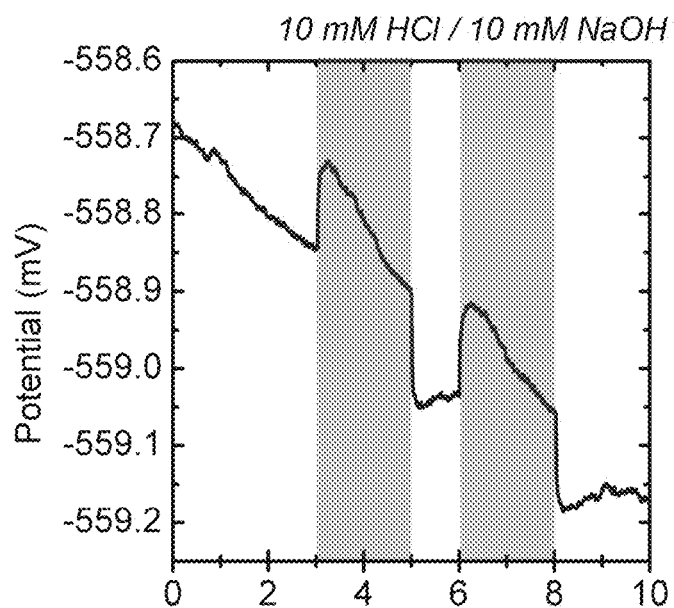
FIGS. 20A-20B show photovoltages and photocurrents generated when separating about 0.01 M acid and about 0.01 M base for a three-layer BPM constructed from a poly (acrylic acid-butyl methacrylate)triblock copolymer with the hydrozypyrene derivative photoacid, an AHA, and a cation-exchange membrane (Nafion®). The purple bars indicate when the light was illuminating the membrane.
Figure 20B:
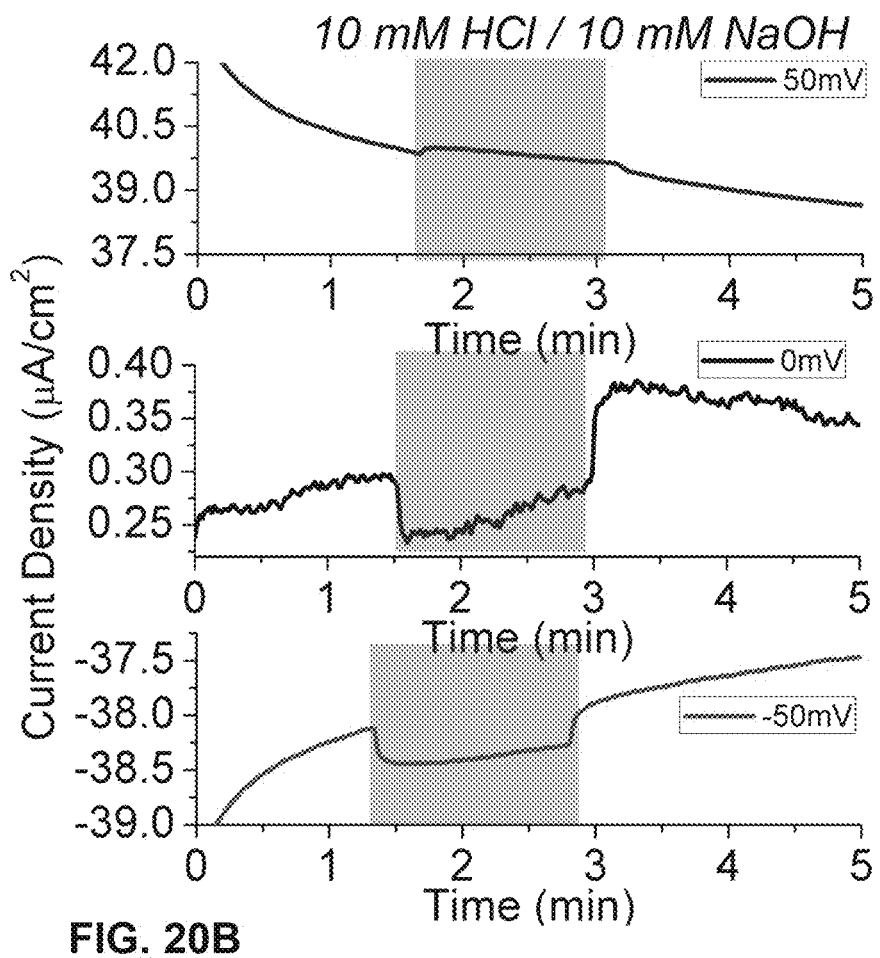

Embodiment 3: Referring to FIGS. 20A-20B, an i-region was prepared from a photoacid-modified polymer membrane comprising a poly(acrylic acid-butyl methacrylate) triblock copolymer with the hydroxypyrene derivative covalently incorporated therein, as shown in Scheme 8.

Scheme 8:
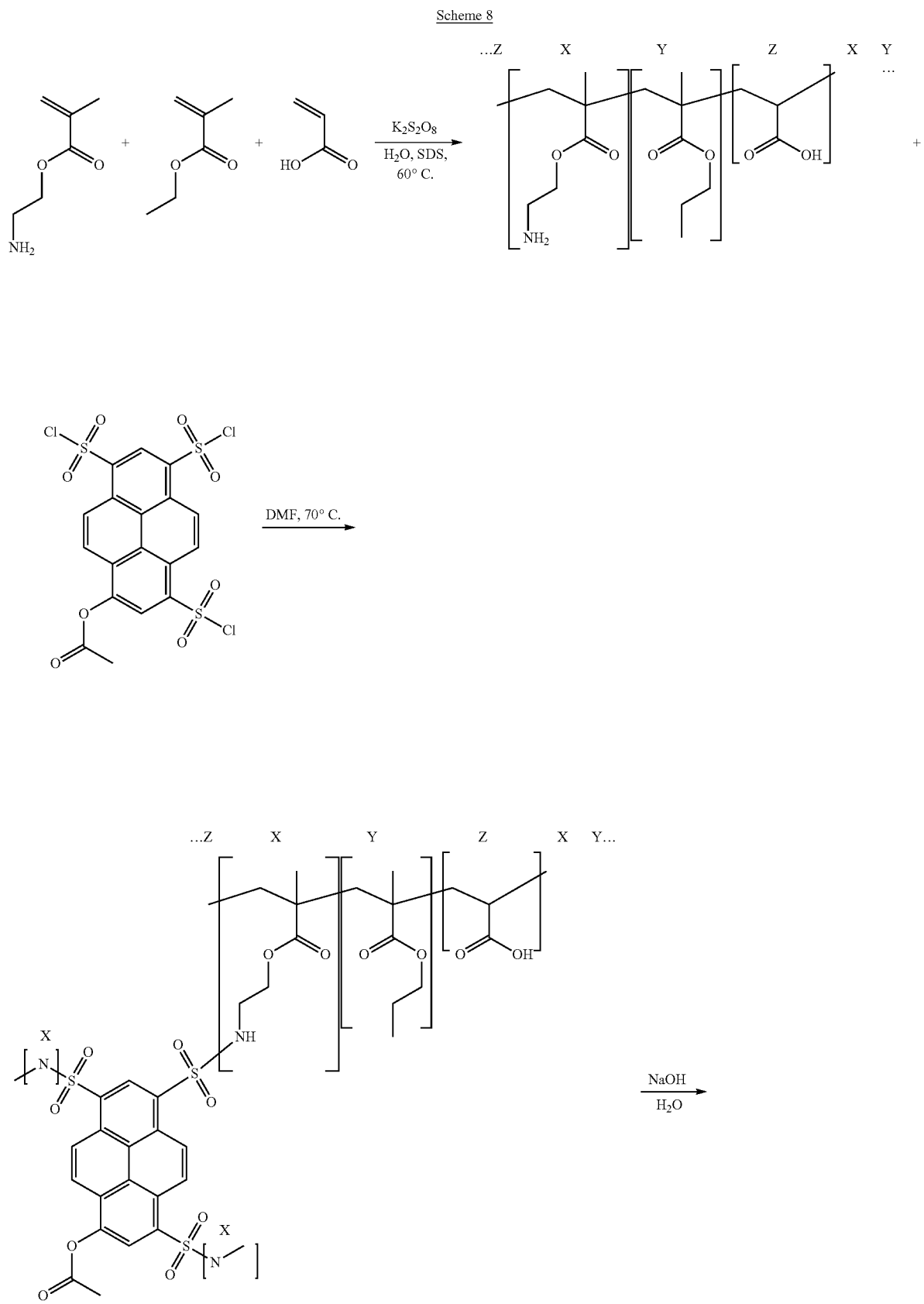

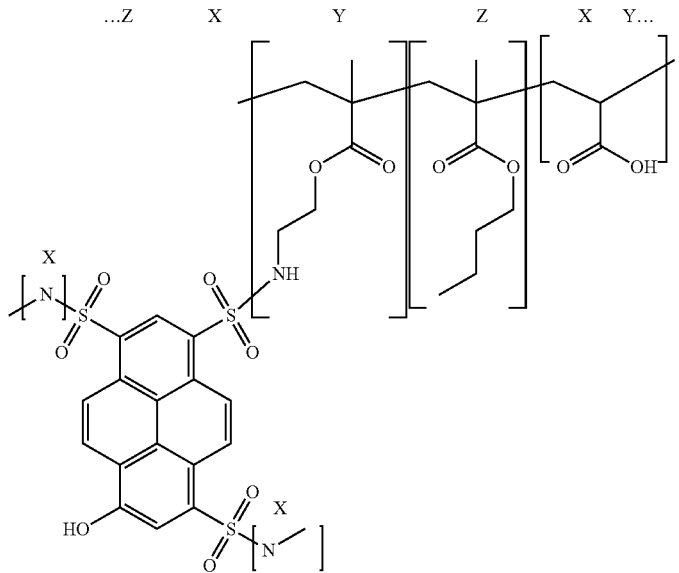

This i-region membrane was directly cast via doctor blading on a commercial anion-exchange membrane (Neosepta®) that had been wetted with N,N-dimethylformamide, and then a commercial cation-exchange membrane (Nafion®) that had also been wetted with N,N-dimethylformamide was placed on top and the entire structure was taped down. This membrane structure was annealed at about 160° C. for about 30 min to form a three-layer membrane structure. While this membrane generated smaller photocurrents and photovoltages, it also had a bulk-in potential of about 0.56 V when separating about 0.01 M acid and about 0.01 M base, which was desired given that the maximum (ideal) built-in potential was about 0.59 V.

Figure 21A:
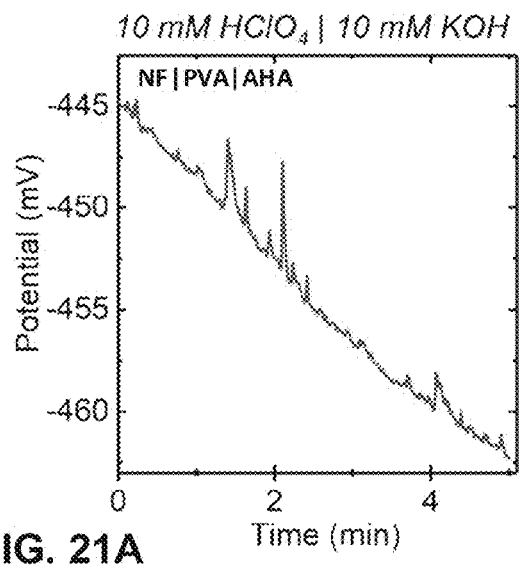
FIGS. 21A-21B show open-circuit voltage and rectification behavior for a three-layer BPM constructed from polymer film comprising a polyvinylalcohol (PVA) crosslinked with glutaraldehyde and loaded the hydrozypyrene derivative photoacid, and adhered to Nation® and Neosepta® membranes.
Figure 21B:
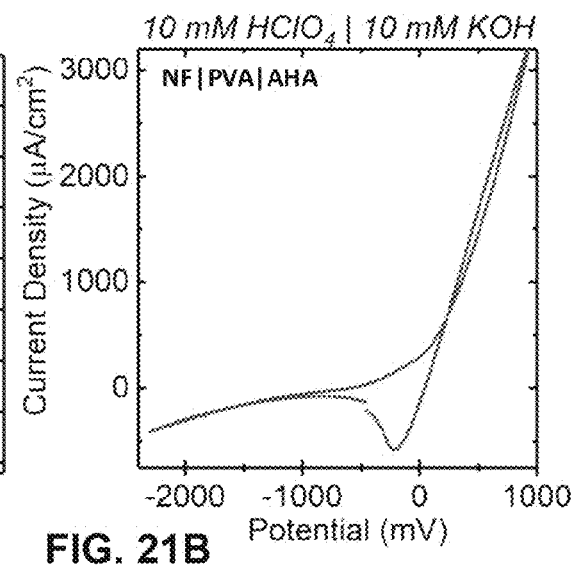

Embodiment 4: Referring to FIGS. 21A-21B, the i-region may comprise robust transparent films that are insoluble in water. Said films can be prepared using polyvinylalcohol (PVA) crosslinked with glutaraldehyde with various amounts of dye loading. In one embodiment, the film was synthesized by the addition of 2 mL of 1-15 wt % low-molecular-weight PVA mixed with 1-15 wt % glutaraldehyde and 1-5 drops of fuming sulfuric acid, and loaded with 8-hydroxypyrene-1,3,6-tris(2-aminoethylsulfonamide), as shown in Scheme 9.

Scheme 9.

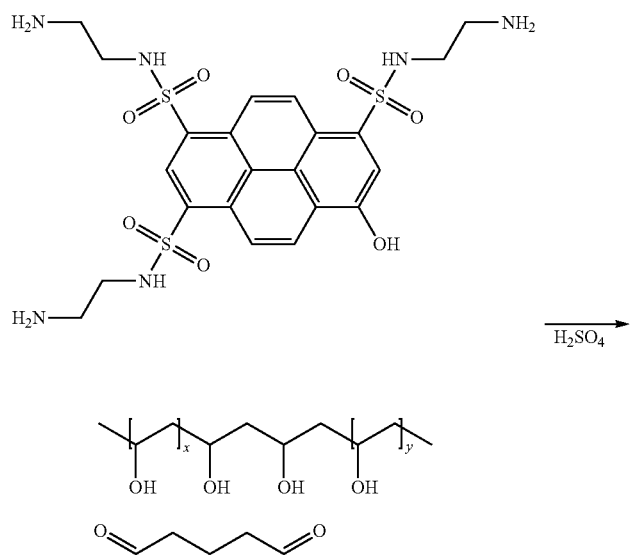

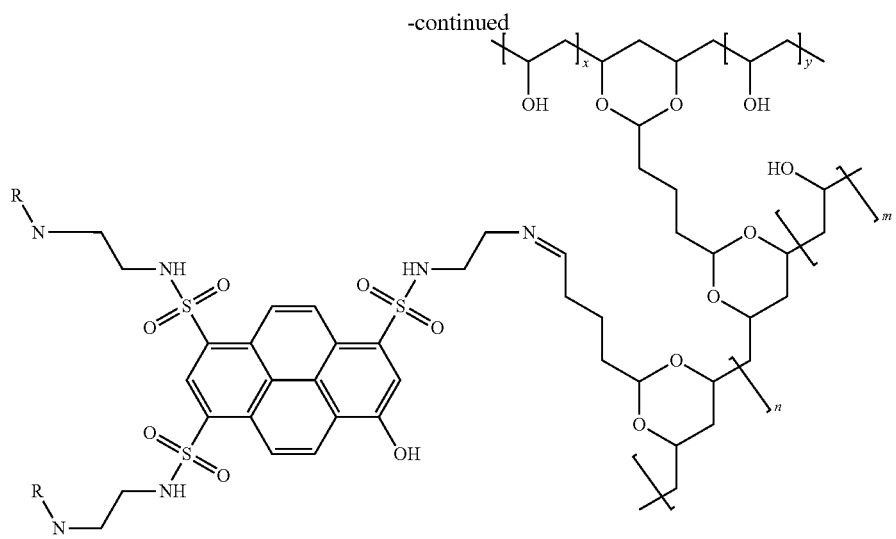

Films can made by drop casting or through doctor blading, the latter of which gave greater control over film thickness. BPMs were constructed with Nafion®. Neosepta®, and using PVA as the neutral "i"-region. In some embodiments, the films can also be used to adhere Nafion® and Neosepta® membranes together.

Figure 22A:
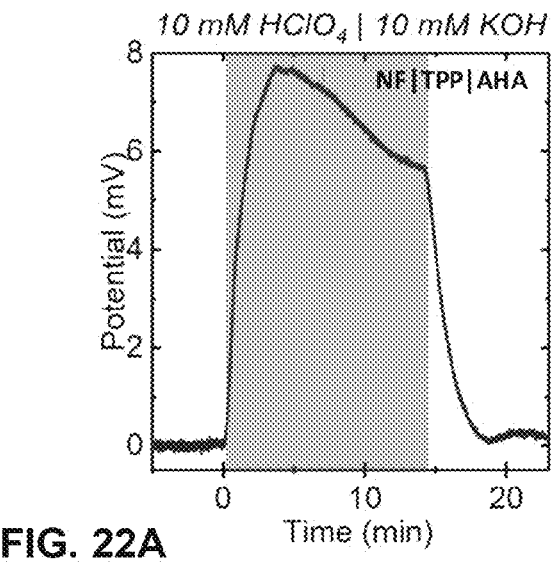
FIGS. 22A-22B show photovoltages and photocurrents for a three-layer BPM constructed from polymer film comprising the crosslinked PVA loaded with tetraphenylporphyrin (TPP) as the photoacid, and adhered to Nafion® and Neosepta® membranes, when illuminated with 405 nm laser light (purple).
Figure 22B:
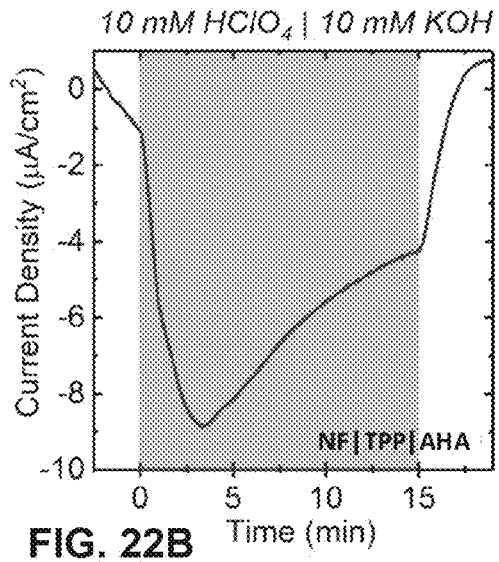

Embodiment 5: Referring to FIGS. 22A-22B, the i-region may comprise a film of PVA crosslinked with glutaraldehyde and loaded with tetraphenylporphyrin (TPP), which may be photoacidic. As shown in Scheme 10, the TPP-PVA films were synthesized using the same procedure as above. A BPM made of Nafion®, the crosslinked PVA doped with TPP, and Neosepta® yielded a film that exhibited photoresponses.

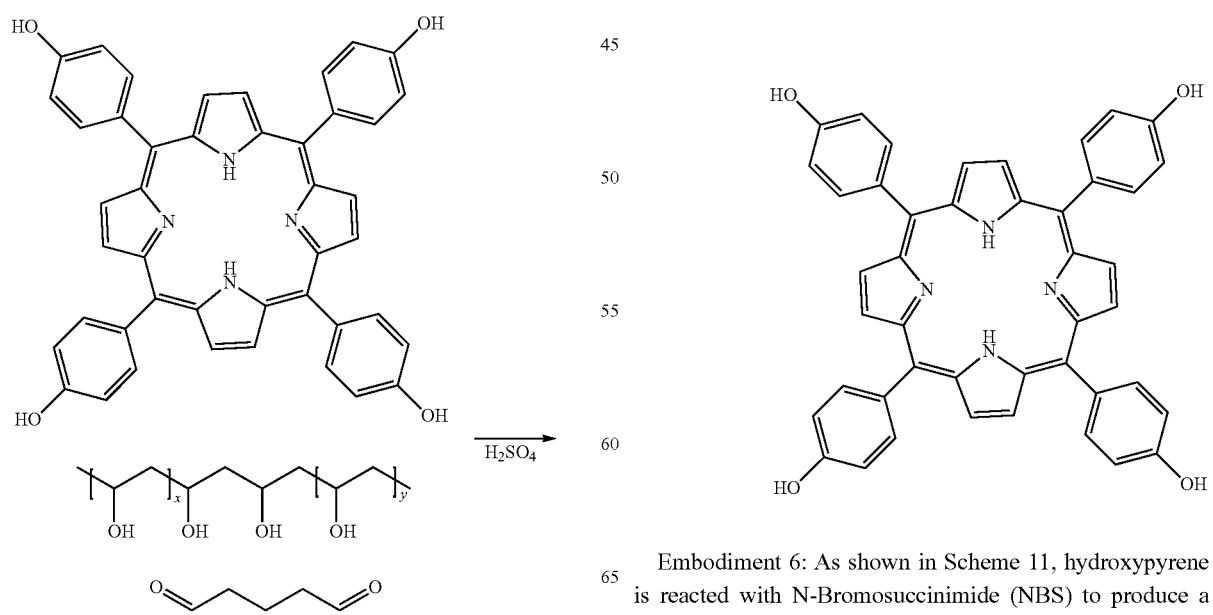

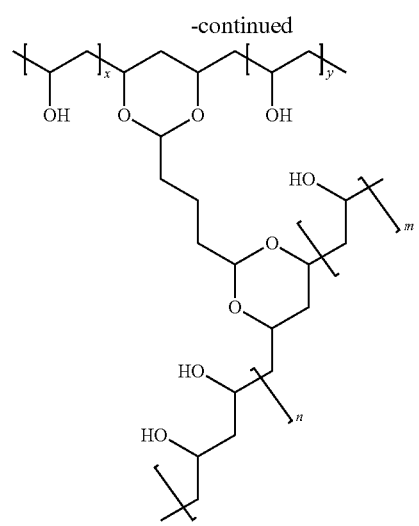

Embodiment 6: As shown in Scheme 11, hydroxypyrene is reacted with N-Bromosuccinimide (NBS) to produce a bromohydroxypyrene photoacid.

Scheme 11

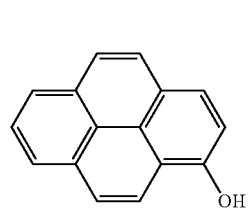

Embodiment 7: As shown in Scheme 12, synthetic activation at polymer and subsequent Suzuki-Miyaura cross-coupling with a hydroxypyrene derivative resulted in a final dye-sensitize polymer that was soluble in DCM and could be cast, but did not swell in aqueous solution. In some embodiments, each of m, n, q, and x can range from about 1 to 1,000, such as for example, 100-500.

Scheme 12.

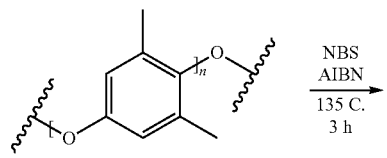

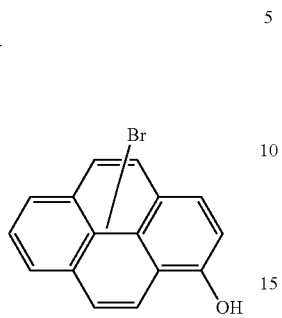

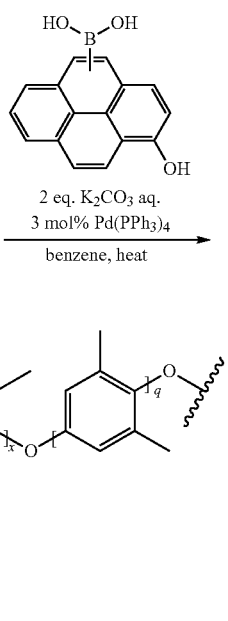

Embodiment 8: As shown in Scheme 13, synthetic activation of a polymer and subsequent nucleophilic substitution of the hydroxypyrene-based photoacid produces a gel-like substance that was hydrated and pressed into a film. In some embodiments, each of m, n, q, and x can range from about 1 to 1,000, and R refers to the hydroxypyrene-based photoacid.

Scheme 13.

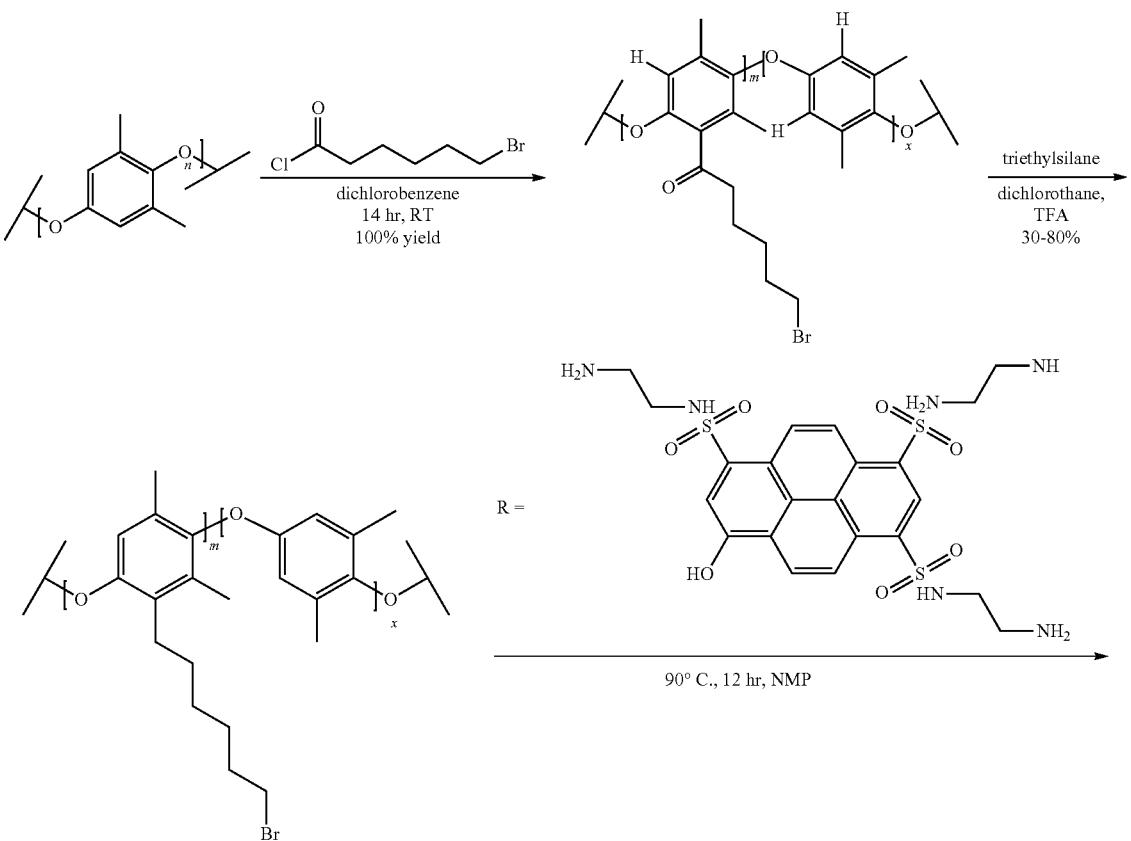

-continued

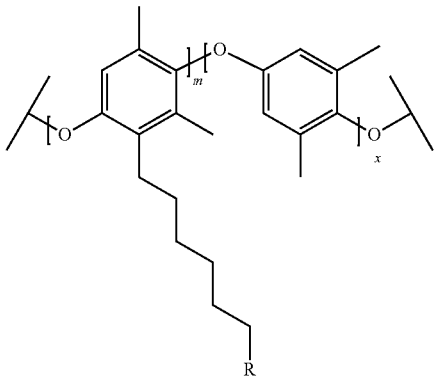

Figure 23A:
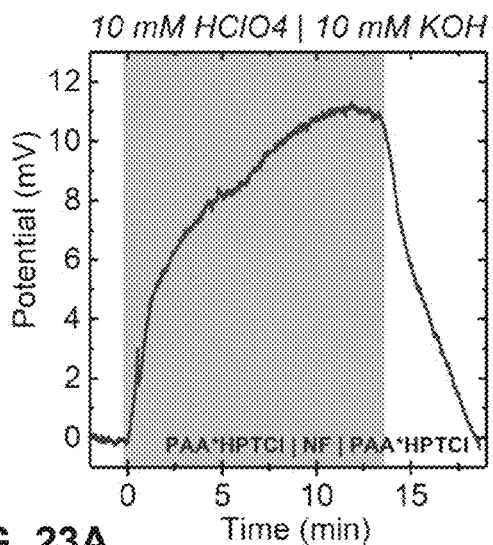
FIGS. 23A-23B show photovoltages and photocurrents for a BPM constructed from polymer film formed from polyallylamine (PAA) and 3,6,8-tris(chlorosulfonyl)pyren-1-yl acetate, and layered onto a Nafion® membrane, when illuminated with 405 nm laser light (purple).
Figure 23B:
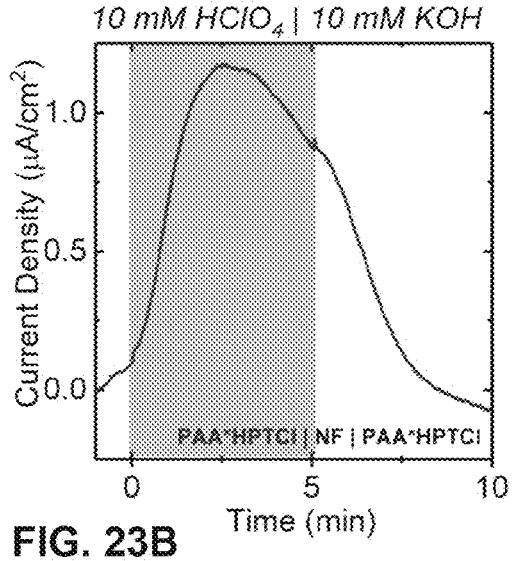

Embodiment 9: Referring to FIGS. 23A-23B, the present invention may feature a layer-by-layer photoacid-polymer deposition on an IX membrane. In an exemplary embodiment, layer-by-layer growth of the photoacid-polymer was achieved by soaking a Nafion® film in 27 mM polyallylamine solution in water for 5 minutes. The film was removed and rinsed in water, then acetone. Next, the film was placed in a suspension of 3,6,8-tris(chlorosulfonyl)pyren-1-yl acetate in acetone (300 mg in 5 mL) and sonicated under heat for 30 minutes. The film was removed and rinsed in acetone, then water. Afterwards, the film was placed back into the polyallylamine solution and sonicated under heat for 30 minutes. The rinsing and soaking steps were then repeated until 3 layers of dye were deposited. After deposition, the film was rinsed in acetone, then water, and stored in MilliQ water. Finally, esters on dye molecules were hydrolyzed by stirring the membrane in boiling 1M HCl for 30 minutes.

Example 4. Applications of the Present Invention

Access to clean and potable water is one of the top issues facing humanity and is expected to become a more pressing issue in the future. While efficient and renewable new energy technologies could supply the power needed to generate potable water, major developments are slow and are in general incremental from prior demonstrations, especially for people in developing nations who need clean water the most but cannot afford clean water solutions. Thus, an inexpensive solution to their near-term water needs is required. In the long-term, it is expected that developed nations with large gross domestic product and a developed grid or micro-grid infrastructure could utilize state-of-the-art cost-effective plant-scale technologies, such as those based on osmosis, distillation, and electrodialysis. A technology to bring those from the lower end of economic development toward this full development capacity is needed.

As presented herein, an inexpensive, yet effective, solar-powered water desalination device may be powered by a solar cell based on water as the semiconductor and mimics a traditional pn-junction, pin-junction, or Schottky junction solar cell. The water solar cell can be well-suited for use in processes that only require ion motion, such as desalination. In preferred embodiments, the desalination device is portable, reusable, and free of moving parts. As shown in FIG. 24, direct solar desalination of salt water is accomplished using an integrated photodialysis process where at no time during operation is electronic current generated. Visible light drives charge separation of protons and hydroxides which in turn drive anions (Cl$^-$) and cations (Na$^+$) out of a secondary compartment, forming aqueous HCl, NaOH, and less salty water. This is a delineation from electrodialysis, a conventional technique to generate potable water from salt-water sources, where electronic current must be converted into ionic current via a Faradaic reaction that usually requires >1.23 V, which is wasted as heat during the conversion of electronic current into ionic current.

Integrated solar photodialysis only requires relatively simple and inexpensive polymer ion-exchange membranes, such as those described herein, and not electronic semiconductors like silicon. Also, the desired function of the photoacid dye molecules is to not perform electron transfer and therefore, exquisite chemical stability of the polymer membranes is not required. This differs from most electrochemical technologies where expensive and robust membranes like Nafion® are required to maintain membrane integrity even in the presence of reactive and/or free-radical intermediates. In exemplary embodiments, the photovoltage reported herein is nearly 50% of that needed to desalinate NaCl in sea water (~0.60-0.70 M NaCl) to potable water (0.006-0.017 M NaCl) and 100% of that needed to convert rather dilute brackish water (~0.02 M-0.51 M NaCl) into potable water.

As used herein, the term "about" refers to plus or minus 10% of the referenced number.

The disclosures of the following U.S. patents and publications are incorporated in their entirety by reference herein: US20070099055.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the below claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. An ion-pumping membrane system (100) for use in an ion-exchange or ion-transport (IX) process, comprising an ion-exchange membrane (110) having a photoactive dye covalently bound to said membrane (110), whereupon exposure to a photon source, said photoactive dye is configured to undergo a regenerative and reversible light-driven dissociation or light-driven association reaction to generate a positively-charged ion or a negatively-charged ion for use in the IX process.

2. The system of claim 1, wherein the photon source is sunlight, ultraviolet light, visible light, or near-infrared light.

3. The system of claim 1, wherein the photoactive dye is covalently bound to at least a surface of the ion-exchange membrane (110) or doped into the ion-exchange membrane (110).

4. The system of claim 1, further comprising a second membrane juxtaposed or attached to the ion-exchange membrane, wherein the membrane system (100) is a bipolar membrane.

5. The system of claim 4, wherein the ion-exchange membrane is a cation-exchange membrane (110a) and the second membrane is an anion-exchange membrane (110b).

6. The system of claim 1, wherein the ion-exchange membrane (110) comprises a polymer membrane (110c) to which the photoactive dye is covalently bound.

7. The system of claim 6, wherein the polymer membrane (110c) is synthesized from a polymer material selected from a group consisting of polyethylene terephthalate, polyacrylic acid, poly(acrylic acid-butyl methacrylate)triblock copolymer, polyphenylene oxide, polystyrene, polyimide, polylactic acid, and polyvinylalcohol crosslinked with glutaraldehyde.

8. The system of claim 6, further comprising a cation-exchange membrane (110a) and an anion-exchange membrane (110b), wherein the ion-exchange membrane (110c) is juxtaposed or attached to the cation-exchange membrane (110a) and the anion-exchange membrane (110b), wherein the membrane system (100) is a bipolar membrane.

9. The system of claim 1, wherein the photoactive dye is a photoacid, a photobase, or a photoacidic or photobasic inorganic metal complex.

10. The system of claim 9, wherein the photoactive dye is a photoacid according to any one of the following compounds:

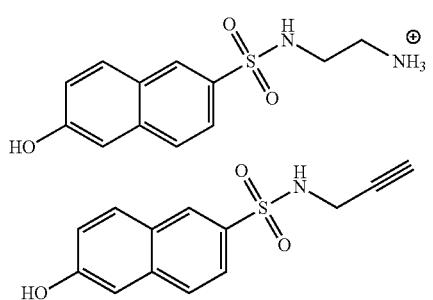

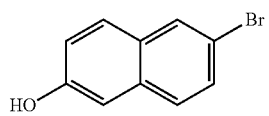

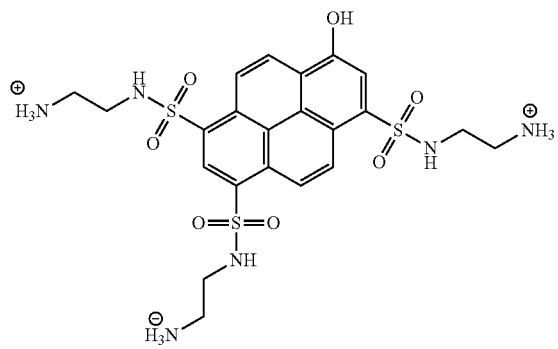

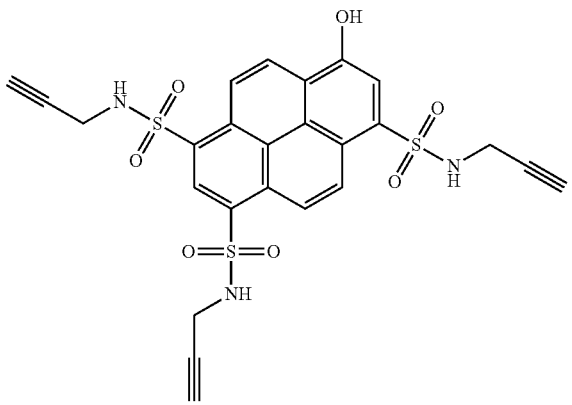

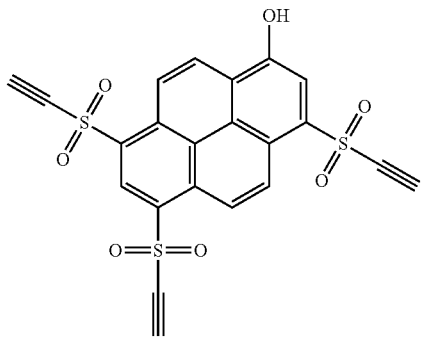

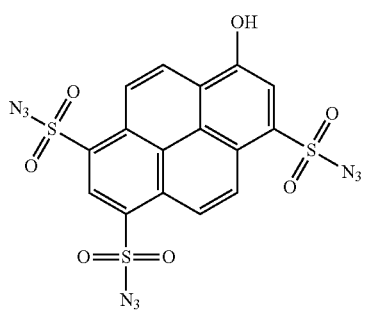

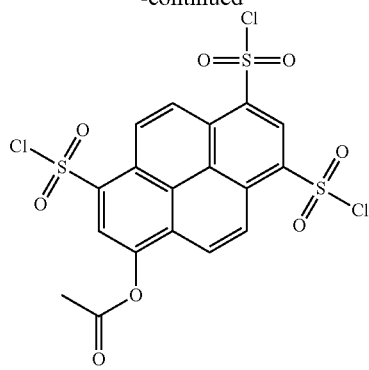
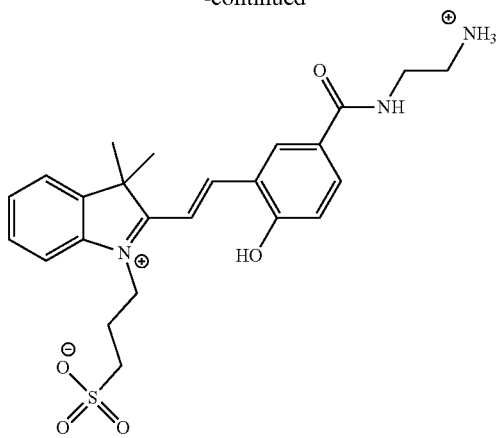
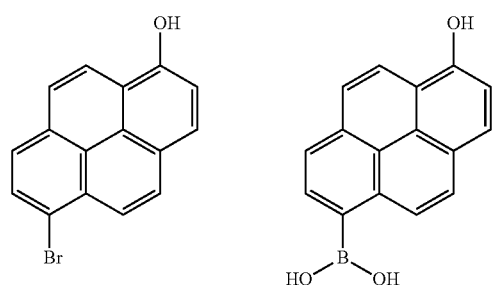
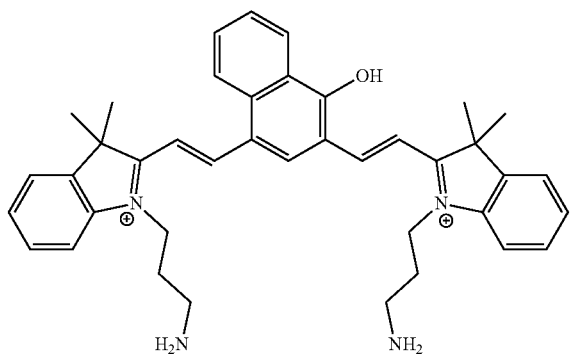
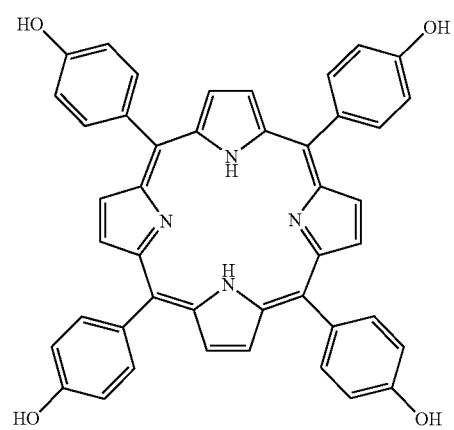
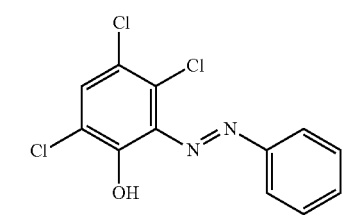
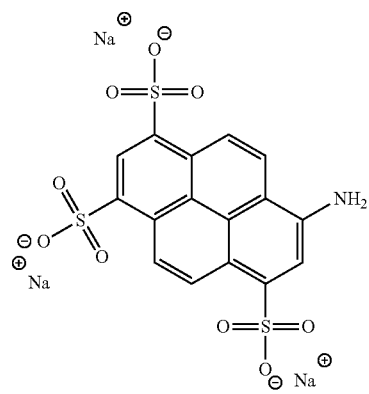
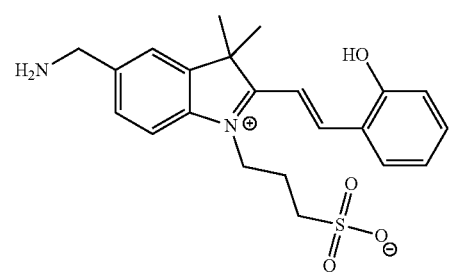
11. The system of claim 9, wherein the photoactive dye is a photoacid comprising a donor core and at least one acceptor component bound to the donor core.
12. The system of claim 11, wherein the acceptor component is according to any one of the following structures:

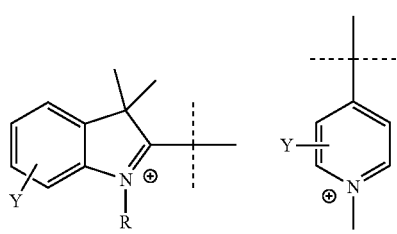 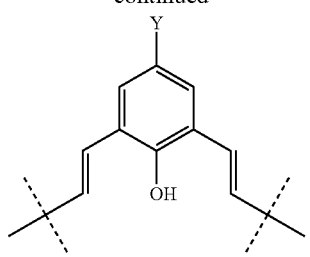

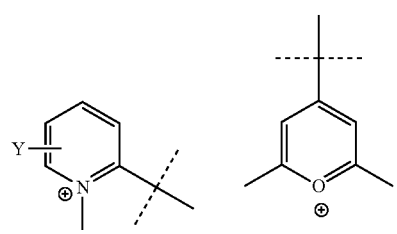 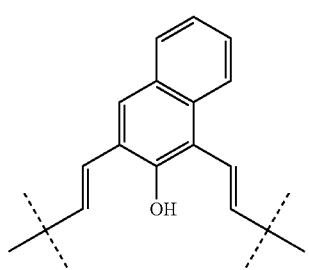

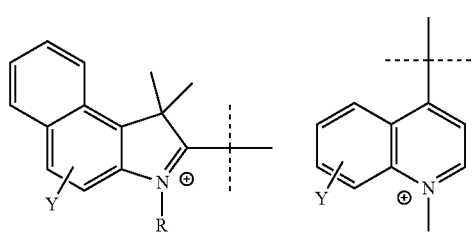 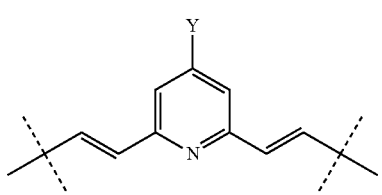

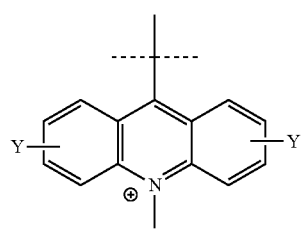 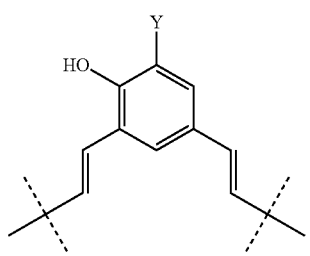

Y=—H, —CN, —SO$_3^-$,
wherein

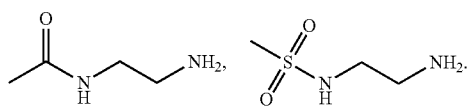 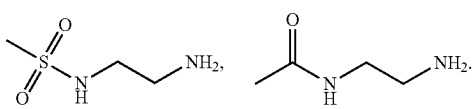

wherein Y=—H,

13. The system of claim 11, wherein the donor core is according to any one of the following structures:

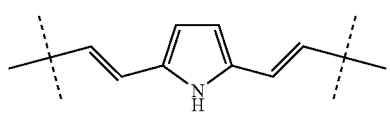

14. The system of claim 9, wherein the photoactive dye is a photoacidic quantum dot having a plurality of ligands, the ligands having a hydroxyl or sulfonate group.

15. The system of claim 14, wherein the photoacidic quantum dot is according to the following structure:

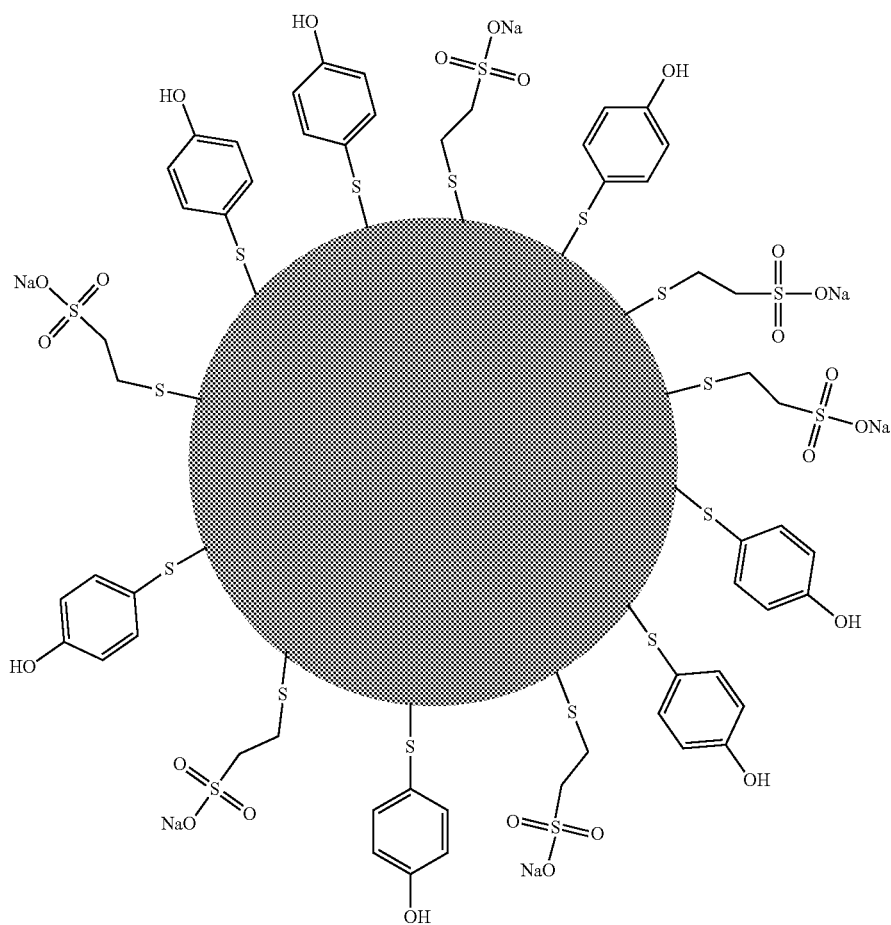
16. The system of claim 9, wherein the photoactive dye is a photobase according to ay one of the following compounds:
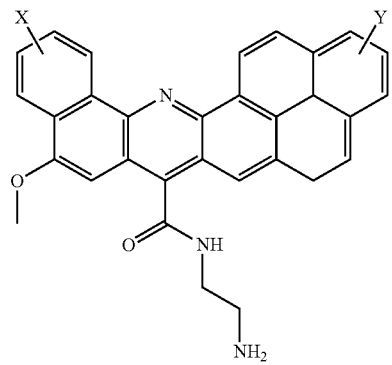
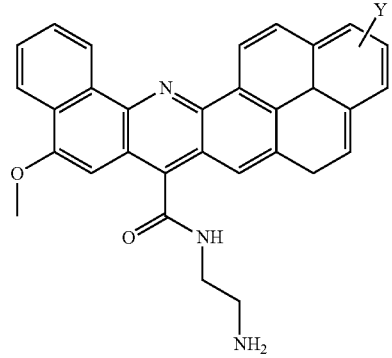
-continued
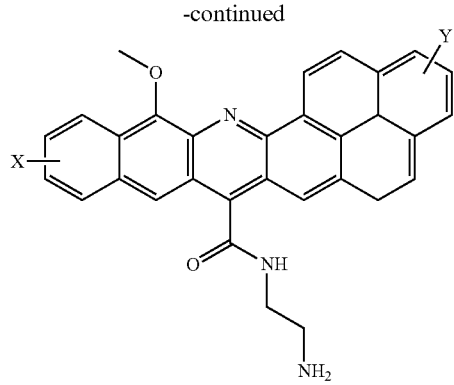
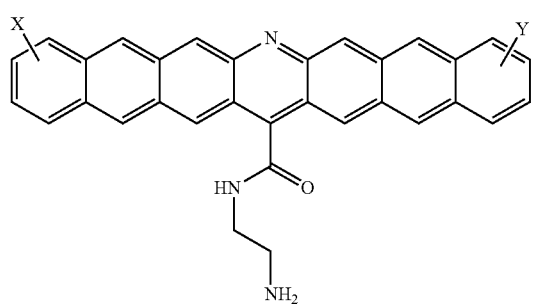

-continued

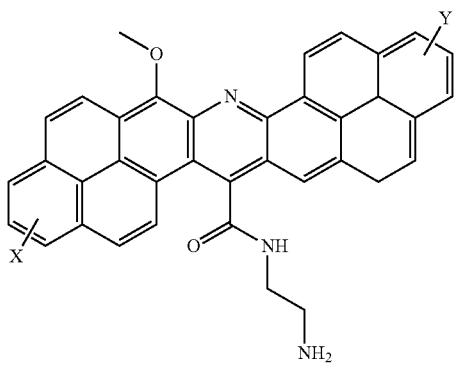

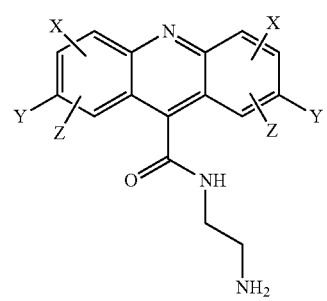

wherein X, Y=—H, —CH₃, —OCH₃.

17. The system of claim 9, wherein the photoactive dye is a photoacidic inorganic metal complex according to any one of the following structures:

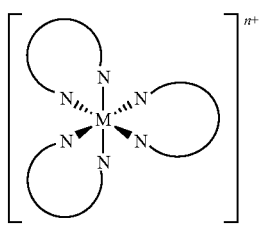

M = Os, Ru

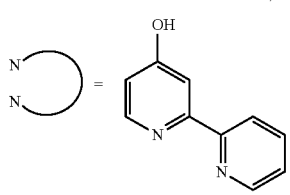

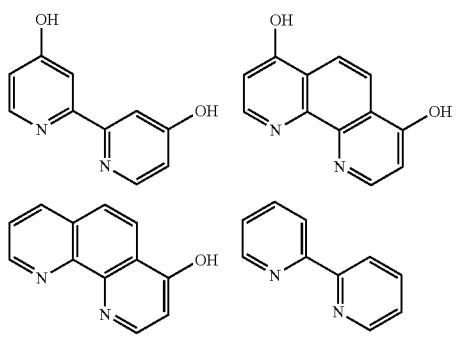

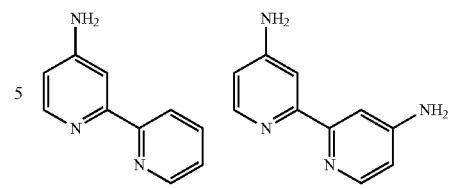

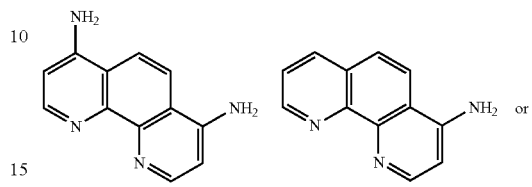

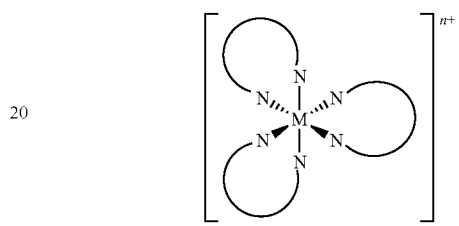

M = iR

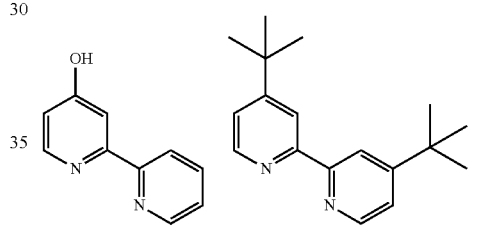

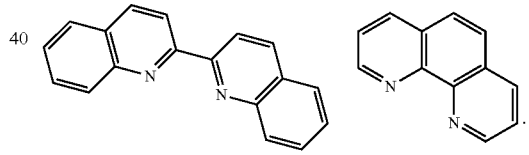

18. The system of claim 9, wherein the photoactive dye is a photoacidic inorganic metal complex comprising a metal group and a dithiol ligand modified with a protonated group, wherein the metal group is a Pt, Pd, or Ni, wherein the protonated group is a —OH or —NH₃⁺.

19. The system of claim 9, wherein the photoactive dye is a photobasic inorganic metal complex according to any one of the following structures:

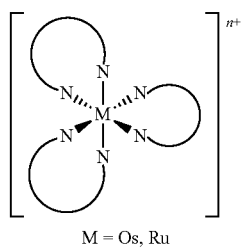

M = Os, Ru

-continued

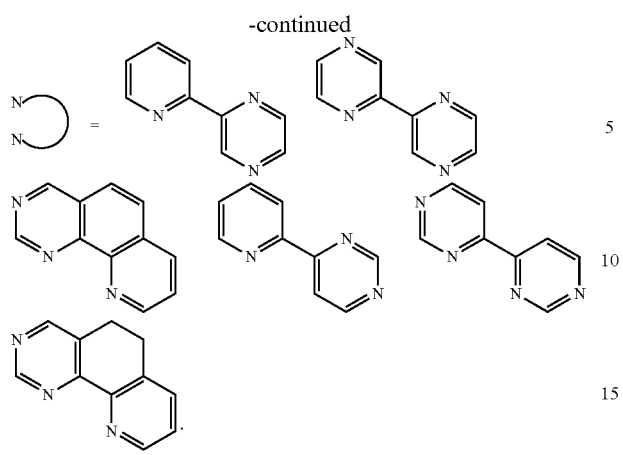

20. The system of claim 1, wherein the photoactive dye generates a second ion of opposite charge upon regeneration.

21. A method of preparing an ion-exchange membrane, for use in an ion-exchange or ion-transport (IX) process, said method comprising:
   a) providing a photoactive dye; and
   b) adding the photoactive dye to a membrane such that the photoactive dye covalently binds to the membrane, via a coupling reaction, to form the ion-exchange membrane;
whereupon exposure to a photon source, said photoactive dye undergoes a regenerative and reversible light-driven dissociation or light-driven association reaction to generate a positively-charged ion or a negatively-charged ion for use in the IX process.

* * * * *